(12) United States Patent
Lynch et al.

(10) Patent No.: US 10,926,209 B1
(45) Date of Patent: *Feb. 23, 2021

(54) AIR FILTRATION SYSTEM, AIR FILTRATION DEVICE, AND AIR FILTRATION MODULE FOR USE THEREWITH

(71) Applicant: CELIOS CORPORATION, Wakefield, MA (US)

(72) Inventors: Iyam Lynch, Winston-Salem, NC (US); Neil J. Campbell, Woodbine, MD (US); Stephen Dellinger, Winston-Salem, NC (US); Kris Grube, Bloomington, IN (US); Matthew Ditrolio, West Bridgewater, MA (US)

(73) Assignee: Celios Corporation, Wakefield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/900,501

(22) Filed: Jun. 12, 2020

Related U.S. Application Data

(63) Continuation-in-part of application No. 16/895,741, filed on Jun. 8, 2020, and a continuation-in-part of
(Continued)

(51) Int. Cl.
*B01D 46/00* (2006.01)
*B01D 46/42* (2006.01)
*B01D 46/52* (2006.01)

(52) U.S. Cl.
CPC ..... *B01D 46/0008* (2013.01); *B01D 46/0013* (2013.01); *B01D 46/0032* (2013.01);
(Continued)

(58) Field of Classification Search
CPC ............. B01D 46/002; B01D 46/0013; B01D 46/0008; B01D 46/0032; B01D 46/0036;
(Continued)

(56) References Cited

U.S. PATENT DOCUMENTS 4,590,951 A 5/1986 O'Connor
5,320,096 A 6/1994 Hans
(Continued)

FOREIGN PATENT DOCUMENTS

GB 2267661 A 12/1993
WO 2019/071296 A1 4/2019

OTHER PUBLICATIONS

SoClean, "Air Purifier Product Technology," Aug. 25, 2020, [online], [retrieved on Aug. 25, 2020]. Retrieved from the internet: <URL: https://www.soclean.com/lifestyle/air>.
(Continued)

*Primary Examiner* — Robert Clemente
(74) *Attorney, Agent, or Firm* — Polsinelli PC

(57) ABSTRACT

The present disclosure generally relates to an air filtration system, an air filtration device, and an air filtration module for removing ultra-fine particles (UFPs), pathogens (e.g., viruses, bacteria, etc.), volatile organic compounds (VOCs), oxides or odors. The systems, devices, and filter modules of the disclosure perform at enhanced filter and power efficiencies. An air filtration system is provides that includes a docking base for receiving a removable, portable air filtration device in fluid communication with the docking base. In certain embodiments, the air filtration system further includes the removable, portable air filtration device. The portable air filtration device may optionally include an air filtration module.

20 Claims, 38 Drawing Sheets

Related U.S. Application Data application No. 29/737,110, filed on Jun. 5, 2020, and a continuation-in-part of application No. 29/737,141, filed on Jun. 5, 2020, and a continuation-in-part of application No. 29/737,148, filed on Jun. 5, 2020, and a continuation-in-part of application No. 29/737,150, filed on Jun. 5, 2020, and a continuation-in-part of application No. 29/737,154, filed on Jun. 5, 2020.

(52) U.S. Cl.
CPC ..... B01D 46/0036 (2013.01); B01D 46/0043 (2013.01); B01D 46/4236 (2013.01); B01D 46/4245 (2013.01); B01D 46/521 (2013.01); B01D 2267/60 (2013.01)

(58) Field of Classification Search
CPC ............ B01D 46/0043; B01D 46/4236; B01D 46/4245; B01D 46/521; B01D 2267/60; B01D 46/125
See application file for complete search history.

(56) References Cited

U.S. PATENT DOCUMENTS

| | | | |
|---|---|---|---|
| 5,417,729 A | 5/1995 | Greenleaf, Sr. | |
| 6,447,566 B1 | 9/2002 | Rivera et al. | |
| 6,533,847 B2 | 3/2003 | Seguin et al. | |
| 6,589,323 B1 | 7/2003 | Korin | |
| 6,910,483 B2 | 6/2005 | Daly et al. | |
| 7,118,608 B2 | 10/2006 | Lovell | |
| 8,313,561 B2 | 11/2012 | Celik et al. | |
| 8,517,012 B2 | 8/2013 | Daly et al. | |
| 2002/0166811 A1 | 11/2002 | Walker et al. | |
| 2003/0010001 A1 | 1/2003 | Bryce et al. | |
| 2004/0118093 A1 | 6/2004 | Chang et al. | |
| 2004/0118289 A1 | 6/2004 | Chang et al. | |
| 2004/0255783 A1 | 12/2004 | Graham et al. | |
| 2006/0048782 A1 | 3/2006 | Gossweiler | |
| 2007/0163588 A1 | 7/2007 | Hebrank et al. | |
| 2007/0240719 A1 | 10/2007 | Duarte | |
| 2008/0066741 A1 | 3/2008 | LeMahieu et al. | |
| 2008/0196370 A1 | 8/2008 | Schramm et al. | |
| 2010/0058927 A1 | 3/2010 | Krantz | |
| 2010/0078024 A1 | 4/2010 | Andrieux et al. | |
| 2011/0126713 A1 | 6/2011 | Legare et al. | |
| 2011/0289894 A1 | 12/2011 | Nicholas | |
| 2012/0055127 A1* | 3/2012 | Holzmann | B01D 29/111 55/484 |
| 2012/0067013 A1* | 3/2012 | Antony | B01D 46/4227 55/357 |
| 2012/0174788 A1* | 7/2012 | Felber | B01D 46/42 95/286 |
| 2013/0037027 A1 | 2/2013 | Schuller | |
| 2013/0062276 A1* | 3/2013 | Barreteau | B01D 46/125 210/493.5 |
| 2013/0074697 A1* | 3/2013 | Verschoor | H05K 9/0041 95/273 |
| 2013/0160648 A1 | 6/2013 | Spryshak | |
| 2014/0130467 A1* | 5/2014 | Herman | B01D 46/125 55/414 |
| 2015/0033942 A1 | 2/2015 | Zhang | |
| 2016/0067644 A1 | 3/2016 | Scaife | |
| 2017/0001048 A1 | 1/2017 | Volmer et al. | |
| 2017/0014743 A1* | 1/2017 | Varghese | B01D 46/002 |
| 2017/0014744 A1 | 1/2017 | Maier et al. | |
| 2017/0128754 A1 | 5/2017 | Hou | |
| 2017/0189727 A1 | 7/2017 | Hunter et al. | |
| 2017/0246486 A1 | 8/2017 | Cazier et al. | |
| 2018/0311602 A1 | 11/2018 | Woods et al. | |
| 2019/0001249 A1 | 1/2019 | Hong et al. | |

OTHER PUBLICATIONS

Celios, "College Dorm Smell," Apr. 14, 2020, [online], [retrieved on Aug. 25, 2020]. Retrieved from the internet: <URL: https://www.youtube.com/watch?time_continue=2&v=g-F68cVJFc0&feature=emb_title>.

* cited by examiner

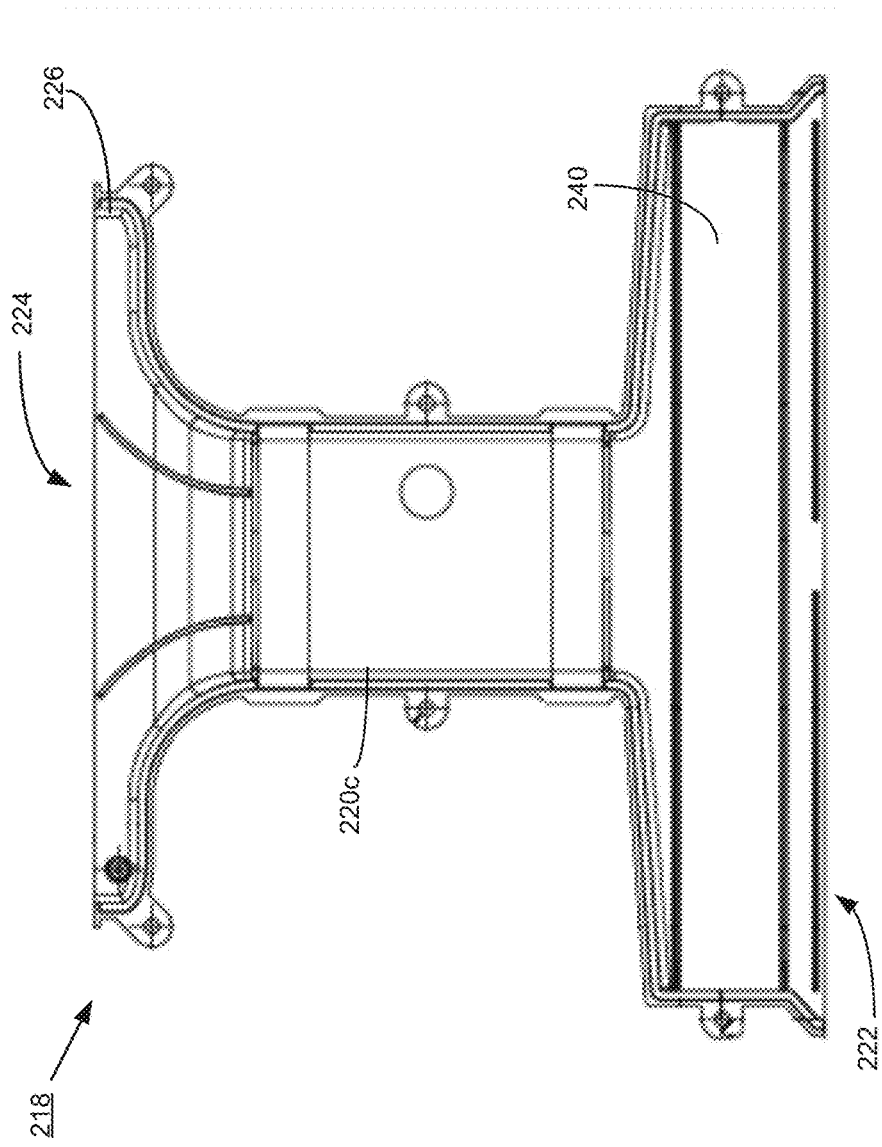
FIG. 13A
FIG. 13B

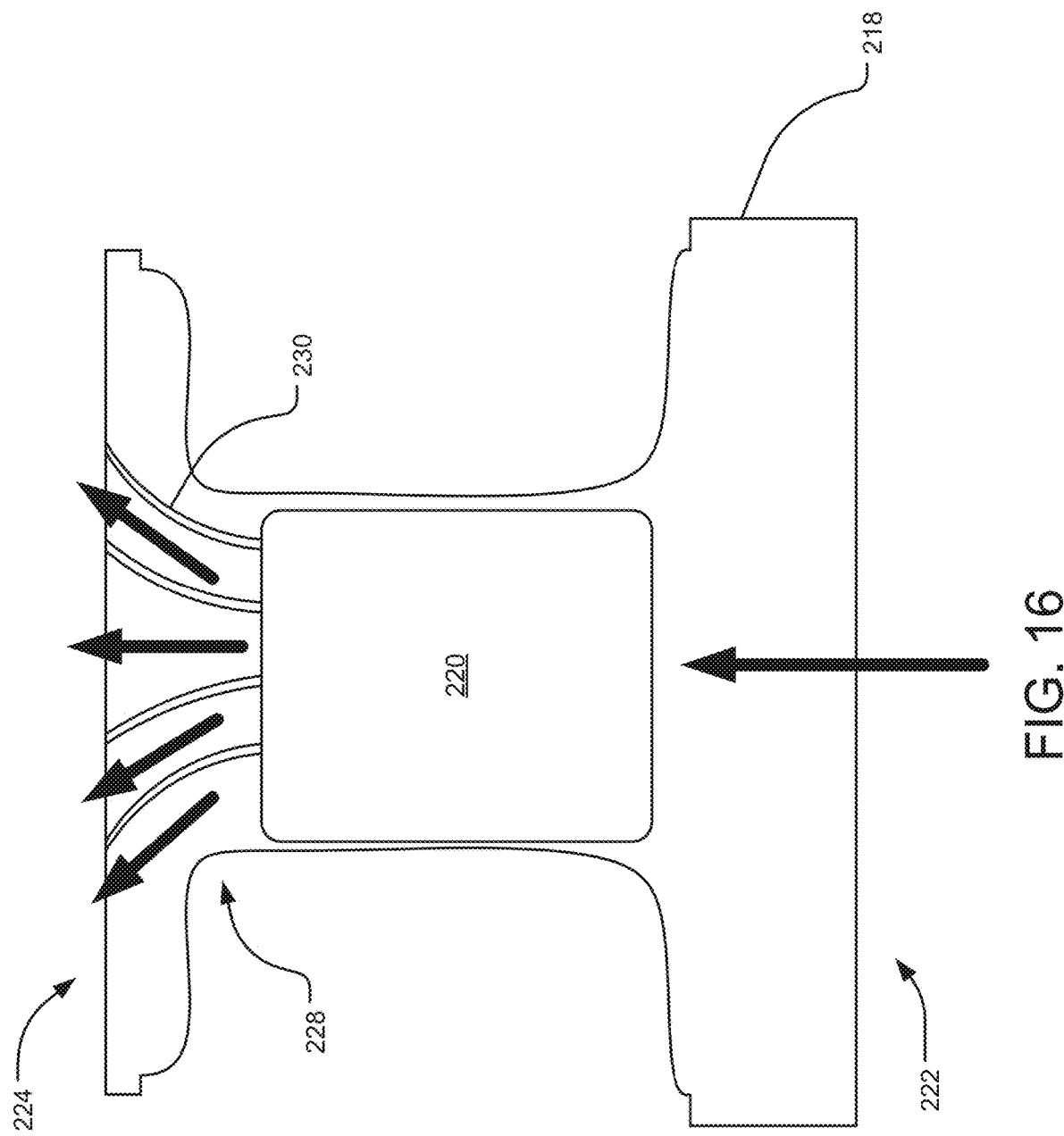

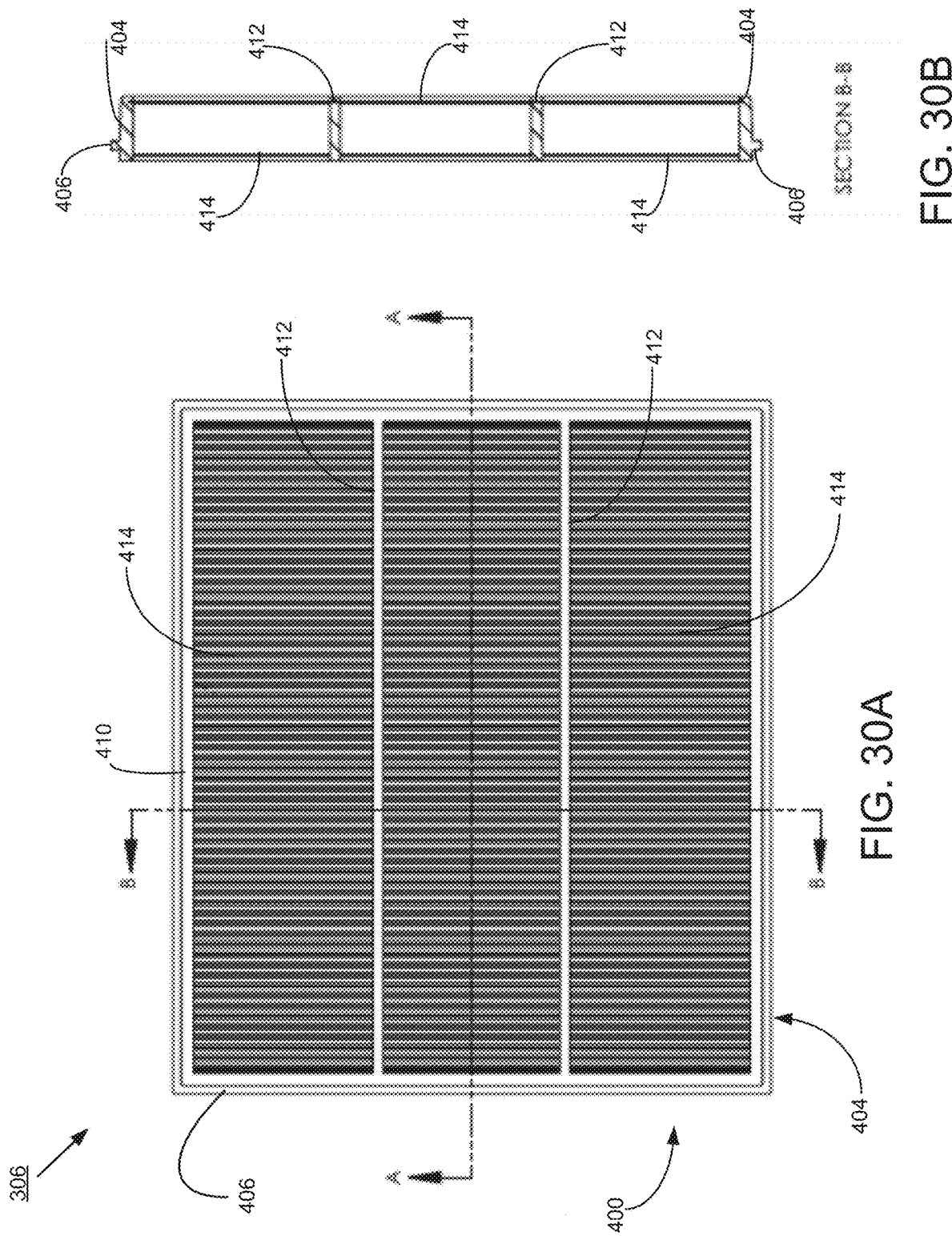

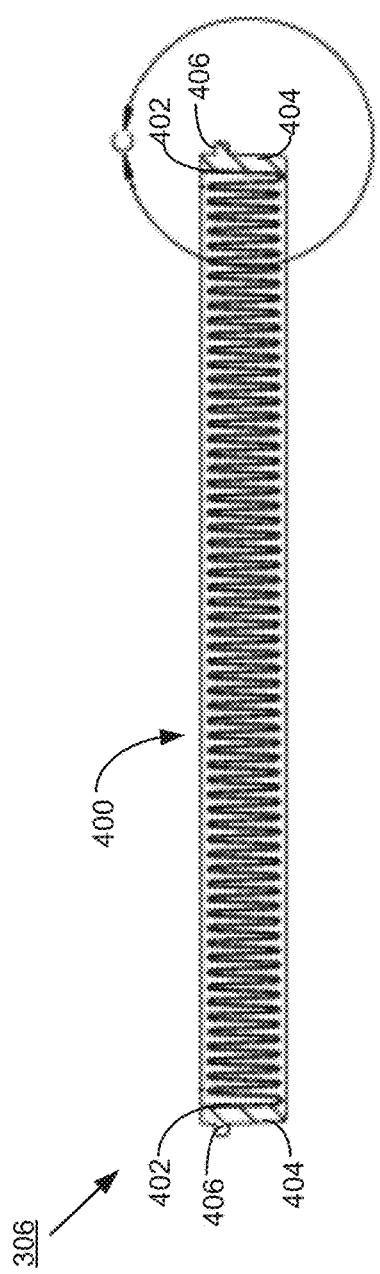
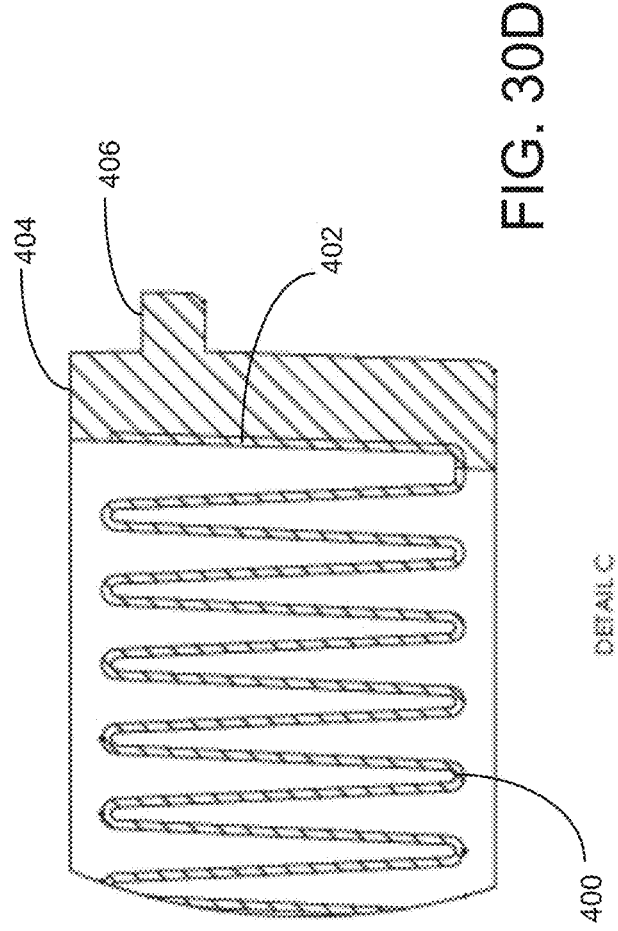
FIG. 30C
FIG. 30D

US 10,926,209 B1

AIR FILTRATION SYSTEM, AIR FILTRATION DEVICE, AND AIR FILTRATION MODULE FOR USE THEREWITH

CROSS-REFERENCE TO RELATED APPLICATIONS

This application is a continuation-in-part of U.S. patent application Ser. No. 16/895,741, filed Jun. 8, 2020, entitled "AIR FILTRATION SYSTEM, AIR FILTRATION DEVICE, AND AIR FILTRATION MODULE FOR USE THEREWITH," and is a continuation-in-part of U.S. Design patent application Ser. No. 29/737,110, filed Jun. 5, 2020, entitled "AIR FILTRATION SYSTEM," U.S. Design patent application Ser. No. 29/737,141, filed Jun. 5, 2020, entitled "AIR FILTRATION STAND," U.S. Design patent application Ser. No. 29/737,148, filed Jun. 5, 2020, entitled "AIR FILTRATION MODULE," U.S. Design patent application Ser. No. 29/737,150, filed Jun. 5, 2020, entitled "AIR FILTRATION MODULE," and U.S. Design patent application Ser. No. 29/737,154, filed Jun. 5, 2020, entitled "AIR FILTRATION DEVICE," the entire contents of which are incorporated herein by reference in their entireties for all purposes.

TECHNICAL FIELD

This disclosure relates to air filtration, and more particularly to an air filtration system, an air filtration device, and an air filtration module.

BACKGROUND OF THE INVENTION

Currently, high efficiency air filtration is typically achieved by moving ambient air through either a high efficiency particulate air (HEPA) or an ultra-low penetration air (ULPA) filtration system. HEPA and ULPA filtration are capable of achieving relatively low particulate levels, but require a substantial system pressure drop to transport air through the large, dense filters necessary for effective particulate collection. Additionally, current HEPA and ULPA filtration systems generally do not remove volatile organic compounds (VOCs), oxides or odors.

There remains a need in the art for air filtration systems and methods capable of achieving high efficiency air filtration, together with removal of other contaminants such as VOCs.

SUMMARY OF THE INVENTION

In one aspect, the present disclosure generally relates to an air filtration system, an air filtration device, and an air filtration module for removing ultra-fine particles (UFPs), pathogens (e.g., viruses, bacteria, etc.), volatile organic compounds (VOCs), oxides or odors. The systems, devices, and filter modules of the disclosure perform at enhanced filter and power efficiencies.

In certain aspects, an air filtration system is provided that includes a docking base for receiving a removable, portable air filtration device in fluid communication with the docking base. In certain embodiments, the air filtration system further includes the removable, portable air filtration device. The portable air filtration device may optionally include an air filtration module.

In certain aspects, the air filtration system generally comprises a docking base including a docking opening for receiving a portable air filtration device in fluid communication with the docking base; one or more unfiltered air inlets for directing unfiltered air to a portable air filtration device when docked in the docking opening; an air outlet for directing air into a portable air filtration device when docked in the docking opening; a removable secondary media retention feature; and one or more sound dampening features to reduce air flow noise and/or vibrational noise during use.

In certain aspects, a portable air filtration device is provided, which may be used alone or which may be interfaced with the docking base. The portable air filtration device may include a device housing including an external air intake for directing unfiltered air into the device; a filter module disposed within the housing; a fan plenum assembly including at least one fan to draw input air into the device and to generate a positive pressure air flow through the device; wherein the fan plenum assembly is located upstream of the filter module such that input air flow is directed from the fan plenum assembly into an input, turbulent air flow region of the filter module during use.

In some embodiments, the fan plenum assembly may comprise a fan air intake side, a fan air outlet side, and a fan plenum seal on the fan air outlet side of the fan plenum assembly interfaced with the fan plenum attachment seat of the filter module to form an air tight seal between the fan plenum assembly and the filter module.

In yet other aspects, a filter module is provided, which may be used in connection with the portable air filtration device or air filtration systems of the disclosure. The filter module may comprise an external housing having a filtered air outlet for directing filtered air from the device; an internal chassis having a face plate including an input air inlet for directing input air into the filter module and a fan plenum attachment seat for securing the filter module to a fan plenum assembly; at least two primary filter media, wherein the at least two primary filter media are secured to the internal chassis in a spaced apart orientation in a parallel air flow configuration; wherein the internal chassis is positioned substantially within the external housing with the face plate sealed to the perimeter of a surface of the external housing so as to form the exterior of the filter module, with the at least two primary filter media located within the filter module so as to separate an input air flow region from a filtered air flow region within the filter module; and wherein an input, turbulent air flow region is created within the filter module in a space between the spaced apart primary filter media during use.

In certain embodiments, the primary filter media may be pleated composite primary filter media that are over-molded into a structural frame, and the structural frame is secured to the internal chassis.

In yet other embodiments, the internal chassis further comprises an input air flow path seal opposite the input air inlet, and opposed side walls, each having one or more filter media retention features that secure the at least two primary filter media to the side walls of the internal chassis; and wherein the input, turbulent air flow region is created within the filter module in a space between the chassis input air inlet, the chassis input air flow path seal, the chassis opposed side walls, and the spaced apart primary filter media during use.

These and other aspects of the invention are evident in the drawings and in the description that follows.

BRIEF DESCRIPTION OF THE DRAWINGS

FIG. 7A shows a perspective top view of an exemplary secondary media. FIG. 7B shows a perspective bottom view of an exemplary media. FIG. 7C shows a cross section of the exemplary secondary media of FIGS. 7A-7B, and FIG. 7D shows a detail of the exemplary secondary media.

FIG. 13A-13B illustrates a fan plenum assembly, in accordance with embodiments of the disclosure. FIG. 13A shows a front view of a fan plenum assembly, while FIG. 13B shows a cross section of a fan plenum seal of the fan plenum assembly of FIG. 13A.

FIG. 16 illustrates a fan plenum assembly with an air flow path diffuser, in accordance with embodiments of the disclosure.

FIG. 17A shows a perspective view of a pre-filter media, while FIG. 17B shows a detail cross-section of the pre-filter media.

FIG. 26A shows a cross section of the internal chassis secured to primary filter media, while FIG. 26B shows a detail cross-section of an exemplary seal between the primary filter media and the internal chassis.

FIG. 30A-30D illustrate an exemplary primary filter media, in accordance with embodiments of the disclosure. FIG. 30A shows a top view of a primary filter media, FIG. 30B shows a cross-section of the filter media along the direction of the filter media pleating, FIG. 30C shows a cross-section of the primary filter media across the direction of the filter media pleating, and FIG. 30D shows a detail cross-section of the primary filter media.

DETAILED DESCRIPTION

Figure 1:
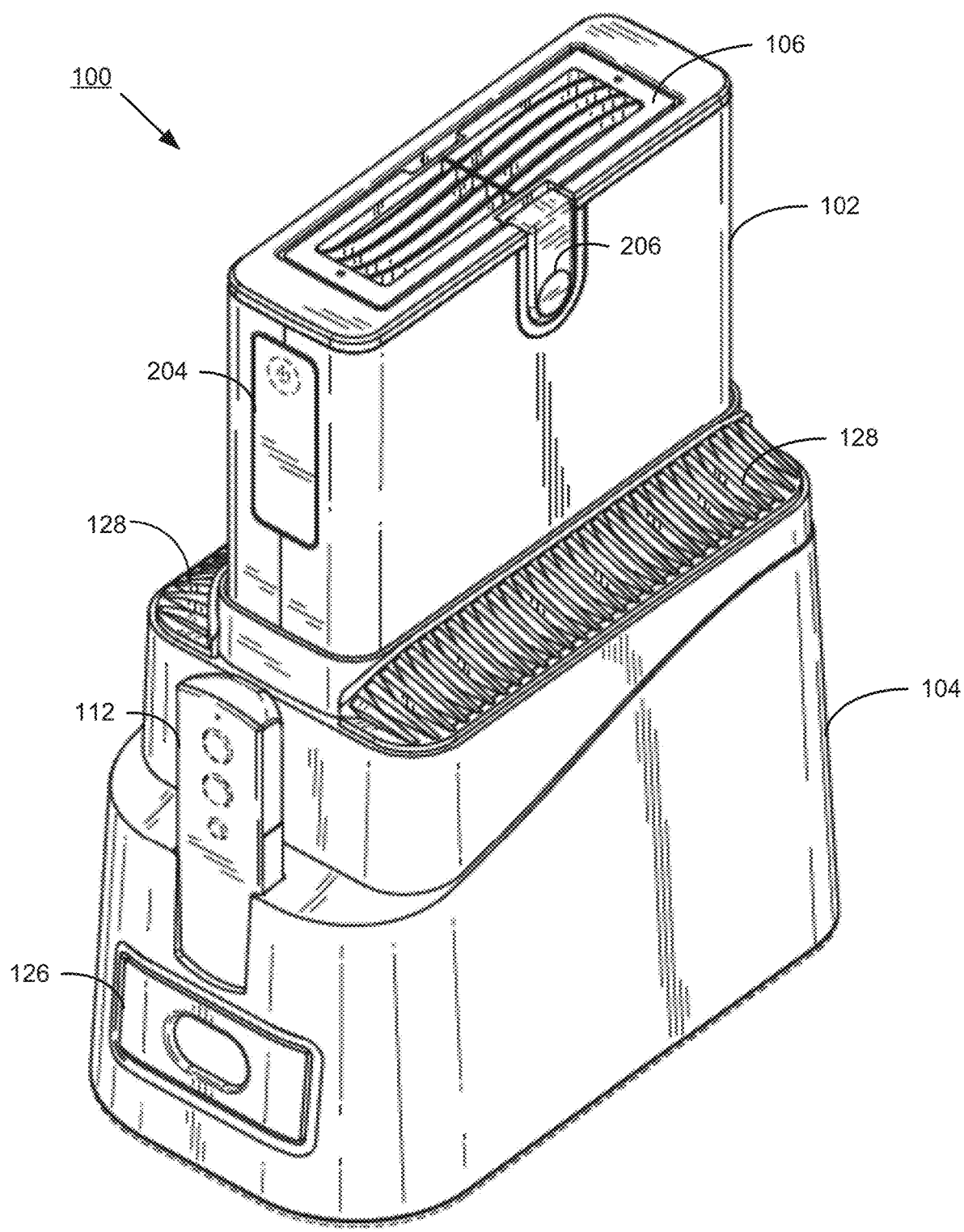
FIG. 1 illustrates a perspective view of an exemplary air filtration system with a portable air filtration device inserted into a docking base, in accordance with embodiments of the disclosure.

The present disclosure generally relates to an air filtration system, an air filtration device, and an air filtration module for removing ultra-fine particles (UFPs), pathogens (e.g., viruses, bacteria, etc.), volatile organic compounds (VOCs), oxides, odors, and the like.

In certain aspects, an air filtration system is provided that includes a docking base for receiving a removable, portable air filtration device in fluid communication with the docking base. During use, the portable air filtration device may be removably docked in the docking base in fluid communication with the docking base, and the air filtration device may operate to generate air flow into and through the docking base, into the air filtration device, and through a filter module housed within the air filtration device to thereby produce filtered air, which exits from the docked air filtration device.

In certain aspects, the air filtration system generally comprises a docking base including a docking opening for receiving a portable air filtration device in fluid communication with the docking base; one or more unfiltered air inlets for directing unfiltered air to a portable air filtration device when docked in the docking opening; an air outlet for directing air into a portable air filtration device when docked in the docking opening; a removable secondary media retention feature (optionally including secondary media); and one or more sound dampening features to reduce air flow noise and/or vibrational noise during use.

The portable air filtration device may include a device housing including an external air intake for directing unfiltered air into the device; a filter module disposed within the housing; a fan plenum assembly including at least one fan to draw input air into the device and to generate a positive pressure air flow through the device; wherein the fan plenum assembly is located upstream of the filter module such that input air flow is directed from the fan plenum assembly into an input, turbulent air flow region of the filter module during use.

The filter module may comprise an external housing having a filtered air outlet for directing filtered air from the device; an internal chassis having a face plate including an input air inlet for directing input air into the filter module and a fan plenum attachment seat for securing the filter module to a fan plenum assembly; at least two primary filter media, wherein the at least two primary filter media are secured to the internal chassis in a spaced apart orientation in a parallel air flow configuration; wherein the internal chassis is positioned substantially within the external housing with the face plate sealed to the perimeter of a surface of the external housing so as to form the exterior of the filter module, with the at least two primary filter media located within the filter module so as to separate an input air flow region from a filtered air flow region within the filter module; and wherein an input, turbulent air flow region is created within the filter module in a space between the spaced apart primary filter media during use.

The systems, devices, and filter modules of the disclosure perform at enhanced filter and power efficiencies. Without intending to be limited by theory, the systems and devices described herein generally utilize a low face velocity of less than or equal to 5 cm/s at the surface of the filtration media (i.e., particle velocity at the surface of the filtration media) to achieve desired filtration efficiencies.

In certain embodiments, the devices and systems of the disclosure provide a particle velocity at the surface of a primary filter component(s) (face velocity) less than or equal to 5 cm/s, 4 cm/s, 3 cm/s, 2 cm/s, or 1 cm/s. In certain aspects, at such face velocities, with the filtration module described herein, the collection efficiency for the filtration media of the filtration module is greater than 99.99%, 99.999%, 99.999%, 99.9999%, or 99.99999%, which greatly out performs HEPA filters known in the art. Further, in certain embodiments, using a face velocity less than or equal to 5 cm/s, 4 cm/s, 3 cm/s, 2 cm/s, or 1 cm/s, also produces a lower pressure drop across the filtration module, as compared to using a higher face velocity, e.g., greater than 5 cm/s, which is beneficial for overall system efficiency (e.g., less demanding for the blower/fan(s)).

Figure 2:
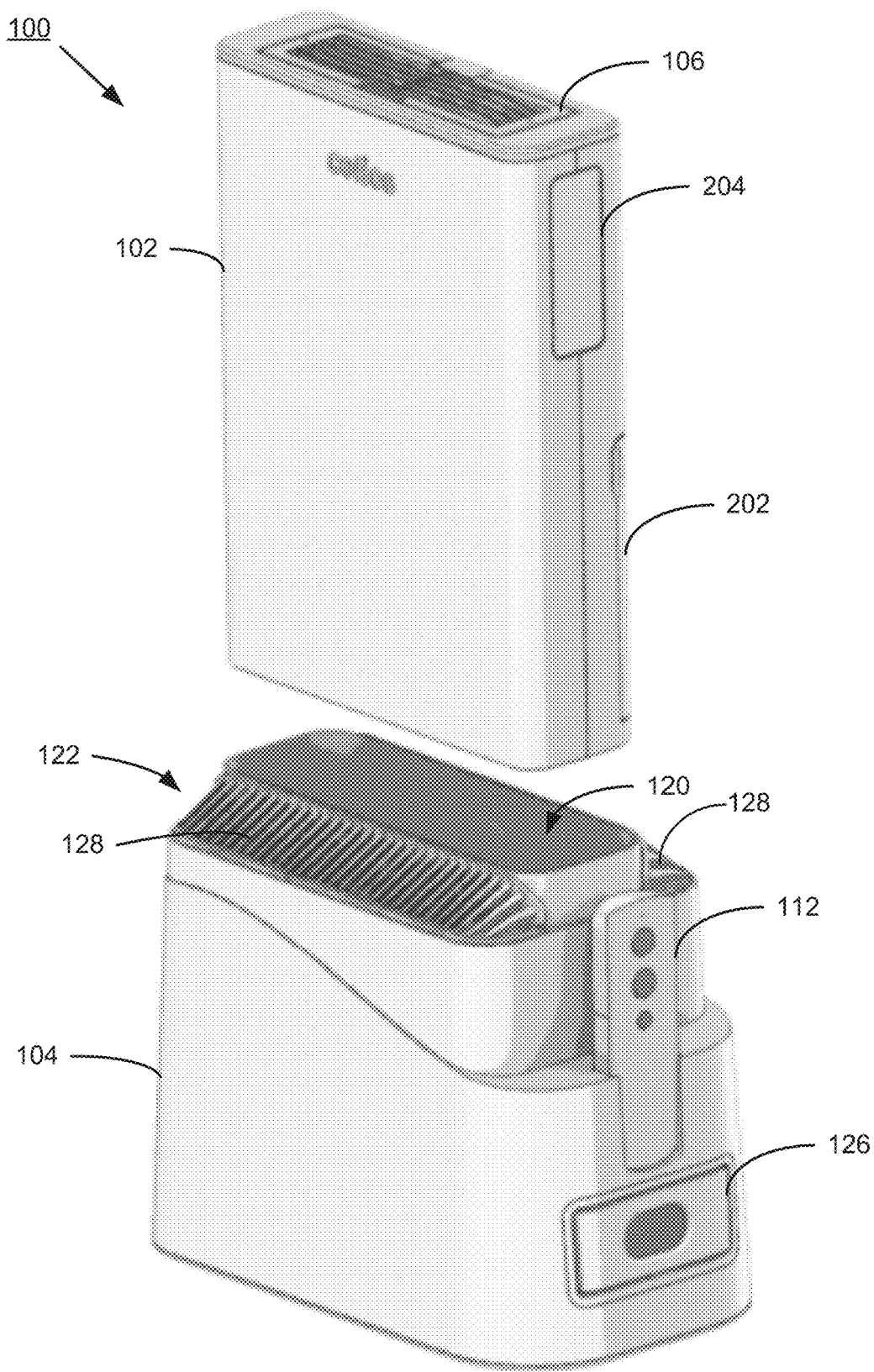
FIG. 2 illustrates a perspective view of an exemplary air filtration system with a portable air filtration device removed from a docking base, in accordance with embodiments of the disclosure.
Figure 3:
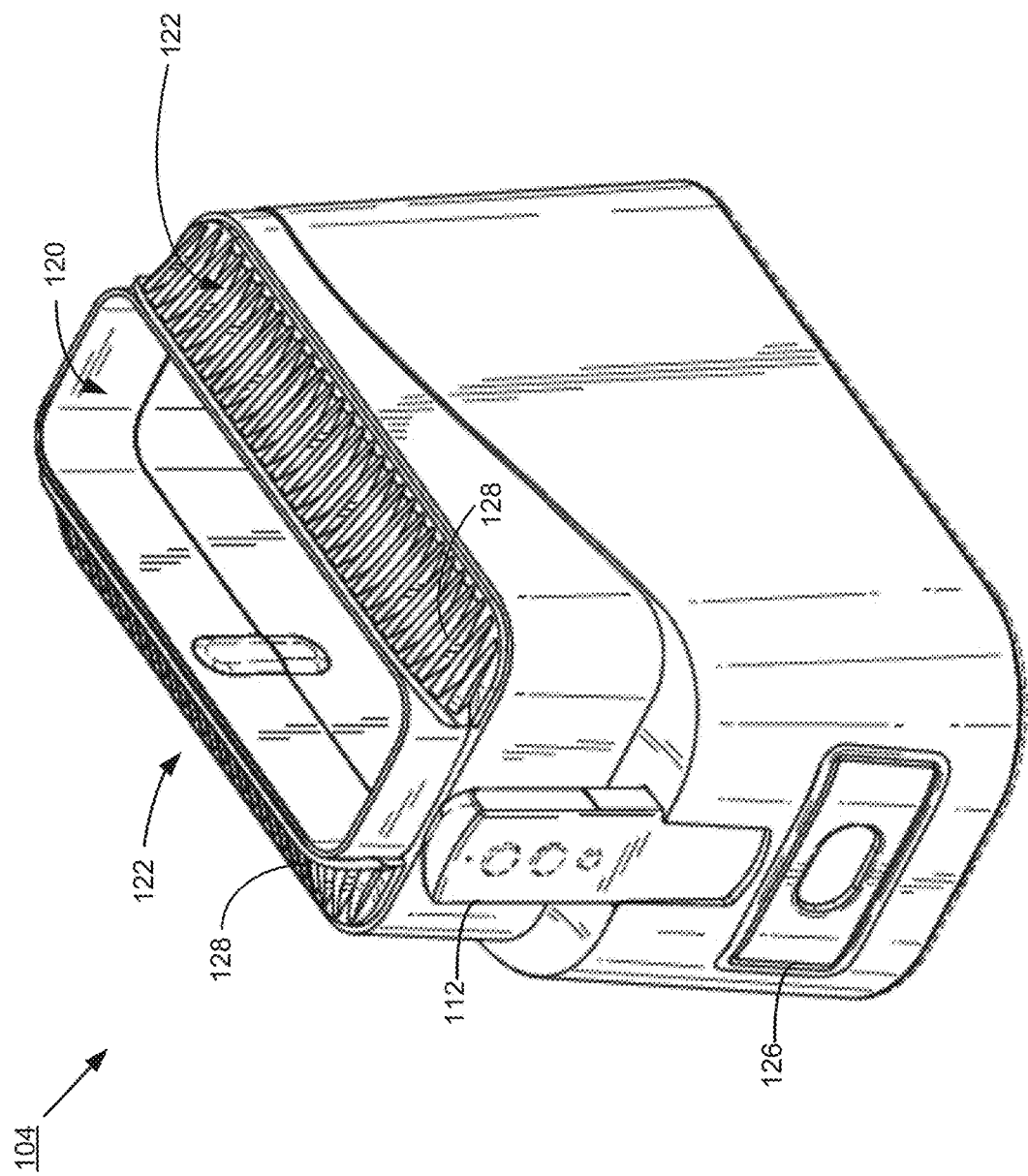
FIG. 3 illustrates a perspective view of an exemplary air filtration system having a docking base with no portable air filtration system docked, in accordance with embodiments of the disclosure.

Aspects of the present disclosure generally relate to an air filtration system for removing ultra-fine particles (UFPs), pathogens (e.g., viruses, bacteria, etc.), volatile organic compounds (VOCs), oxides or odors. With reference to FIG. 1, in one embodiment, an air filtration system 100 of the disclosure includes a docking base 104 for receiving a removable, portable air filtration device 102 in fluid communication with the docking base 104. In certain embodiments, the air filtration system 100 further includes the removable, portable air filtration device 102. The portable air filtration device 102 may optionally include an air filtration module 106 of the disclosure. In this regard, FIG. 2 illustrates a portable air filtration device 102 removed from docking base 104, and FIG. 3 illustrates docking base 104 without portable air filtration device 102. During use, a portable air filtration device 102 may be removably docked in the docking base 104, and the air filtration device 102 may operate to generate a positive pressure air flow through the docking base 104, into the air filtration device 102, and through a filter module 106 housed within the air filtration device 102. In one implementation, the filtration device 102 achieves extremely high filter efficiencies of at least 99.9999% at low face velocities less than or equal to 5 cm/s. At such face velocities, the filtration device 102 has a filter efficiency of 99.99999% for particles below 300 nm, as well as pathogens of similar size.

Figure 4:
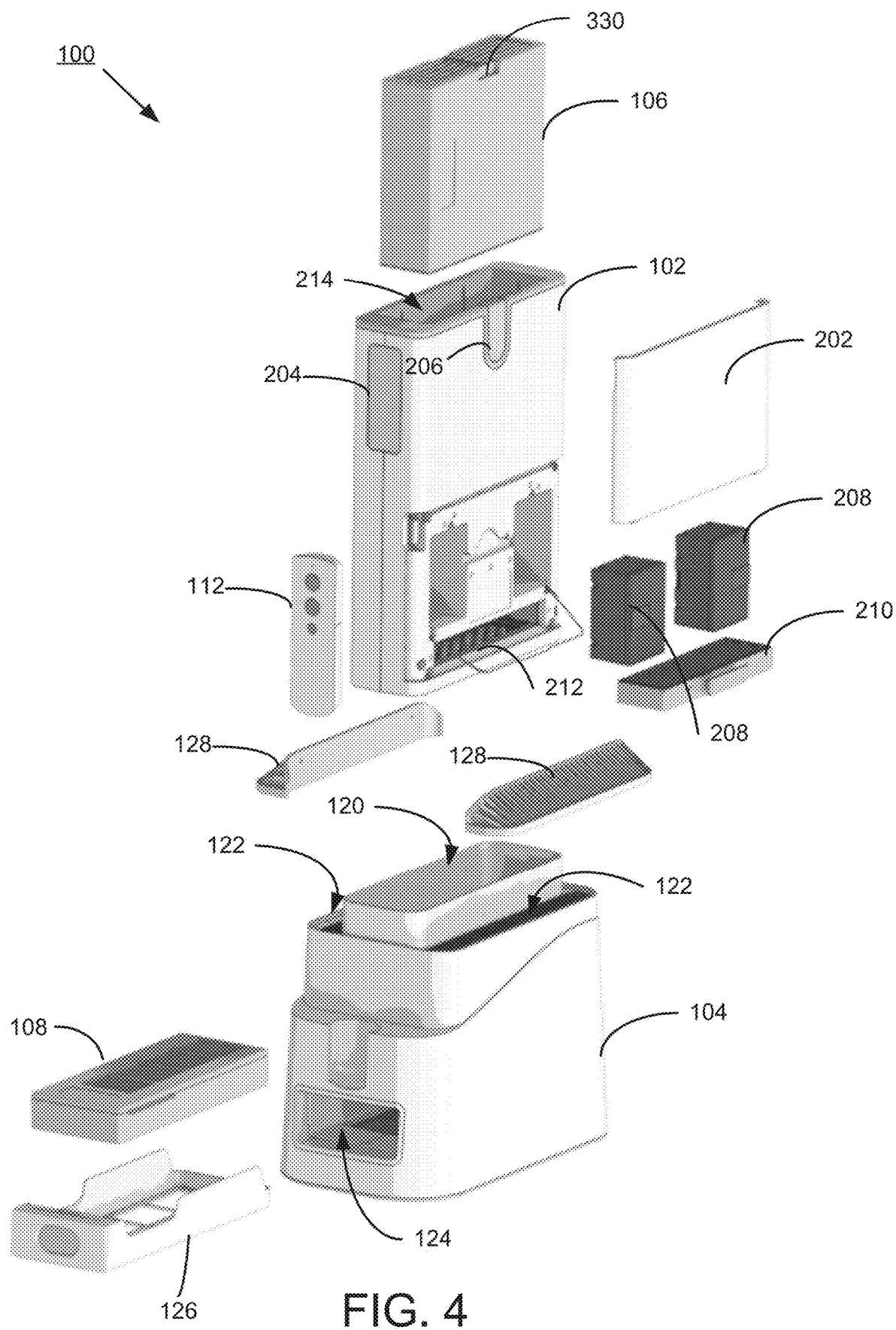
FIG. 4 illustrates an exploded view of an exemplary air filtration system, in accordance with embodiments of the disclosure.
Figure 5:
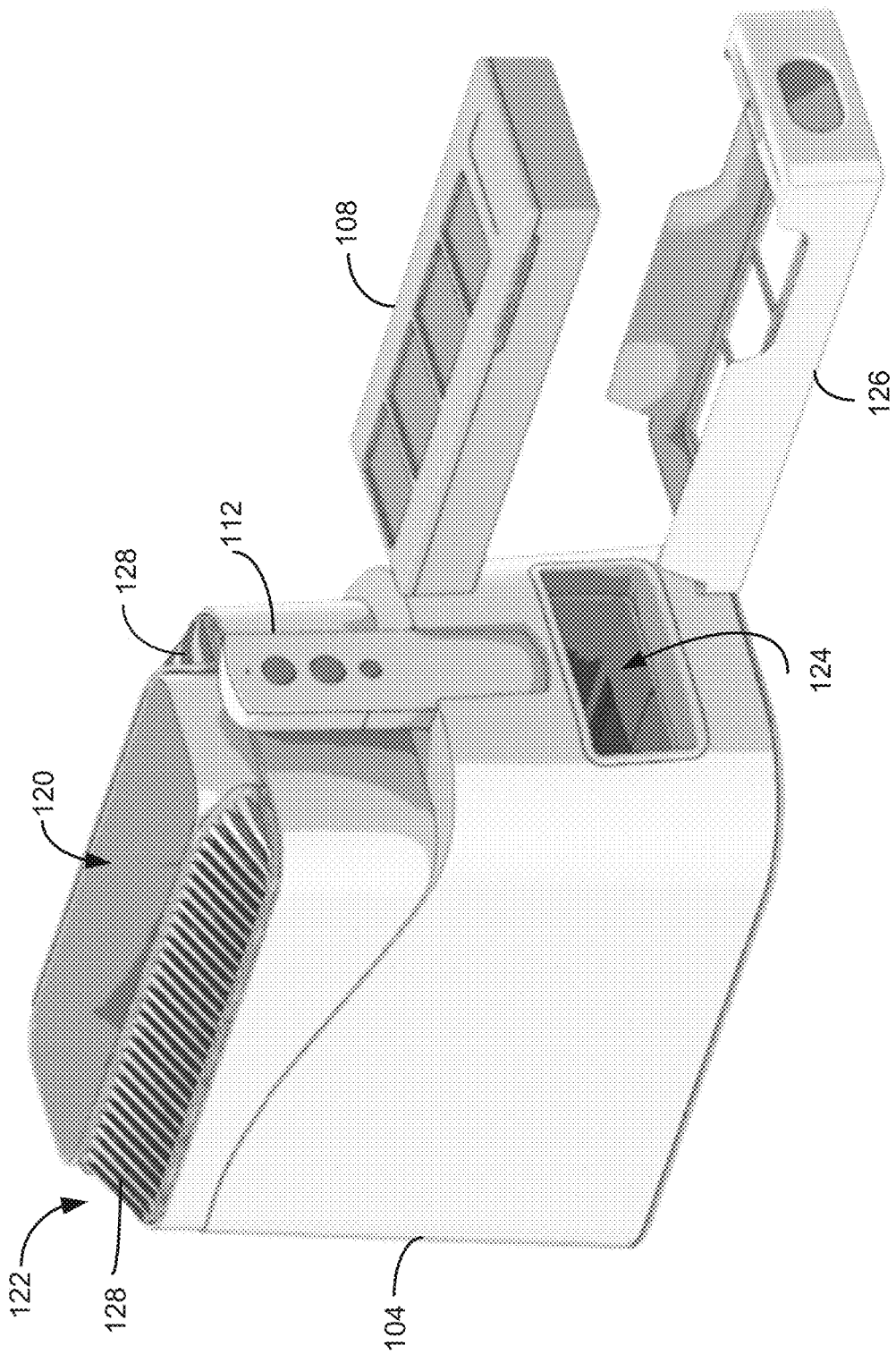
FIG. 5 illustrates a perspective view of an exemplary air filtration system having a docking base with no portable air filtration system docked and the secondary media retention feature and secondary media removed, in accordance with embodiments of the disclosure.

With reference to FIG. 4, in certain embodiments, the docking base 104 includes a docking opening 120 for receiving a removable, portable air filtration device 102; one or more unfiltered air inlets 122 for directing unfiltered air to a removable, portable air filtration device 102 when docked in the docking opening 120; an air outlet 124 for directing air into a removable, portable air filtration device 102 when docked in the docking opening; a removable, secondary media retention feature 126; and one or more sound dampening features (not shown) to reduce air flow noise and/or vibrational noise during use. The docking base may further include a power charging port (not shown) in electrical communication with a portable air filtration device 102 when docked, and an air entry mesh 128 at each of the one or more unfiltered air inlets 122 to remove large particulates from unfiltered air drawn into the docking base 104 during use. FIG. 5 illustrates the secondary media retention 126 with secondary filter media 108 removed from the docking base 104.

In certain embodiments, air enters into the docking base 104 initially through the air entry mesh 128 at each of the unfiltered air inlets 122. Although illustrated with the air entry mesh 128 at each of the unfiltered air inlets 122 disposed at each side of the docking base 104, the disclosure is not so limited and alternative configuration and orientations are within the scope of the disclosure. For instance, unfiltered air inlets 122 and related air entry mesh 128 may be configured at the front and back or along the side walls of the docking base 104. In one implementation, air entry meshes 128 are separate components which are attached to the docking base 104. In another implementation, air entry meshes 128 are integrated into the docking base 104 as a unitary component. Air entry meshes 128 may be constructed from a light-weight, durable material.

Air entry meshes 128 serve as an initial entry port for input air to enter the docking base 104 and thereby the air filtration system 100, and is therefore also a region of large particle filtration. The openings of the air entry mesh 128 are sized and spaced such that each of the openings are large enough to reduce resistance to air being drawn into the docking base 104 and small enough to prevent very large particles from entering the docking base 104. In one implementation, the openings in the air entry mesh 128 are generally slat shaped openings of a finite width and length arranged in parallel. The parallel arrangement of the openings allows for a linear reduction in flow resistance that is directly related to the number of openings without sacrificing the minimum opening dimension, which in turn governs the size of particles that are allowed to pass through the openings.

Figure 6:
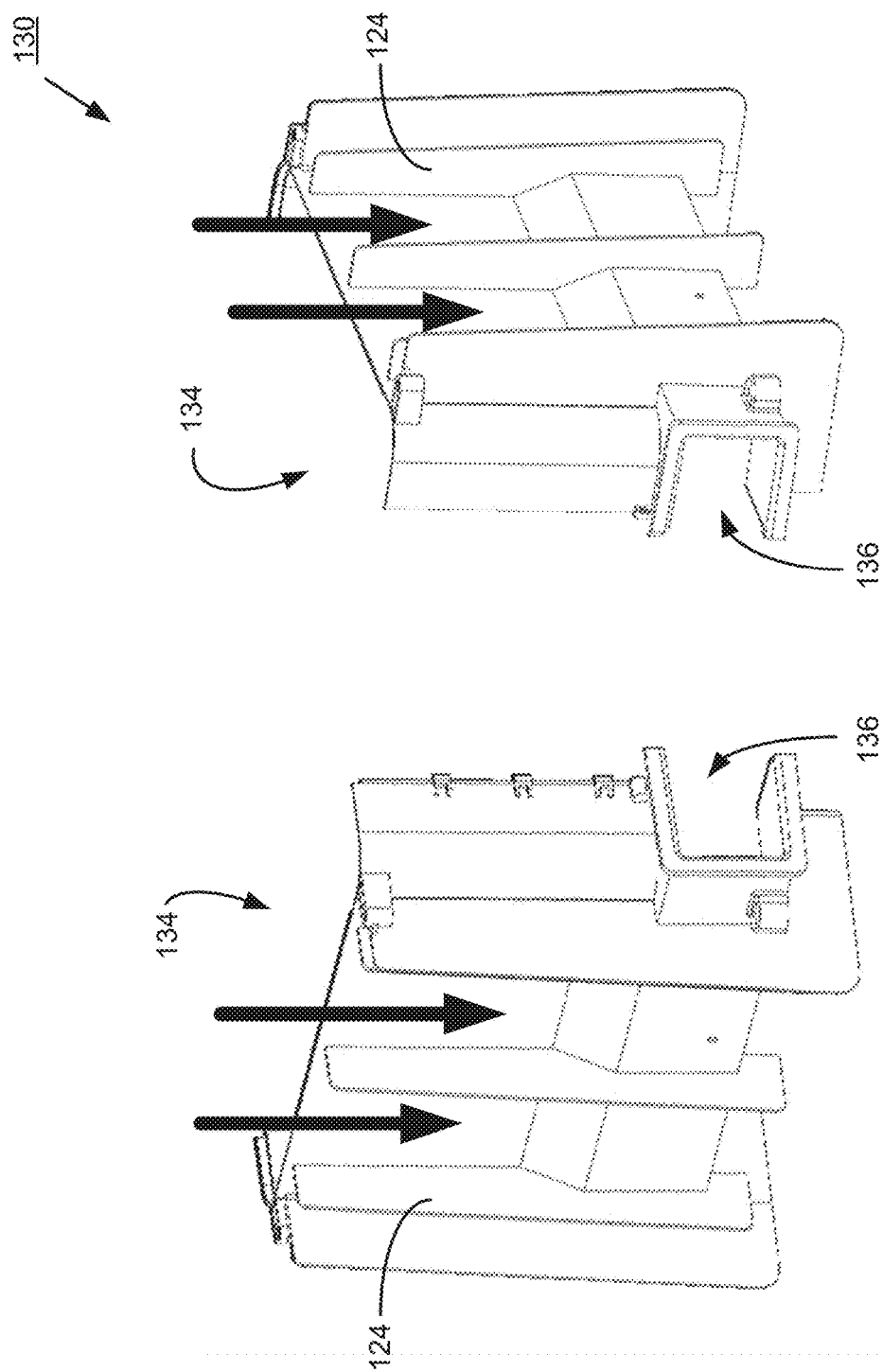
FIG. 6 illustrates an exploded perspective view of an interior frame of a docking base, in accordance with embodiments of the disclosure.

With reference to FIG. 6, in certain embodiments, the docking base 102 may be configured to form one or more air flow paths between the unfiltered air inlets and the air outlet. By way of example, the docking base 102 may be configured to include an interior docking frame 130 that includes the one or more air flow paths located between the docking opening 120 for receiving a portable air filtration device 102 and the exterior of the docking base 104. The air flow paths may be formed between one more baffles 132 or similar flow direction surfaces. The interior docking frame 130 may also be configured to include one or more openings 134, 136 to accommodate the portable air filtration device, the secondary filter retention feature, respectively. The air flow paths may direct air from the unfiltered air inlet inlets into the docking base, under the secondary filter media (if present) and into the portable air filtration device. In certain embodiments, the one or more air flow paths may form non-turbulent air flow paths (e.g., transitional or laminar air flow paths). In certain embodiments, the sound dampening features (not shown) may be located along or adjacent to the air flow paths, at the bottom of the docking base, or a combination thereof.

In certain embodiments, the removable, secondary media retention feature 126 may be located in the air flow path between the unfiltered air inlets 122 and the air outlet 124. By way of example, the removable, secondary media retention feature 126 may be configured in any suitable manner, e.g., as a clip-on frame, a slide-in frame, etc. In certain aspects, the docking base 104 may further comprises a secondary media 108 housed in the removable secondary media retention feature 126. The secondary media retention feature 126 and secondary media 108 may be configured to provide a desired air flow residence time through the secondary media 108 during use, e.g., so as to maximize filtering efficiency of the secondary media 108.

In certain embodiments, the secondary media 108 may comprise an activated carbon media to remove volatile organic compound (VOCs), oxides, odors, and combinations thereof. By way of example, the activated carbon media be comprised of at least two electrostatically charged scrim layers enclosing granulated activated carbon. In certain embodiments, between 150 grams to about 175 grams, preferably about 160 grams of the granulated activated carbon is enclosed within the electrostatically charged scrim layers of the activated carbon media. By way of example, the granulated activated carbon may be a 12×40 standard sieve size coconut shell activated carbon, a 6×12 standard sieve size coconut shell activated carbon, or a 4×8 standard sieve size coconut shell activated carbon. In other embodiments, the secondary media 108 may comprise a pleated composite primary filter media that is over-molded into a structural frame.

Figure 7A:
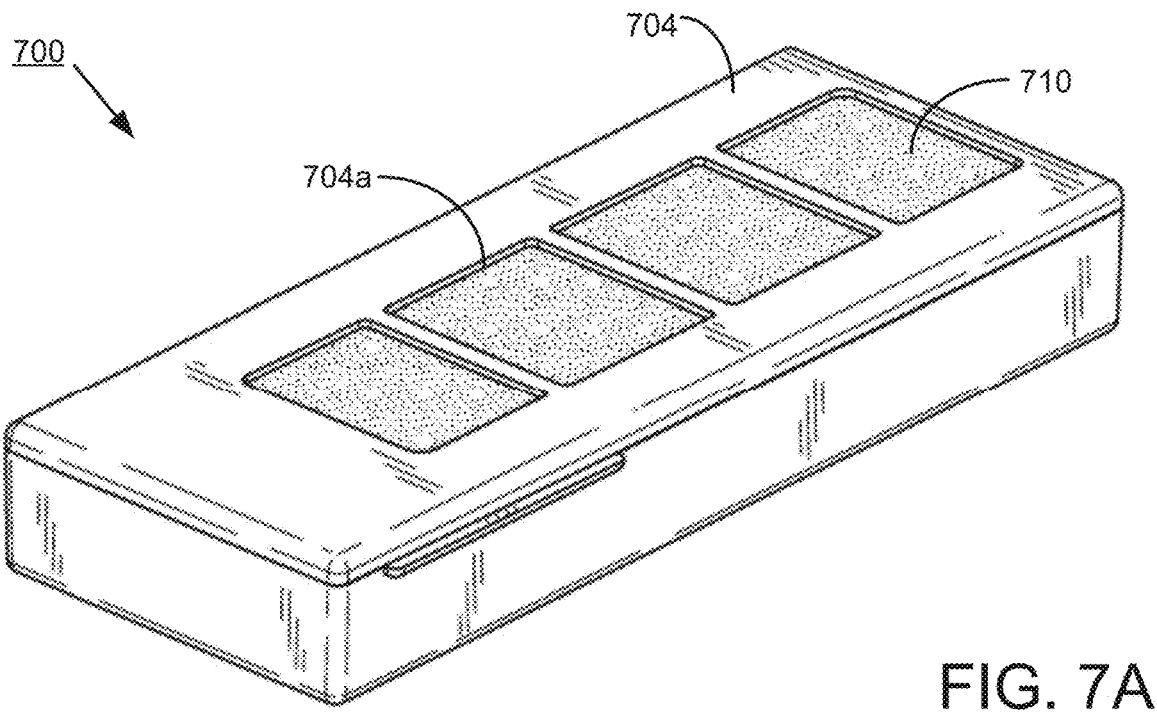
FIGS. 7A-7D illustrate exemplary secondary media, in accordance with embodiments of the disclosure.
Figure 7B:
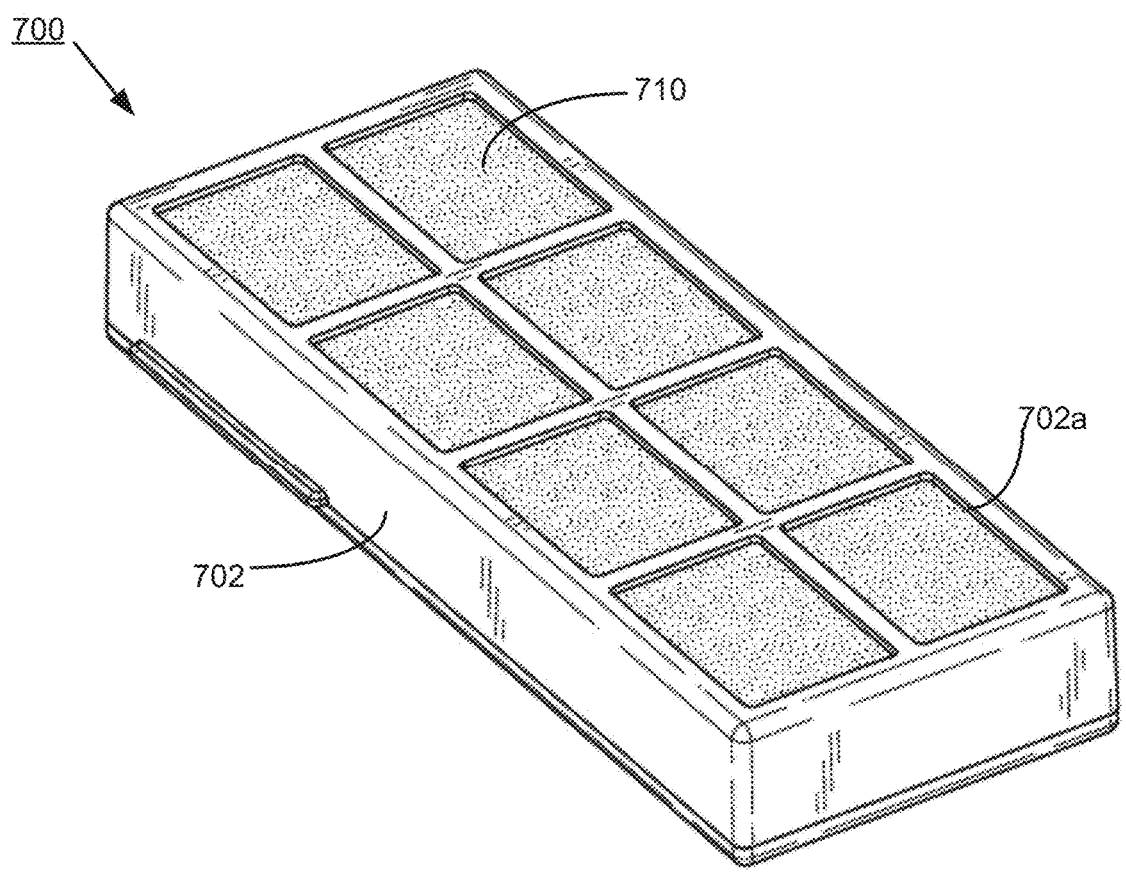
Figure 7C:
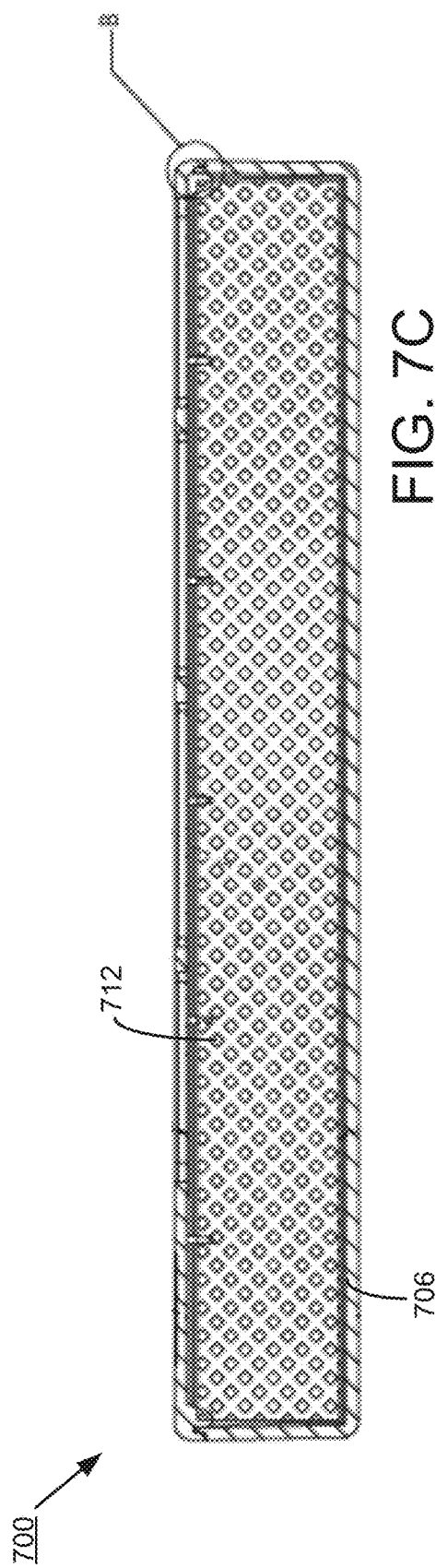
Figure 7D:
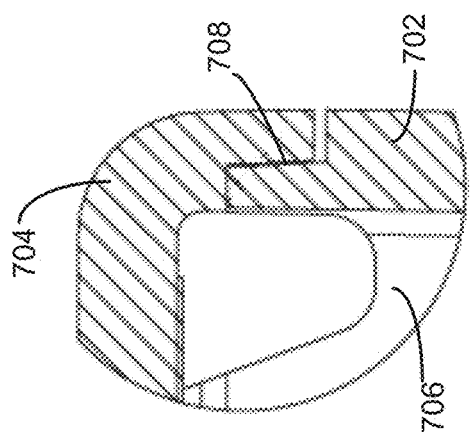

With reference to FIGS. 7A-7D, an exemplary embodiment of a secondary media filter 700 is illustrated, with FIG. 7A showing a top view, FIG. 7B showing a bottom view, and FIG. 7C showing a cross-section of the secondary media filter 700. The secondary media filter 700 includes a bottom container 702 and a lid 704. With reference to FIG. 7D, a detail of the interface between the top lid 704 and the bottom container 704 is illustrated, showing the top lid 704 and bottom container 702 being bonded together at connection features 708 to form an internal media enclosure 706. Any suitable method for bonding the top lid 704 to the bottom container 702 may be used, including, e.g., ultrasonic welding, thermal bonding, adhesives, etc. Each of the bottom container 702 and top lid 704 comprise multiple air flow openings 702a, 704a, respectively, to allow air flow through an internal media enclosure 706. As illustrated, the top lid 704 includes four air flow openings 704a, and the bottom container 702 includes eight air flow openings 702a. However, the disclosure is not so limited, and any suitable air flow opening configuration, e.g., having more or fewer air flow openings, sufficient to provide desired airflow and filter media residence time may be utilized. By way of example, in the embodiment exemplified, each air flow opening is covered with a scrim layer 710 that allows for air flow through the opening. In certain embodiments, the scrim layer is an electrostatically charged scrim layer, e.g., nonwoven scrim substrate. The internal media enclosure comprises activated carbon filtration media 712.

In certain embodiments, the air filtration system 100 optionally includes a user control device 112. The user device 112 is in communication with the portable filtration device 102 for controlling the operations of the filtration device 102. The user device 112 is generally any form of computing device, such as remote control, a mobile device, tablet, personal computer, multimedia console, set top box, or the like, capable of interacting with the filtration device 102. The user device 112 may communicate with the filtration device 102 via a wired (e.g., Universal Serial Bus (USB) cable) and/or wireless (e.g., Bluetooth or WiFi) connection. In addition to controlling the operation of the filtration device 102, the user device 112 may be used to monitor the performance of the filtration device 102, including filter and collection efficiency, power consumption, system pressure, air flow rates, and the like. The user device 112 further provides real time information on power level, fan speed, filter life, and pressure alarm.

Docking base 104 may be constructed from a lightweight, durable material. By way of non-limiting example, suitable materials for construction of docking base 104 may include anodized aluminum, titanium, titanium alloys, aluminum alloys, fibrecore stainless steel, carbon fiber, Kevlar™, polycarbonate, acrylonitrile-butadiene-styrene (ABS), polyurethane, or any combination of the mentioned materials. The sound dampening features may be formed from any suitable materials known in the art for such purposes, e.g., polyurethane foam, silicone, cotton fiber, etc.

In other aspects, the present disclosure relates to a portable air filtration device 102, which may be used independently or in connection with the air filtration system 100 disclosed herein. In certain embodiments, the portable air filtration device 102 may be configured to interface in fluid communication with the docking stand 104 of the air filtration system 100 disclosed herein. Alternatively, the portable air filtration device 102 may operate in a "stand-alone" configuration without the docking stand of the air filtration system. In yet other embodiment, the portable air filtration device 102 may interface with alternative docking stands (not shown). In yet other embodiments, the portable air filtration device 102 may interface in fluid communication with face masks, air-flow hoses, or breathing tubes of power-assisted air purifying (PAAP) respirators, continuous positive airway pressure (CPAP) machines, bi-level positive airway pressure (BiPAP) machines, and/or ventilators (not shown).

Figure 8:
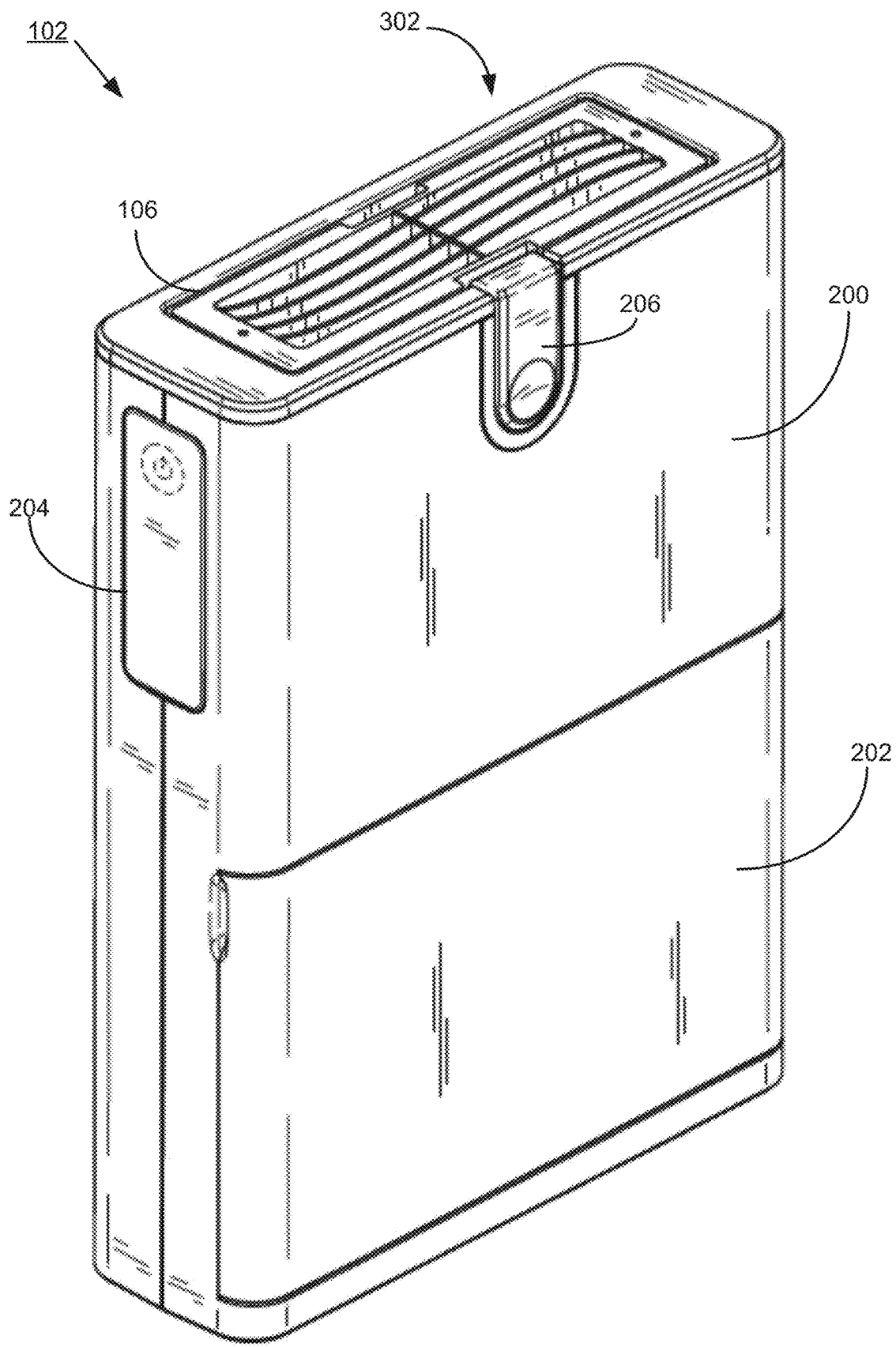
FIG. 8 illustrates a perspective view of an exemplary portable air filtration device with a filter module inserted, in accordance with embodiments of the disclosure.

With reference to FIGS. 4 and 8, in certain embodiments, the portable air filtration device 102 includes a device housing 200 including an external air intake 216 for directing input air into the filtration device 102. The filtration device 102 also includes a fan plenum assembly 218 disposed within the device housing 200 and including at least one fan 220 to draw input air into the filtration device 102 and to generate a positive pressure air flow through the filtration device 102 (see FIG. 15). As described herein, the filtration device 102 may also include a filter module 106 disposed within the device housing 200. The filter module 106 may include an external filter module housing 300 having a filtered air outlet 302 for directing filtered air from the filtration device 102, an internal chassis 304 for securing at least two primary filter media 306, and a fan plenum attachment seat 308 for securing the filter module 106 to the fan plenum assembly 218 (see FIG. 19). In certain embodiments, the fan plenum assembly 218 is located upstream of the filter module 106 within the device housing 200 such that input air flow is directed from the fan plenum assembly 218 into the filter module 106 during use.

In certain embodiments, the filtration device 102 includes a device housing 200 to enclose the internal components of the filtration device 102. In one implementation, device housing 200 includes a removable cover 202 which, when attached or affixed to the housing encases the internal components of the filtration device 102. For instance, removable cover 202 may be used to access compartments holding internal components such as pre-filter 210, one or more power source(s) 208, etc. It will be appreciated, however, that more or fewer covers may be included for accessing a variety of different internal components. While the removable cover 202 as illustrated extends the entire length of one side of housing 200, the disclosure is not so limited.

Device housing 200 may also include a user control interface 204 for providing operation of the device. In certain embodiments, the housing 200 may also include one or more filtration module releasable securing features 206, for releasably securing the filtration module to the filtration device housing. By way of non-limiting example, such releasable securing features may be configured as a clip, snap, slide, set screw, or similar releasable fixing element. In certain embodiments, the external filter module housing 300 may include one or more housing retention features 330 that may be sized and shaped so as to interface with filtration module releasable securing features 206.

Figure 9:
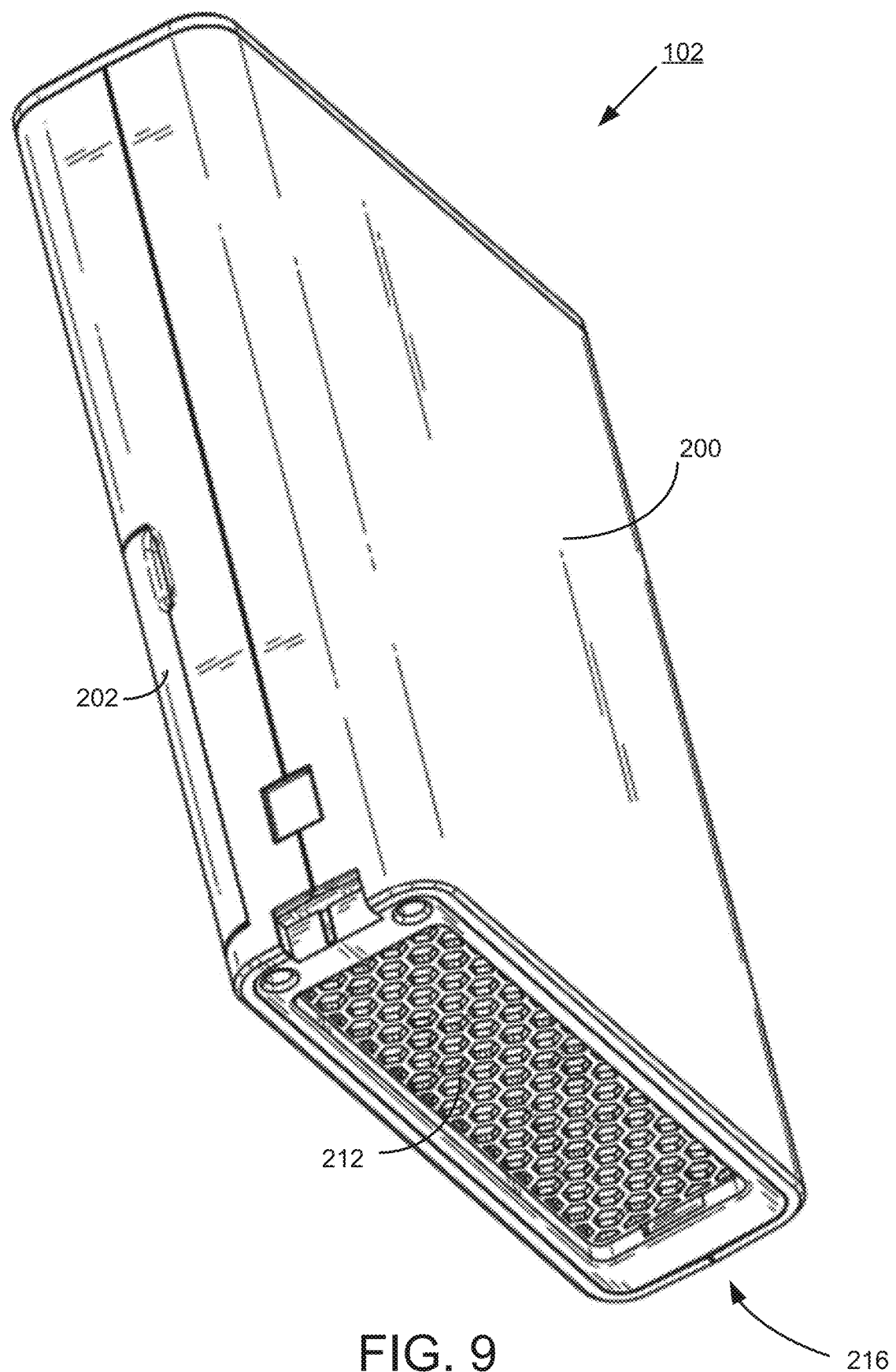
FIG. 9 illustrates a bottom perspective view of the portable air filtration device of FIG. 8, in accordance with embodiments of the disclosure.

With reference to FIG. 9, a perspective bottom view of the filtration device 102 is shown. In certain embodiments, air enters into the filtration device 102 initially through the air entry mesh 212 attached or integrated at the bottom of the housing 200. In some embodiments, the bottom of housing 200 includes an opening or other type of access port to allow for attachment/integration of an air entry mesh 212. Although illustrated with the air entry mesh 212 disposed at the bottom of the housing 200, the disclosure is not so limited and alternative configuration and orientations are within the scope of the disclosure. For instance, the air entry mesh 212 may be configured on any of the other walls of housing 200. In one implementation, the air entry mesh 212 is a separate component which is attached to the housing 200. In another implementation, the air entry mesh 212 is integrated into the housing 200 as a unitary component. The air entry mesh 212 may be constructed from a light-weight, durable material.

The air entry mesh 212 serves as an initial entry port for input air to enter the filtration device 102 and is therefore also a region of large particle filtration. The openings of the air entry mesh 212 are sized and spaced such that each of the openings are large enough to reduce resistance to air being drawn into the filtration device 102 and small enough to prevent very large particles from entering the filtration device 102. In one implementation, the openings in the air entry mesh 212 are generally openings having a defined shape (e.g., cylinders, pentagons, hexagons, octagons, etc.) of a finite thickness and diameter arranged in parallel. The parallel arrangement of the openings allows for a linear reduction in flow resistance that is directly related to the number of openings without sacrificing the minimum opening dimension, which in turn governs the size of particles that are allowed to pass through the openings.

In particular embodiments, the openings have a diameter ranging from approximately 1.1 mm to approximately 2.2 mm, preferably from approximately 1.3 mm to approximately 1.6 mm, e.g., approximately 1.4 mm, approximately 1.5 mm, etc. In certain embodiments, the openings have a pitch between holes of approximately 2.2 mm to approximately 2.6 mm, preferably approximately 2.25 mm to approximately 2.4 mm. It will be appreciated that these dimensions are exemplary only and the openings may include larger or smaller dimensions.

As described herein, in addition to superior filtration efficiency, the filtration device 102 achieves reduced power consumption. Without intending to be limited by theory, generally, the functionality of a filter over time has a direct effect on the performance and efficiency of a power source 208. For instance, as a filter is loaded with particles the overall resistance of the filter is increased. When the filter resistance increases, it requires more energy output from the power source 208 to drive the fans 220 at the flow rate/face velocity set in the unloaded state. As such, in some embodiments, the air filtration system 100 and/or filtration device 102 includes secondary filters 108 and/or pre-filters 210 to extend the life of the filter module 106 and to reduce power consumption.

The power source 208 may utilize, without limitation, direct current (DC), alternating current (AC), solar power, battery power, and/or the like. In one particular implementation, the power source 208 includes one or more lithium ion batteries that are rechargeable with a DC 15V power adapter. In certain embodiments, the docking base 104 may include a charging port and electrical communication to facilitate charging of the power source 208, the filtration device 102 may including a charging port and electrical communication to facilitate charging of the power source 208, or any combination thereof. In certain embodiments, the batteries of the power source 208 are hot swappable during operation of the filtration device 102. For example, during use, if one or more of the batteries are low, the batteries may be can replaced individually without ever turning the filtration device 102 off.

In certain embodiments, the controller manages the power consumption of the filtration device 102 by controlling the charging and discharging of the one or more power sources 208. In certain aspects, the controller may receive an input from the user device 112 and/or controls on the filtration device 102 and in response, may activate the one or more fans 220 to provide airflow through the filtration device 102 at various flow rates. In one embodiment, the user device 112 communicates with the filtration device 102 via a wired connection or wireless connection. The controller may also alter the speed of the fans 220 according to the charge level of the power sources 208 and may convert a provided input power through a power connector to an appropriate charging voltage and current for the power sources 208. The controller further manages other operations of the filtration device 102. For example, the controller may manage status light emitting diodes (LEDs) that indicate the current operational mode of the filtration device 102, the operation of one or more sensors, and the like. The LEDs may indicate when the filters and/or other components need replacing.

Figure 10:
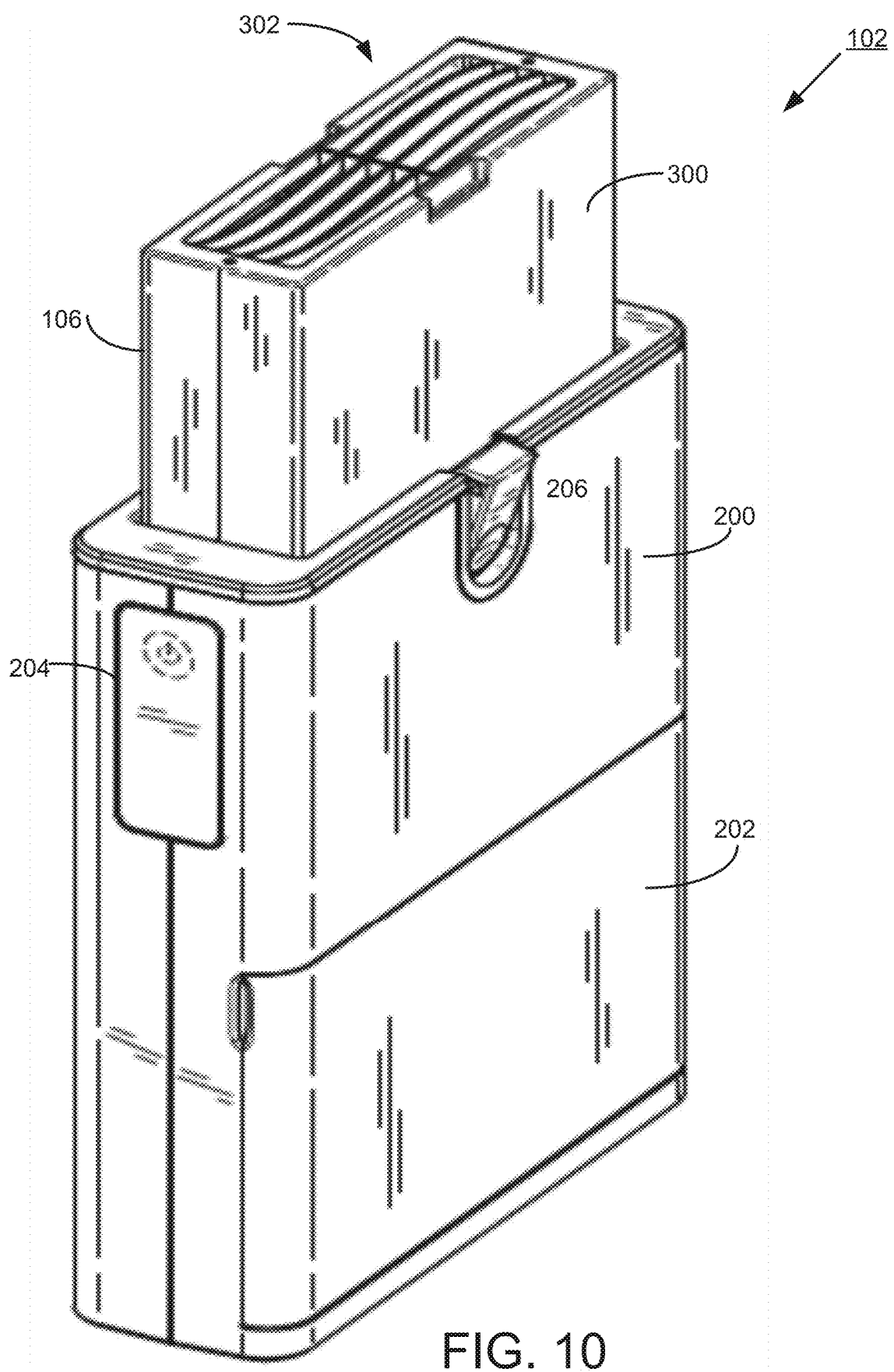
FIG. 10 illustrates a perspective view of an exemplary portable air filtration device with a filter module released from the housing of the device, in accordance with embodiments of the disclosure.
Figure 11:
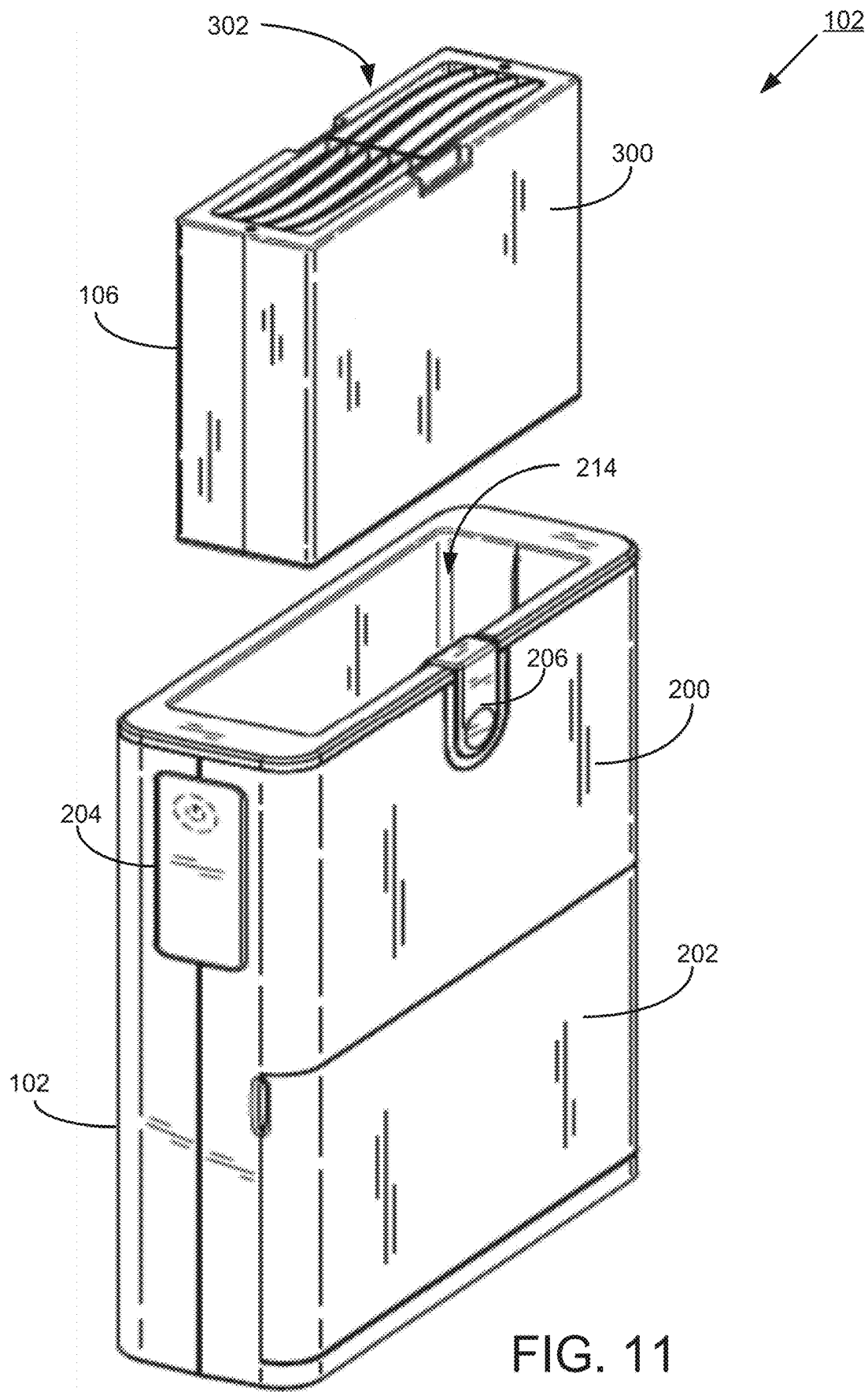
FIG. 11 illustrates a perspective view of an exemplary portable air filtration device with a filter module removed from the housing of the device, in accordance with embodiments of the disclosure.
Figure 12:
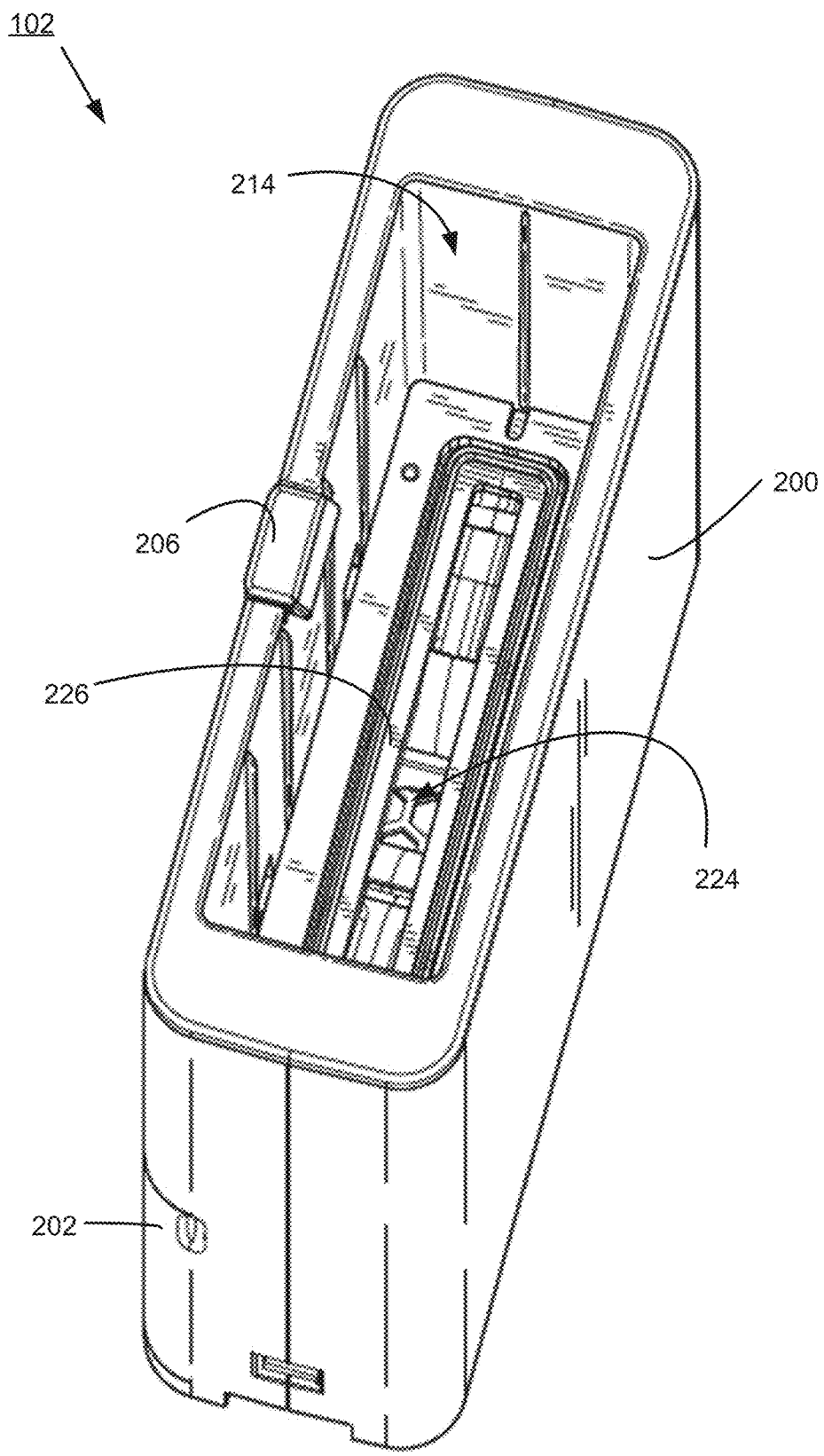
FIG. 12 illustrates a top perspective view of an exemplary portable air filtration device without a filter module in the housing of the device, in accordance with embodiments of the disclosure.

With reference to FIG. 10 and FIG. 11, in some embodiments, device housing 200 may be configured with opening 214 or other type of access port to allow for insertion of filter module 106, to allow for fluid communication between the fan plenum assembly and fan(s) (not shown), and to allow for air flow out of the filtration device 102, as described herein. FIG. 12 illustrates a perspective top view of the filtration device 102 with the filter module 106 removed to show the fan air outlet side 224 and fan plenum seal 226 of the fan plenum assembly 218, which provides for air tight securement of the fan plenum assembly 218 (and thereby the device housing 200) to the filter module 106 when the filter module 106 is inserted in opening 214 and interfaced with the fan plenum seal 226.

In certain embodiments, the filter module 106 may be removed for replacement through the opening 214 using one or more filtration module releasable securing features 206. More specifically, the filter module 106 may be spring loaded into the filtration device 102 and may be removed by pushing the filtration module releasable securing features 206 in and slightly pushing down on the filter module 106 to release the filter module 106 (FIG. 10), and the filtration module 106 may be removed from the filtration device 102 (FIG. 11).

The device housing 200 may be a variety of shapes and sizes. For example, in one particular implementation, the overall dimensions of the housing 200 range from approximately 10"×3"×8" to approximately 16"×7"×12". It will be appreciated that these dimensions are exemplary only and the housing 200 may be modified to accommodate larger or smaller dimensions. For example, by keeping the same proportions, the filtration device 102 can function properly by being reduced by a percentage between 0 and 60% of these dimensions.

The device housing 200 may be constructed from a light-weight, durable material. By way of non-limiting example, suitable materials for construction of the housing 200 include anodized aluminum, titanium, titanium alloys, aluminum alloys, fibrecore stainless steel, carbon fiber, Kevlar™, polycarbonate, acrylonitrile-butadiene-styrene (ABS), polyurethane, or any combination of the mentioned materials.

In certain aspects of the disclosure, during operation, the at least one fan 220 pulls input air through the air entry mesh 212 and into the filtration device 102 through a fan air outlet side 224. If the filtration device 102 is docked in the docking base 104, the at least one fan 220 pulls input air through the air entry mesh 128 of the docking base 104, through air flow paths of the docking base 104 (and optionally secondary filters 108), and then through the air entry mesh 212 of the filtration device 102. After entering the filtration device 102 through the air entry mesh 212, input air is drawn through optional pre-filters 210 (as described herein). Optional pre-filters 210 filter large particles that may potentially build up on and/or damage the fans 220 and/or a filter module 106.

With reference to FIG. 13A, in certain embodiments, the fan plenum assembly 218 includes a fan air intake side 222; a fan air outlet side 224; and a fan plenum seal 226 on the fan air outlet side 224 of the fan plenum assembly 218, which may be interfaced with a fan plenum attachment seat of the filter module to thereby form an air tight seal between the fan plenum assembly 218 and the filter module. The fan plenum assembly 218 may also include a fan chamber 220c, to house the one or more fans (not shown, and a pre-filter retention feature 240, sized and shaped so as to accommodate an optional pre-filter (not shown). FIG. 13B illustrates a cross-section of the fan plenum seal 226 comprising an accordion style gasket. However, the disclosure is not so limited, and any suitable sealing configuration may be utilized to form an air tight seal between the fan plenum assembly 218 and the filter module 106, e.g., O-rings, silicone gaskets, etc.

Figure 14:
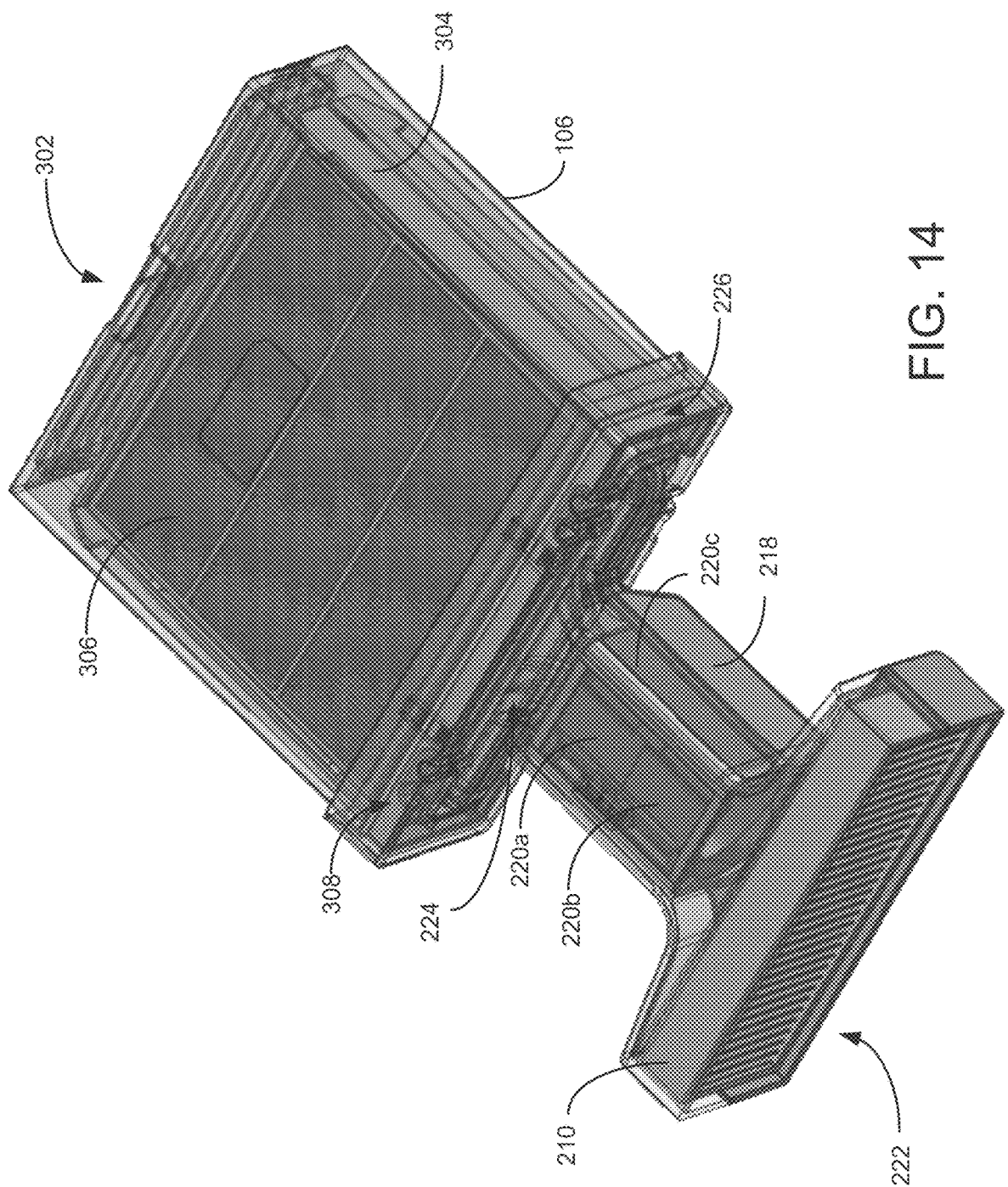
FIG. 14 illustrates a perspective view of fan plenum assembly sealed in an air tight configuration to a filter module, in accordance with embodiments of the disclosure.

With reference to FIG. 14, an exemplary embodiment is shown illustrating a filter module 106 secured in an air tight configuration to a fan plenum assembly 218. In certain embodiments, the at least one fan may comprise a plurality of serially stacked, axial fans 220a, 220b within a fan chamber 220c. Without intending to be limited by theory, as opposed to a parallel configuration (i.e., both fans disposed beside each other), the series (stacked) configuration allows the pressure output to be additive, whereas a parallel configuration results in an increase in overall flow. The fan plenum assembly may also include a pre-filter retention area in the fan air intake side 222 to secure a pre-filter 210. An air tight seal may be formed between the filter module 106 and the fan plenum assembly 218 via a fan plenum assembly seat 308 located on the internal chassis 304 of the filter module 106 and a fan plenum seal (not shown) located on the fan air outlet side 224 of the fan plenum assembly 218. The fan assembly seat 308 may be configured to structurally mate with the fan plenum seal so as to form an air tight seal between the filter module 106 and the fan plenum assembly 218.

Figure 15:
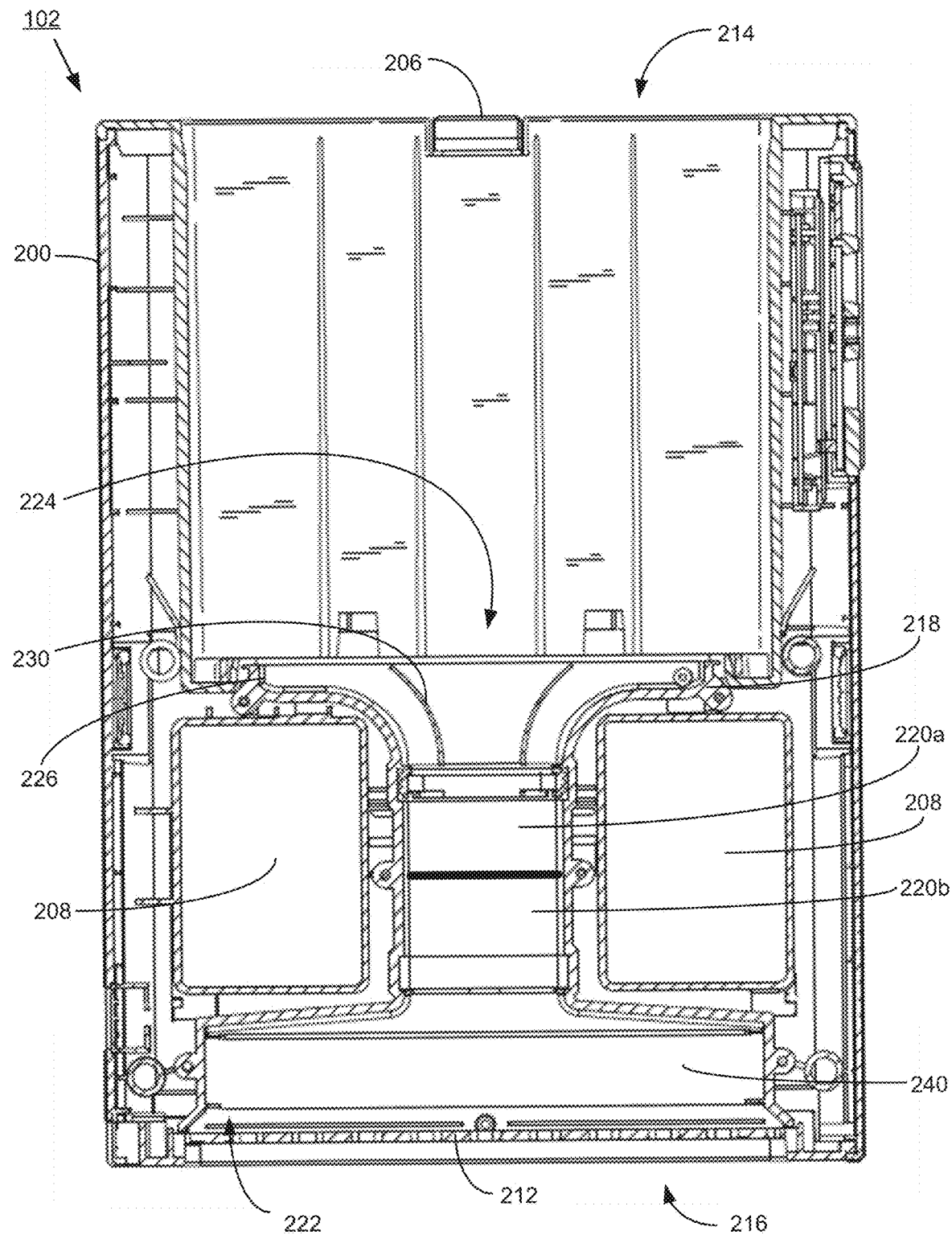
FIG. 15 illustrates cross section of an exemplary portable air filtration device without a filter module in the housing of the device, in accordance with embodiments of the disclosure.

With reference to FIG. 15, an air filtration device 102 is illustrated including opening 214 for insertion of a filtration module (not shown) during use so as to form an air tight seal to a fan plenum assembly 218. The air filtration device 102 may further include a controller (not shown) in electronic communication with a power source 208 (e.g., comprised of one or more batteries), the controller configured to provide power from the power source 208 to drive the at least one fan 220a, 220b during use, and an optional user control device (not shown) in communication with the controller to operate the at least one fan 220a, 220b. The device housing 200 may also comprise an air entry mesh 214 to remove large particulates from input air drawn into the filtration device 102 during use.

In one implementation, the one or more fans 220a, 220b operate at high hydrostatic pressures (e.g., 3-5 inches of water) and generate high flow rates up to 300 SLM. In certain implementations, to achieve high efficiency for the filter module 106, the fans 220a, 220b operate between approximately 50 and 300 SLM. The fans 220a, 220b may operate at various speeds, for example, low (100 SLM), medium (130 SLM), and high (180 SLM). There may optionally be sound dampening material around the fans. The material may be, without limitation, polyurethane foam, silicone, cotton fiber, etc.

Any suitable fan design and configuration may be utilized in connection with present disclosure. For example, in addition to fan power and output, fan configurations may be selected based on fan blade size, shape, number, orientation, surface area, and the like. Pressure is proportional to the square of the rotations per minute (RPM). An increase in RPM will result in a power increase proportional to the cube of the RPM. Higher RPM means higher pressure, lower RPM means lower pressure, thereby requiring more blades. In one implementation, the number of fan blades is of less concern than total blade surface area. Blade surface area is the single blade's surface area times the number of blades. Orientation may also be taken into consideration. For instance, if fan blades are too close together, there may not be sufficient air between the blades to have adequate performance. In one implementation, the fans 220 comprise fan blades that are narrow on the tip to decrease air resistance and will widen toward the hub. The angle of the fan blades may be minimized at the tip and generally increase toward the hub. In this regard, in one implementation, the transition from the angle at the tip to the angle at the hub may be gradual and/or smooth to prevent back flow.

The static pressure of the filtration device 102 may be increased by including a plurality of fans 220a, 220b in a stacked configuration having contra-rotating two stage axial impellers. In one implementation, two or more stacked fans 220a, 220b are provided, as described above, which rotate in opposite directions with the upstream fan having a pitch angle that is approximately 8-10 degrees higher than the fan further downstream.

With reference to FIG. 16, the one or more fans 220 may direct air flow into the filter module 106 using a flow transitional diffuser 228 disposed downstream of the fans 220. The diffuser 228 includes one or more surfaces 230 that spread the airflow evenly across the primary filter media 306 of the filter module 106, ensuring that particles collected by the primary filters 306 are not concentrated in any one region, thereby increasing the overall lifetime of the primary filters 306 and consequently the power sources 208.

In some embodiments, the portable air filtration device 102 may include at least one pre-filter retention feature 240 that may house a pre-filter 210 to remove large particles from the positive pressure air flow. The at least one pre-filter 210 may be located upstream of the fan plenum assembly 218 and/or the filter module 106. The pre-filter 210 may have any suitable filter pore size and may be formed in pleated or non-pleated configurations. For example, the pore sizes of the pre-filter 210 can range from approximately 0.1 micron-900 microns. Such pore sizes, and pleating/non-pleating configuration generally produce very low pressure drop.

The pre-filter 210 may be formed from any suitable filter materials and may have any suitable pore size. Further, the pre-filter 210 may be formed in pleated or non-pleated configurations. For instance, in certain embodiments, the pore sizes of the pre-filter material can range from 0.1 micron-900 microns. Such pore sizes, and pleating/non-pleating configuration generally produce very low pressure drop. By way of non-limiting example, the pre-filter 210 may be formed from a variety of suitable filter materials used in high-efficiency particulate air (HEPA) class filters. For instance, the pre-filter 210 may be formed from spun-bonded polyester nonwoven fabric materials, polytetrafluoroethylene (PTFE), polyethylene terephthalate (PET), activated carbon, impregnated activated carbon, or any combination of the listed materials. These materials may also be, optionally, electrostatically charged. In other embodiments, the pre-filter may include one or more hydrophobic layers, e.g., to minimize intrusion of moisture/water into the device. In one implementation, the pre-filter 210 is a single pleated or sheet of material. In another implementation, the pre-filter is co-pleated or laminated with other desired materials for combined benefits. In other embodiments, the pre-filter 210 is a carbon filter that may comprise at least two electrostatically charged scrim layers enclosing granulated activated carbon.

Figure 17A:
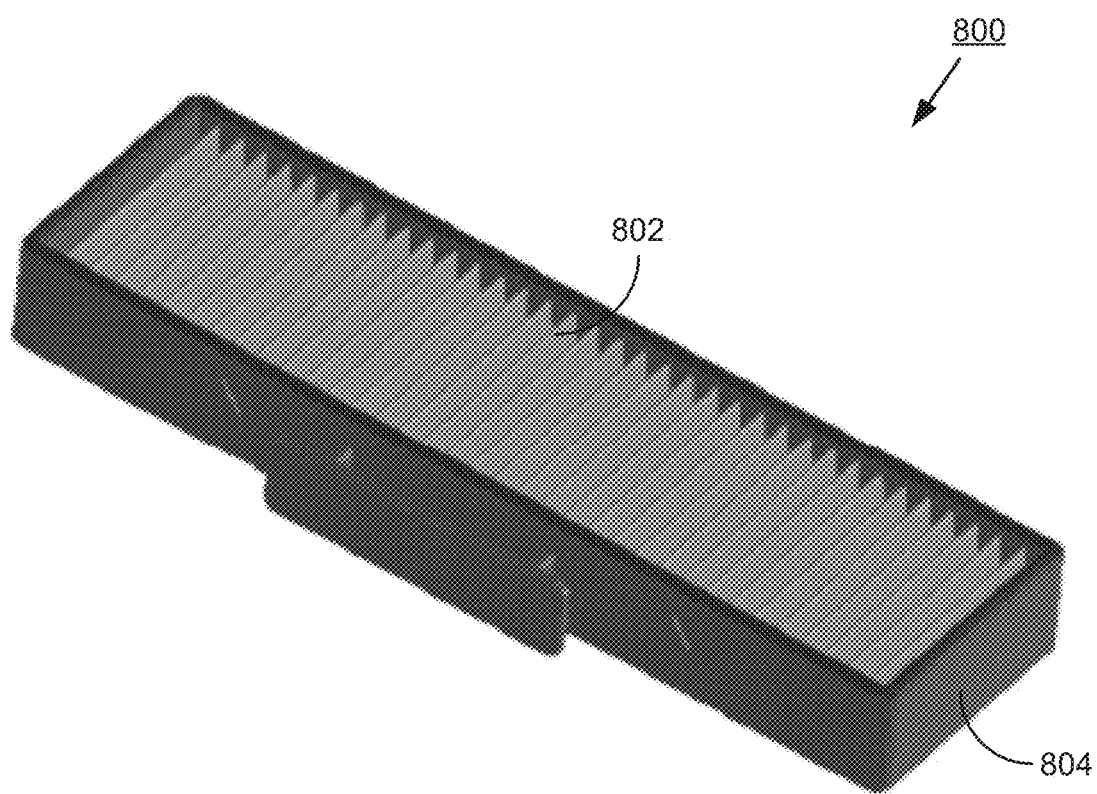
FIGS. 17A-17B illustrate an exemplary pre-filter media, in accordance with embodiments of the disclosure.
Figure 17B:
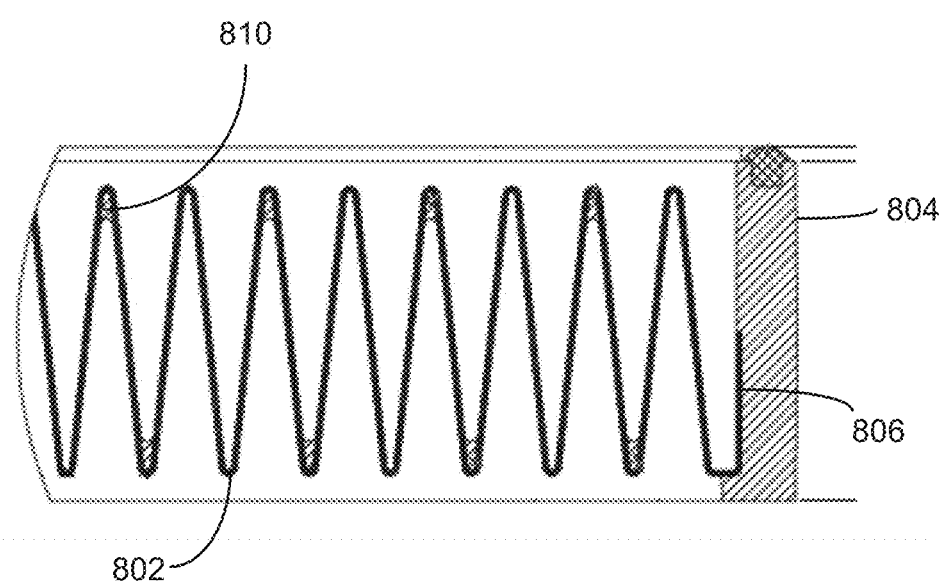

With reference to FIGS. 17A-17B, an exemplary embodiment of a pre-filter 800 is illustrated. The pre-filter 800 may comprise a pleated composite pre-filter media 802 that is over-molded 806 into a structural frame 804. In certain embodiments, the pleated composite pre-filter media 802 includes one or more structural pleat support features 810.

Figure 18:
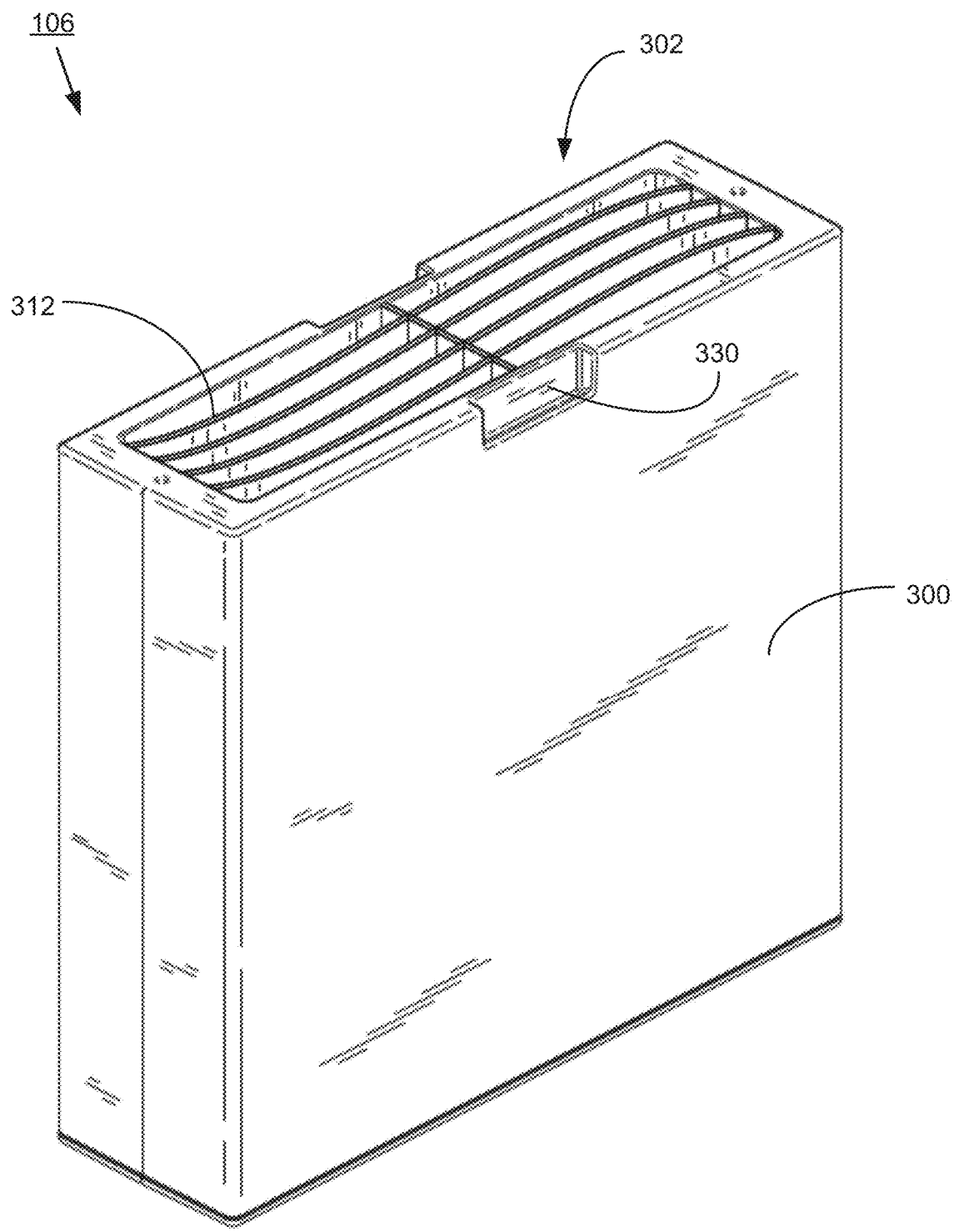
FIG. 18 illustrates a perspective view of a filter module, in accordance with embodiments of the disclosure.
Figure 19:
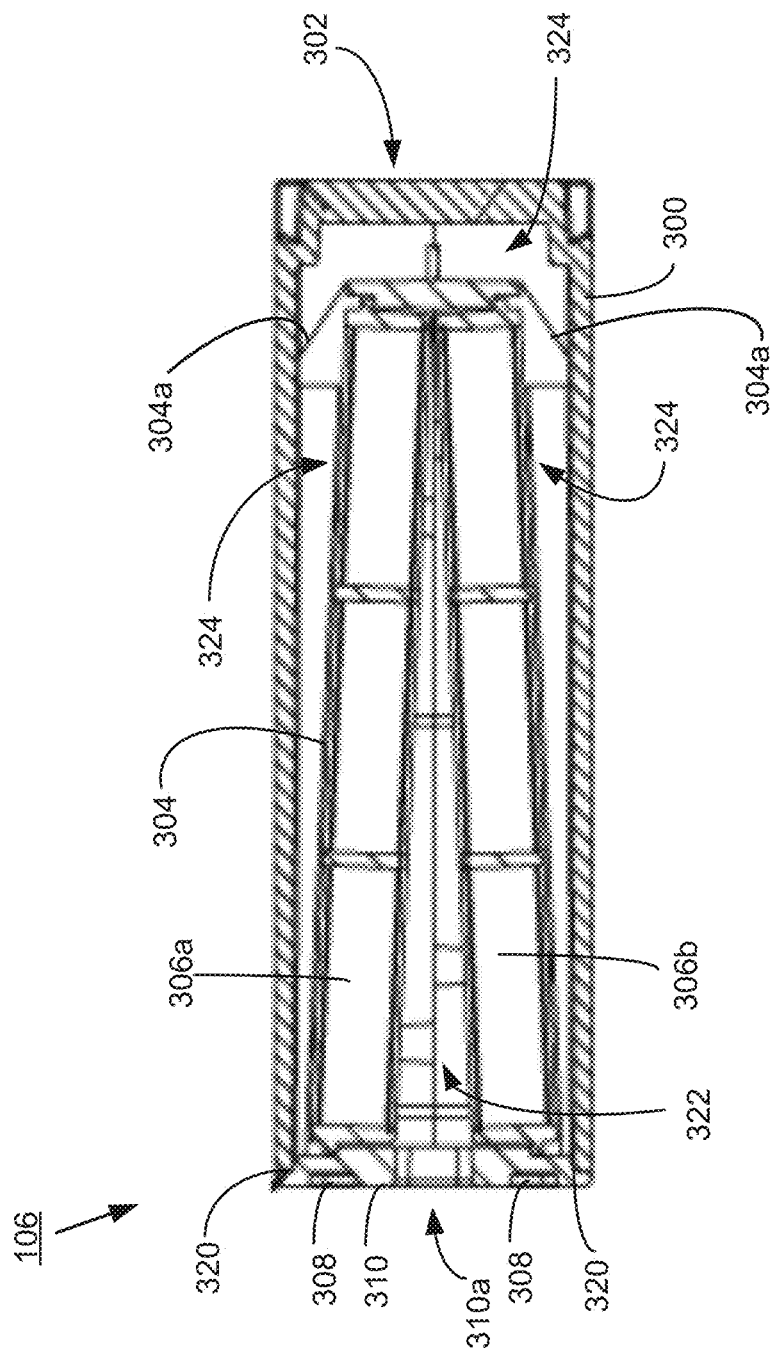
FIG. 19 illustrates a cross-section of a filter module, in accordance with embodiments of the disclosure.
Figure 20:
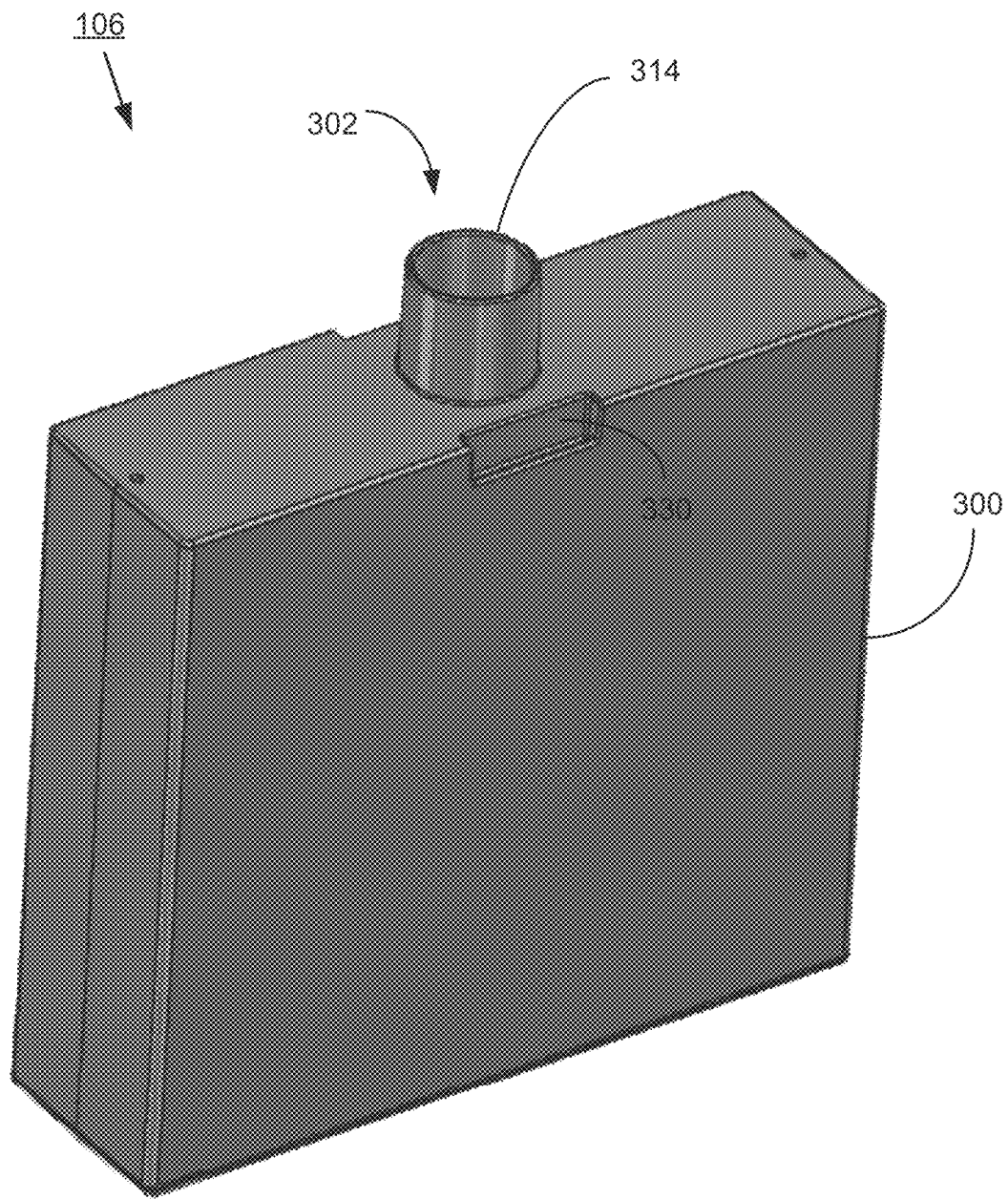
FIG. 20 illustrates a perspective view of an alternative embodiment of a filter module, in accordance with embodiments of the disclosure.

In yet other aspects, the present disclosure provides a filter module which may be used alone or in connection with the portable air filtration device and/or air filtration systems described herein. With reference to FIG. 18, in certain embodiments, the air filtration module 106 may include an external filter module housing 300 having a filtered air outlet 302 for directing filtered air from the module 106, device 102 or system 100. In certain embodiments, the external filter module housing 300 may include one or more housing retention features 330 that may be sized and shaped so as to interface with filtration module releasable securing features. In certain embodiments, the filtered air outlet 302 may be configured at a grate or grill 312. With reference to FIG. 19, the air filtration module 106 is shown in cross section. As shown, the air filtration module 106 may include an internal chassis 304 having a face plate 310 including an input air inlet 310a for directing input air into the filter module 106; at least two filter media 306a, 306b, secured to the internal chassis 304 in a spaced apart orientation in a parallel air flow configuration during use. In other embodiments, with reference to FIG. 20, the filtered air outlet 302 may be configured at as cylinder or tube 314. However, the disclosure is not so limited, and any configuration of the air outlet may be used.

Figure 21A:
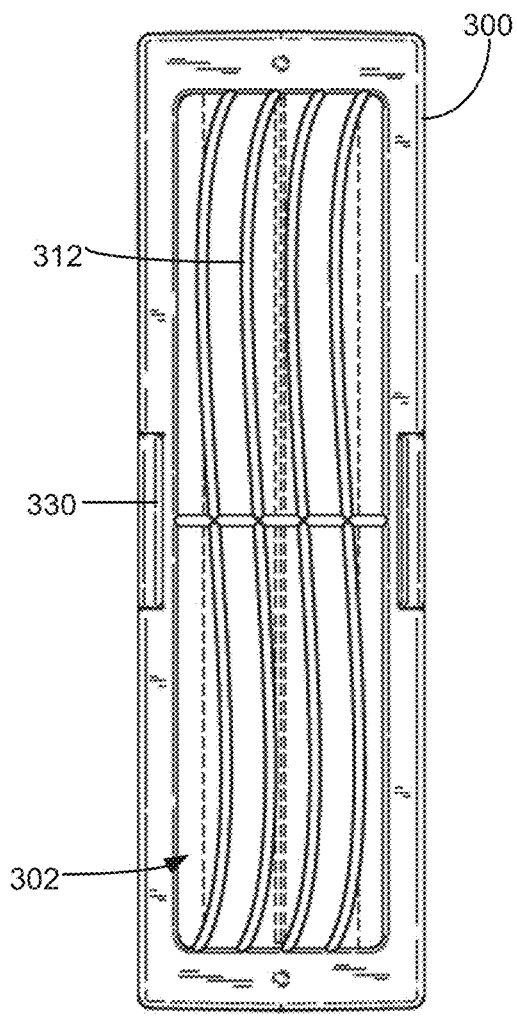
FIG. 21A-21B illustrates top (FIG. 21A) and bottom (FIG. 21B) view of a filter module, in accordance with embodiments of the disclosure.
Figure 21B:
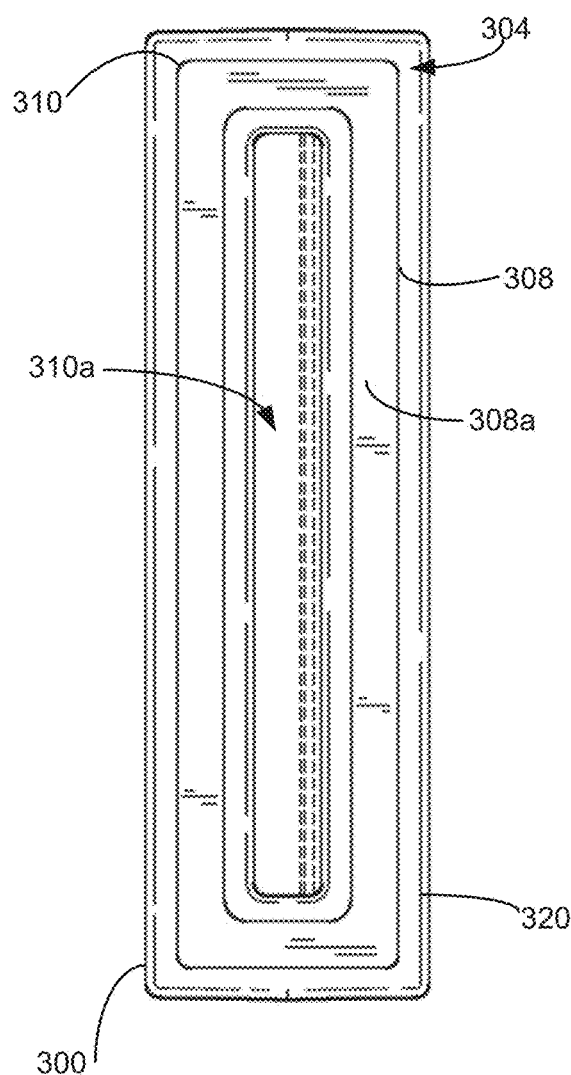
Figure 22:
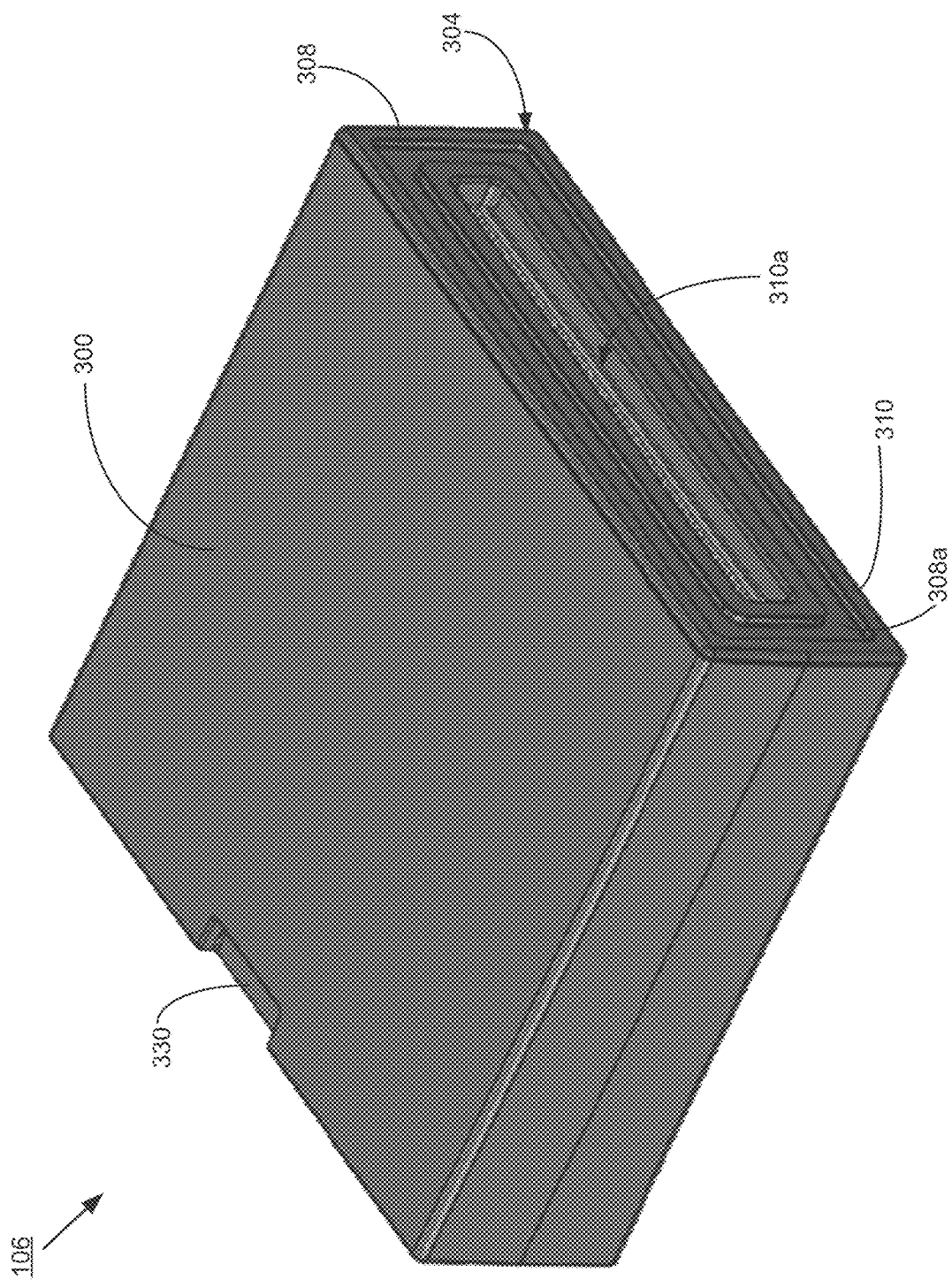
FIG. 22 illustrates a bottom perspective view of a filter module, in accordance with embodiments of the disclosure.

FIG. 21A illustrates a top view of the filter module 106, and FIG. 21B illustrates a bottom view of filter module 106. FIG. 22 illustrates a perspective bottom view of filter module 106. As shown, in certain embodiments, internal chassis 304 includes a fan plenum attachment seat 308 for securing the filter module 106 to a fan plenum assembly (not shown) in an air tight seal configuration. By way of example, as shown in FIG. 21B, FIG. 22, and FIG. 23, the fan plenum attachment seat 308 may be configured as a recessed portion 308a of the face plate 310 of internal chassis 304 sized and shaped so as to structurally mate with the edge of the fan plenum seal (e.g., the accordion style gasket).

Figure 23:
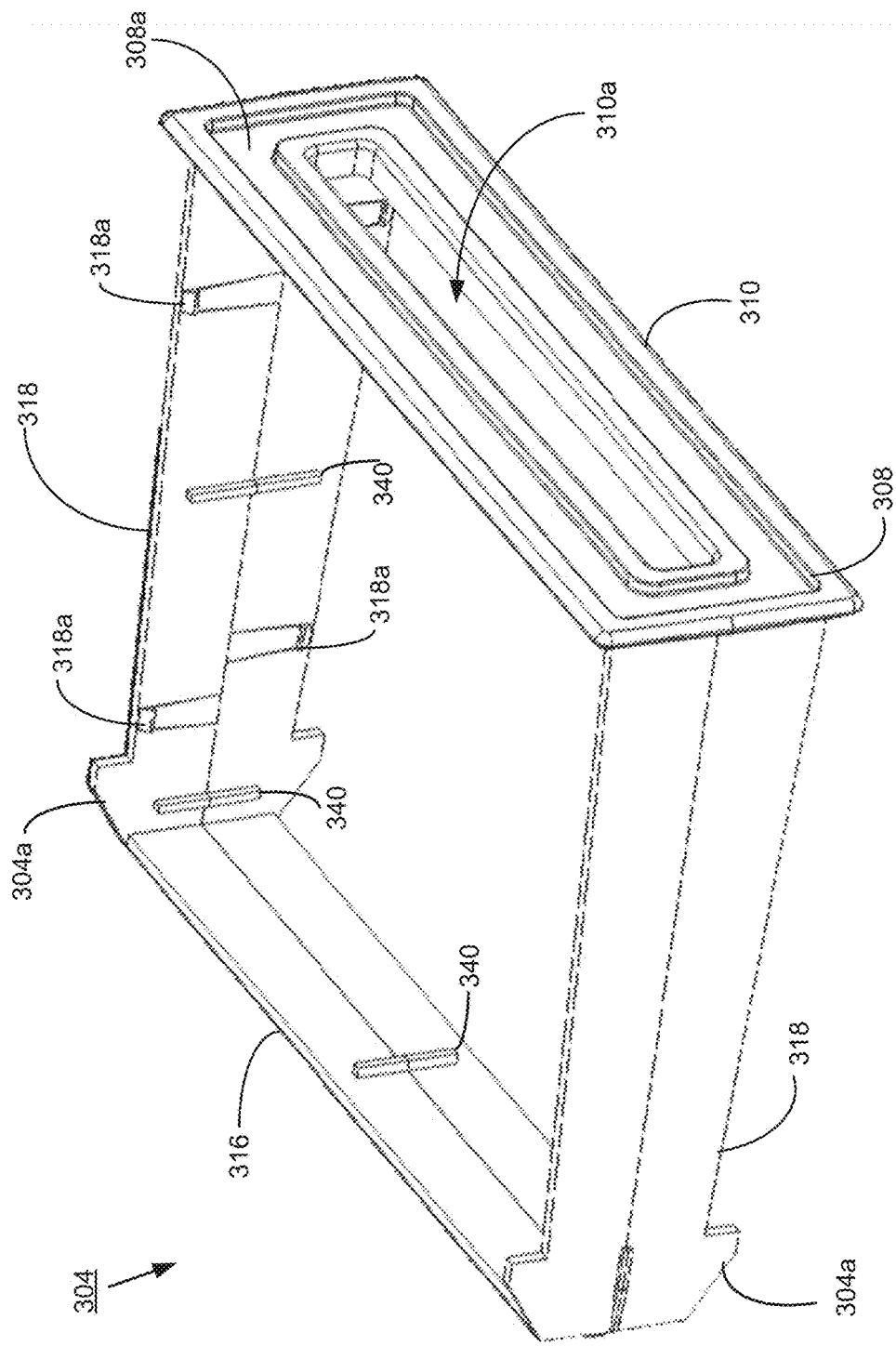
FIG. 23 illustrates a front perspective view of an internal chassis of a filter module, in accordance with embodiments of the disclosure.
Figure 24:
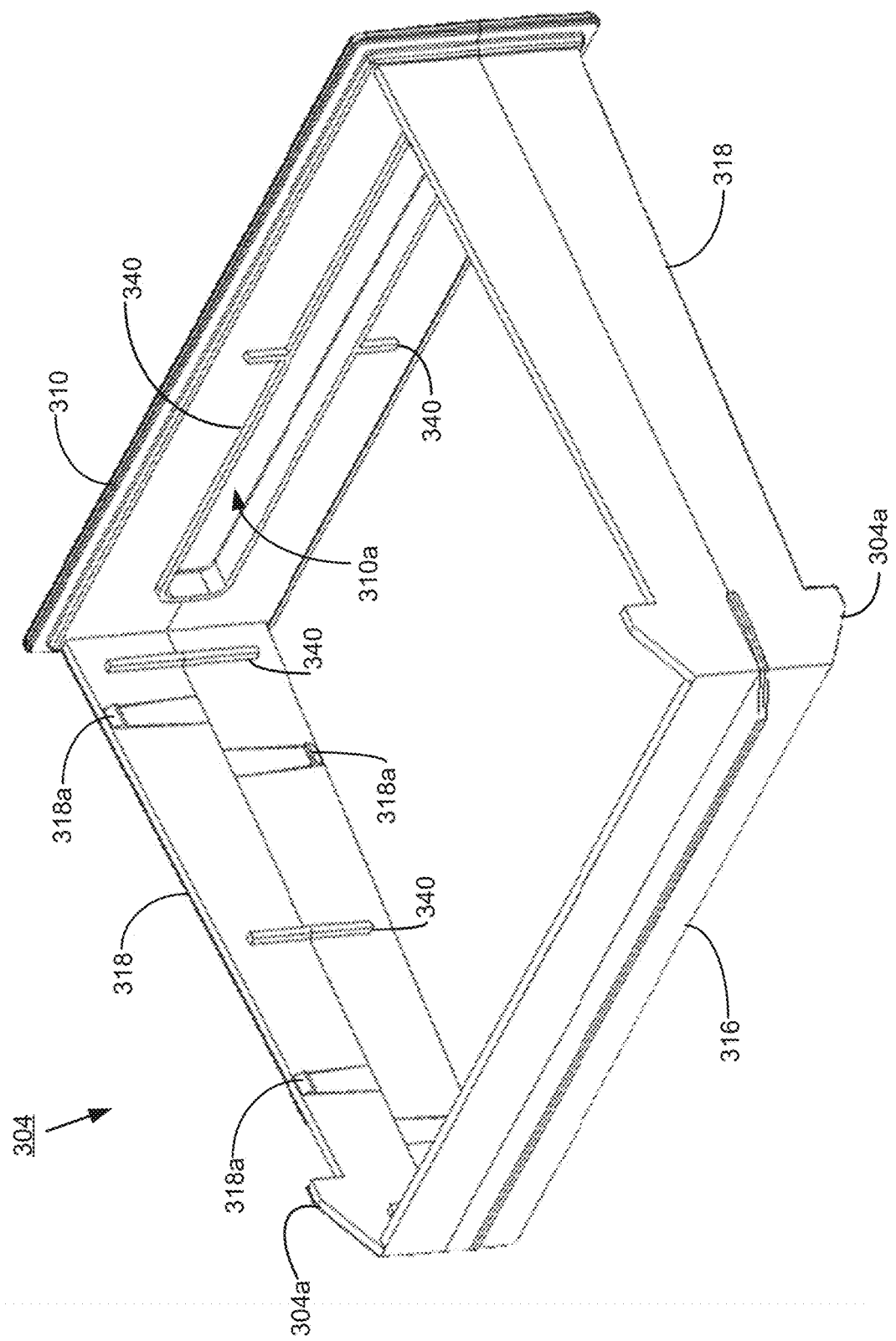
FIG. 24 illustrates a back perspective view of an internal chassis of a filter module, in accordance with embodiments of the disclosure.

With reference to FIG. 23 and FIG. 24, a front and back perspective view of an internal chassis 304 of the disclosure is illustrated. In certain embodiments, the internal chassis 304 includes a face plate 310 having an input air inlet 310a and a fan plenum attachment seat 308 for securing the filter module 106 to a fan plenum assembly (not shown) in an air tight seal configuration, an input air flow path seal 316 opposite the face plate 310, and opposed side walls 318, each having one or more filter media retention features 318a that secure the primary filter media (not shown) to the internal chassis side walls 318. Face plate 310, side walls 318 and input air flow path seal 316 may further include spacers 340 to facilitate placement and securement of filter media within the internal chassis 304. As shown, the spacers 340 may be located on an interior surface of the face plate 310, side walls 318 and input air flow path seal 316, and may be sized, shaped, and located to aid in placement of the filter media within the internal chassis.

As shown, in certain embodiments, the side walls of the internal chassis may be slightly tapered in a direction from the front to back of the internal chassis (i.e., from the face plate 310 to the input air flow path seal 316). In this regard, spacers 340 may likewise be of varied lengths along the length of side walls 318 such that the spacers facilitate placement and securement of the filter media within the internal chassis 304 at fixed positions relative to the length of the side walls. By way of example, as described in further detail herein, the filter media may be arranged in a spaced apart orientation in intersecting planes so as to provide for parallel air flow between the filters during use (i.e., as opposed to serial air flow through one filter and then the other, air flow through one filter or the other in parallel). The spacers 340, together with the filter media retention features 318a, may facilitate arrangement of the filter media in this regard.

In some embodiments, the side walls 318 may be configured to include one or more wings 304a to facilitate placement of the internal chassis 304 within the external housing of the filter module. The wings 304a may be located, e.g., at a taped end of the side walls 318, near the input air flow path seal 316. Without intending to be limited, the wings 304a may be sized and shaped to as to accommodate the internal dimensions of the filter module external housing, and may structurally secure the internal chassis within the housing.

Figure 25:
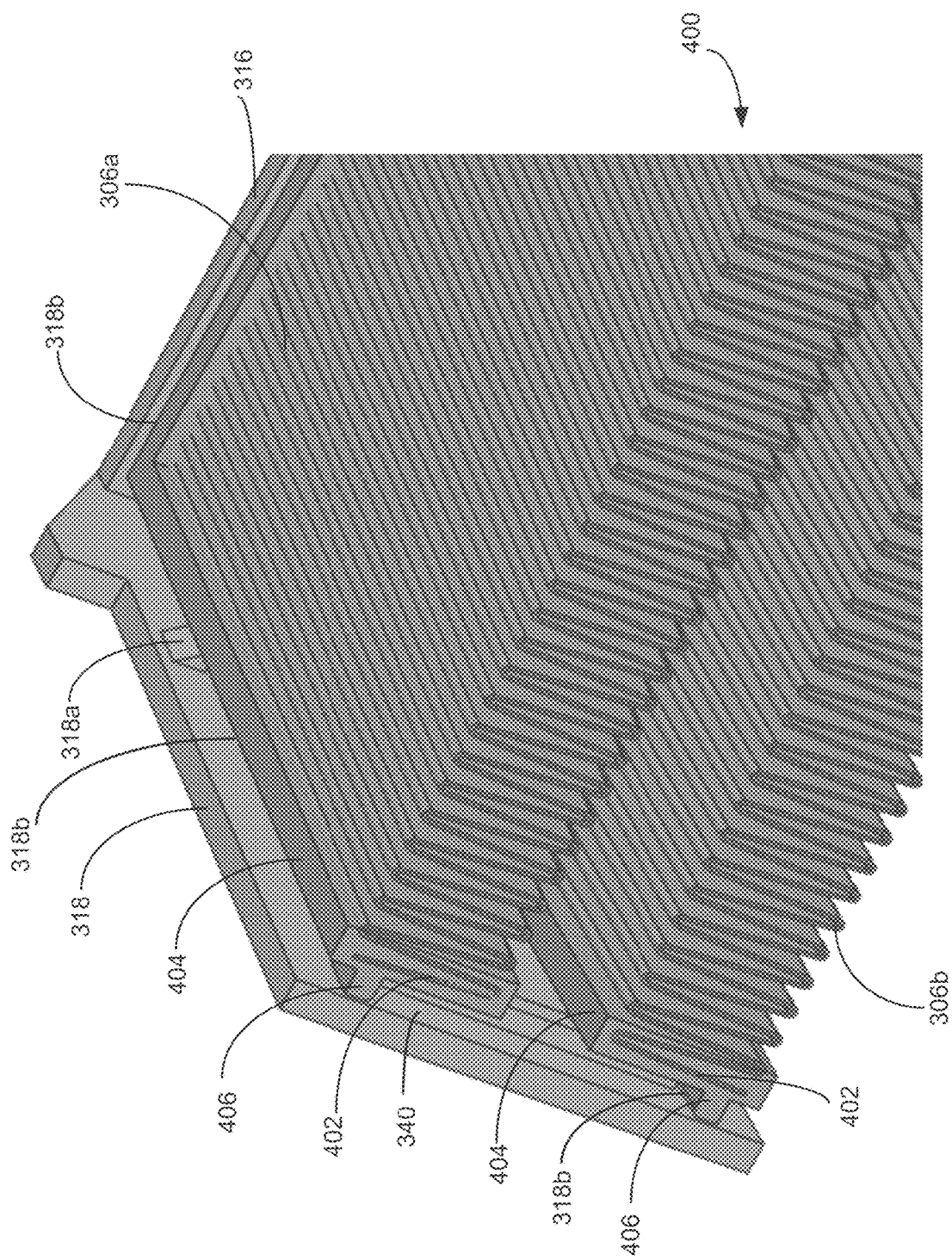
FIG. 25 illustrates a detail perspective view of an internal chassis of a filter module secured to primary filter media, in accordance with embodiments of the disclosure.

With reference to FIG. 25, in certain embodiments, the spaced apart primary filter media 306a, 306b may be secured, at least in part, to the side wall 318 of the chassis via the filter media retention features 318a to form an air tight seal between the primary filter media 306 and the internal chassis 304. In certain embodiments, the filter media retention features 318a of the side walls of the internal chassis 304 are selected from clips, grooves, snaps, and combinations thereof. Spacers 340 may facilitate placement and securement of the filter media 306a, 306b by interfacing with securement tabs 406 of the filter structural frame 404. As shown, filter securement tabs 406 may rest against spacers 340 to retain the filter media in one direction, while filter media retention features 318a may secure the filter media from the other direction. In certain embodiments, additional bonding features 318b may be used to further secure the filter media to the side walls 318, input air flow path seal 316, and/or face plate 310 of the internal chassis 304 and form an air tight seal between the filter media and the internal chassis.

Figure 26A:
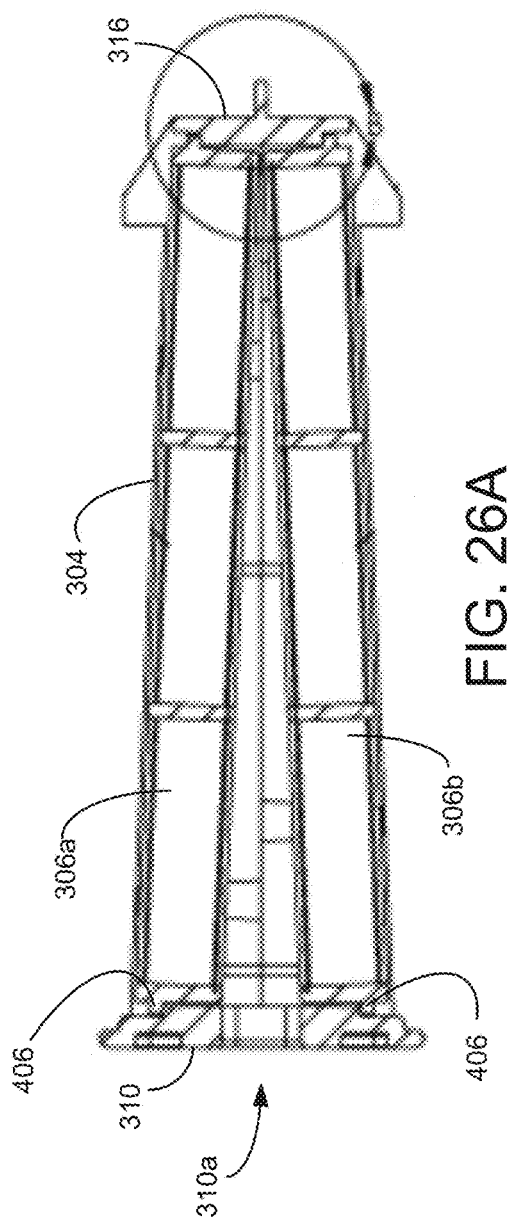
FIG. 26A-26B illustrate an internal chassis of a filter module secured to primary filter media, in accordance with embodiments of the disclosure.
Figure 26B:
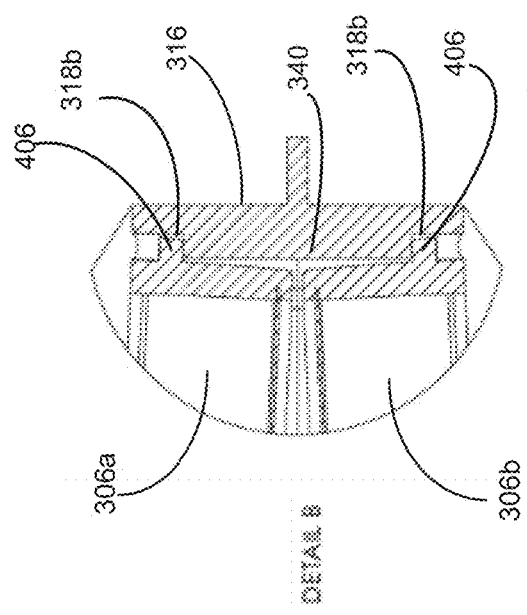

With reference to FIG. 26A and FIG. 26B, in some embodiments, in addition to the securement along the side walls, the primary filter media 306a, 306b may be further secured to the internal chassis 304 at the input air flow path seal 316, and/or the face plate 310 including the input air flow inlet 310a using a bonding feature 318b, e.g., thermal bonding, ultrasonic welding, or adhesives.

Figure 27:
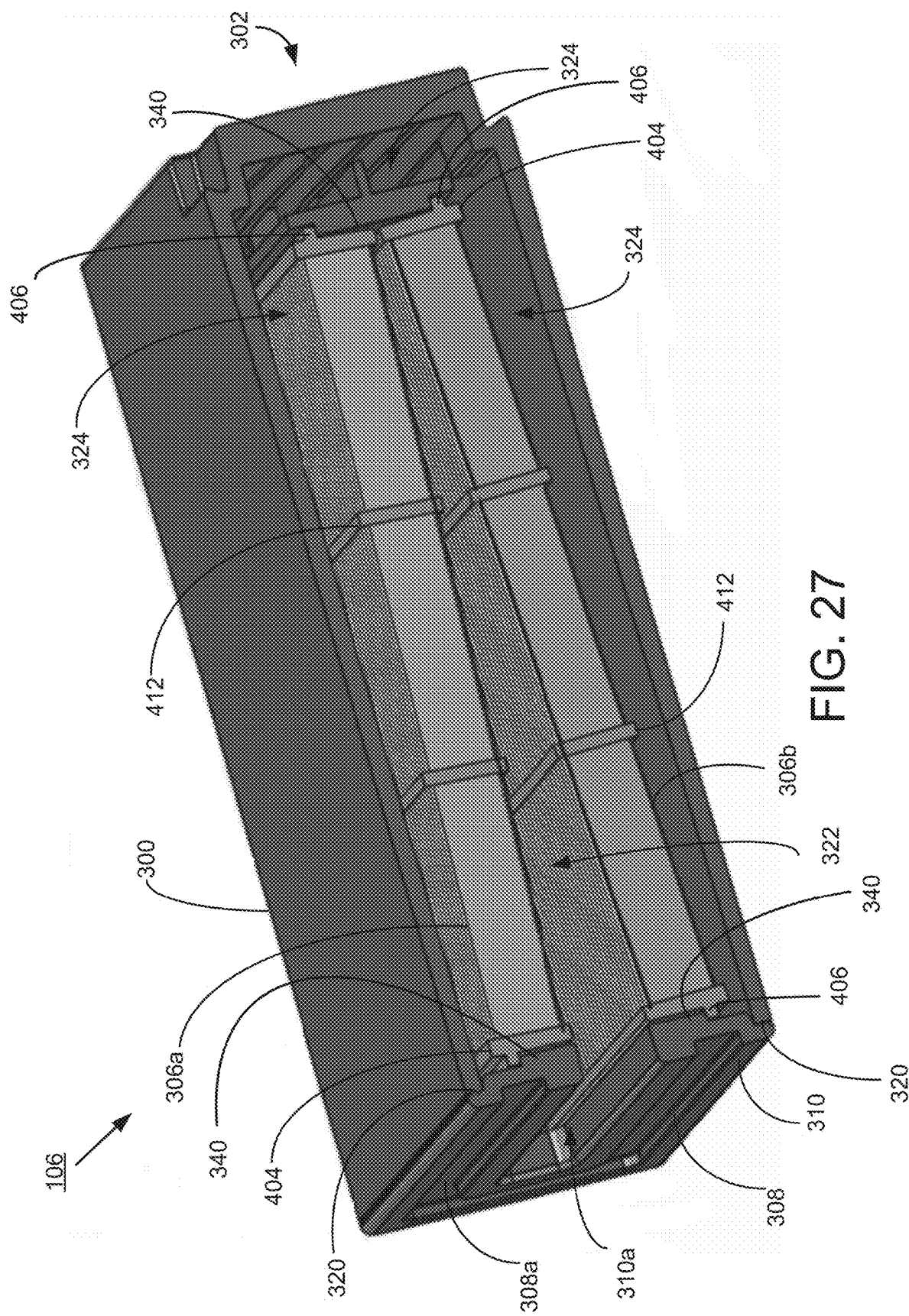
FIG. 27 illustrates a perspective cross-section of a filter module including to an internal chassis secured to primary filter media, in accordance with embodiments of the disclosure.

With reference to FIG. 19 and FIG. 27, in some embodiments, the spaced apart primary filter media 306a, 306b may be located within the filter module 106 so as to separate an input air flow region 322 from a filtered air flow region 324 within the filter module 106. In certain embodiments, the input air flow region 324 is created within the filter module 106 in a space between the face plate 310, the chassis input air flow path seal 316, the chassis opposed side walls (not shown), and the spaced apart primary filter media 306a, 306b during use. As described above, in some embodiments, spacers 340 and filter media retention features 318a may facilitate placement and securement of filter media 306a, 306b in the spaced apart orientation so as to separate an input air flow region 322 from a filtered air flow region 324 within the filter module 106. In accordance with the disclosure, the filter air flow region 324 is in filtered isolation from input air flow region 322, i.e., air flow is sealed via the air tight seal between the filter media 306a, 306b and the internal chassis 304 and only available through the filter media). In certain embodiments, the input air flow region 322 may be configured so as to provide turbulent air flow within the input air flow region 322 during use.

As illustrated, in certain embodiments, the primary filter media 306a, 306b are arranged in a spaced apart orientation in intersecting planes so as to provide for parallel air flow between the filters during use (i.e., as opposed to serial air flow through one filter and then the other, air flow through one filter or the other in parallel). In some embodiments, the primary filter media 306a, 306b are arranged in a spaced apart orientation in planes that converge towards each other. In yet other embodiments, the primary filter media 306a, 306b are arranged in a spaced apart orientation in planes that converge towards each other proximate the filtered air outlet 302.

In one embodiment, the spaced apart orientation of the primary filter media inside the filter module may be such that the filters be angled relative to one another so as to reduce the size of the device. When the angle is equal to 0 degrees, the filters are perfectly parallel. Conversely, when the angle is equal to 90 degrees the filters are perfectly perpendicular. As the angle increases, the loading of the filter becomes increasingly unevenly distributed along the filter. By way of example, an angle of 60 degrees allows for minimization of the effects of uneven loading of the primary filter media during use yet provides for size reduction.

Figure 28:
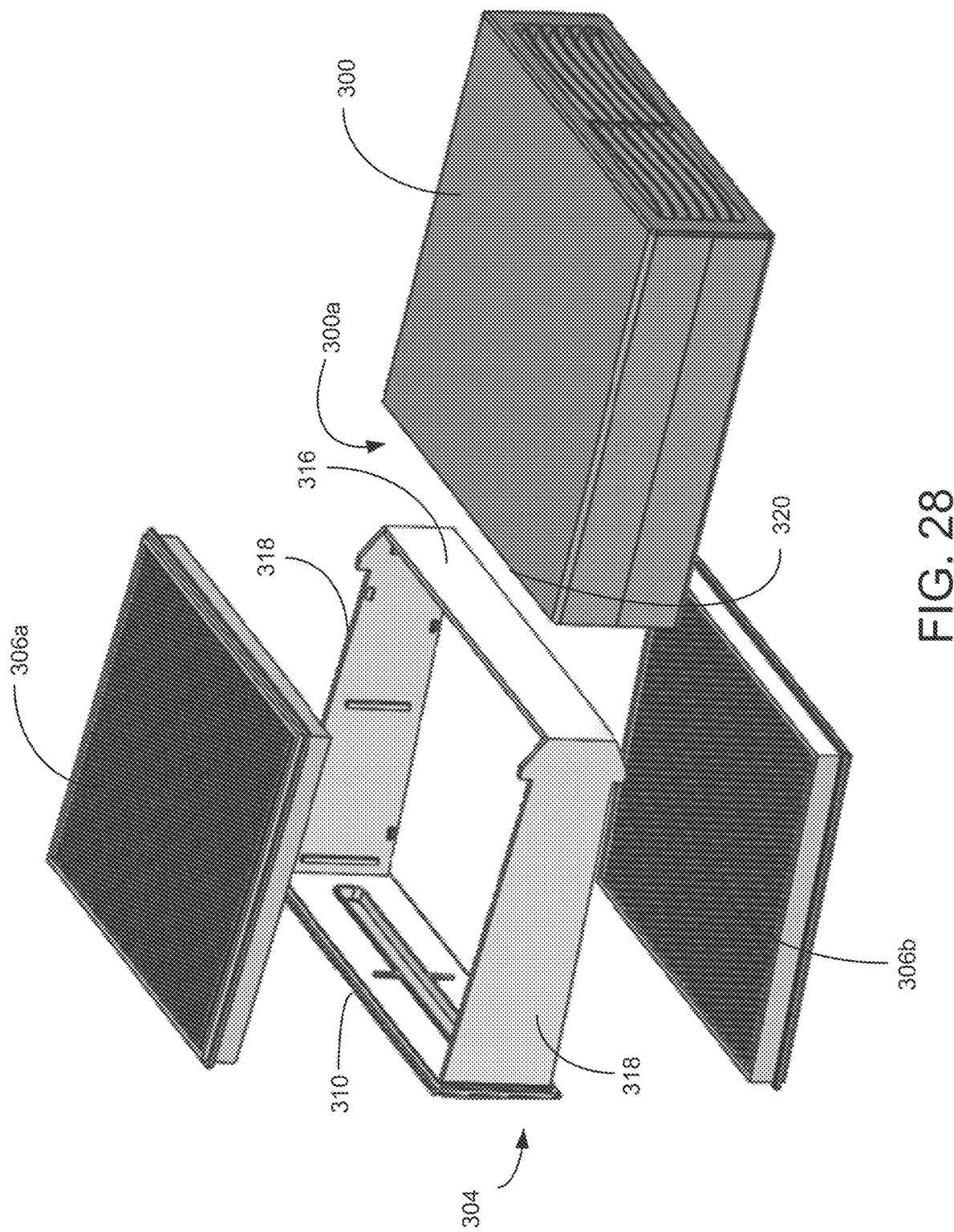
FIG. 28 illustrates an exploded perspective view of a filter module, in accordance with embodiments of the disclosure.
Figure 29:
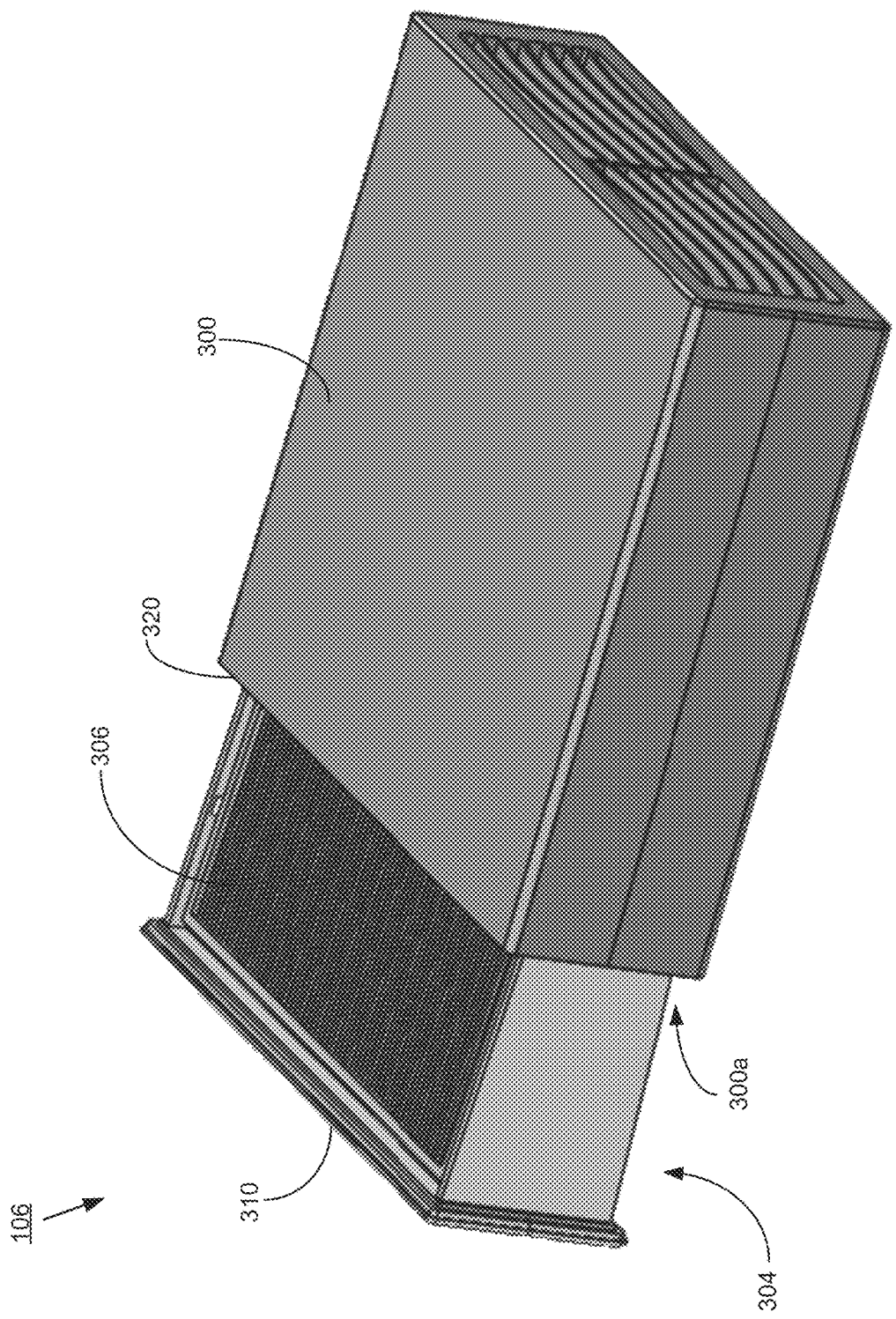
FIG. 29 illustrates a perspective view of the insertion of an internal chassis secured to primary filter media into the external housing of a filter module, in accordance with embodiments of the disclosure.

With reference to FIG. 28 and FIG. 29, primary filter media 306a, 306b may be secured to internal chassis 304, and internal chassis 304 with secured primary filter media 306 may be positioned into an opening 300a in the external housing 300 of the filer module. As described above, filter media 306a, 306b may be secured to the internal chassis using filter media retention features and spacers to facilitate placement and securement of the filter media. An interior perimeter of face plate 310 of internal chassis 340 may be sealed to an external perimeter of a surface 320 of the external filter module housing 300, so as to form a sealed exterior of filter module 106. Any suitable sealing method may be used, e.g., ultrasonic welding, thermal bonding, adhesives, etc. Once assembled, the internal chassis 304 may be located substantially within the external housing 300 of filter module 106.

As illustrated, in certain embodiments, the internal chassis 304 of the filter module 106 is positioned substantially within the external filter module housing 300 with an interior perimeter of face plate 310 of the internal chassis 304 sealed to an exterior perimeter of a surface 320 of the external filter module housing 300 so as to form sealed exterior of the filter module 106. Without intending the be limited, the entirety of the internal chassis may be within the external filter module housing, the face plate of the filter module housing may be flush with an the surface of an opening of the housing, portions of the internal chassis (e.g., portions of the face plate) may protrude from the housing, etc. However, in general, the internal chassis is positioned within the external housing such that the internal chassis may be sealed to the housing so as to form an air tight seal between the internal chassis and the housing to thereby form the filer module. In certain embodiments, the face plate 310 of the internal chassis 304 is sealed to a surface 320 of the external filter module housing 300 using thermal bonding, ultrasonic welding, or adhesives so as to form an air tight seal between the internal chassis 304 and the external filter module housing 300.

In certain embodiments, the primary filter media 306 may be formed in any suitable manner to achieve the desired filtering efficiency. With reference to FIGS. 30A-30D, by way of example, the primary filter media 306 may be comprised of a pleated composite primary filter media 400 that are over-molded 402 into a structural frame 404 (or alternatively stated, the structural frame 404 is over-molded onto the filter media 400). FIG. 30A illustrates a top view of an exemplary primary filter media, while FIG. 30B illustrates a cross-section side view in line with the filter pleat, while FIG. 30C illustrates a cross-section side view across the filter pleat. FIG. 30D illustrates a detail view of the over-molding of the composite primary filter media into the structural frame. The structural frame 404 may then be secured to the internal chassis (not shown) utilizing, e.g., securement tabs 406 in connection with various filter media retention features or bonding elements (not shown). As shown from FIG. 30A, securement tabs 406 may extends around the entirety outside frame perimeter 410 of structural frame 404 (e.g., as a depressed or recessed extension frame). Alternatively, securement tabs 406 may be located at defined locations around structural frame 404, e.g., so as to correspond with the location of spacers 340 of internal chassis 304. In certain embodiments, the structural frame 404 may be formed from a material selected from polypropylene or acrylonitrile butadiene styrene (ABS). In certain embodiments, the pleated composite primary filter media 400 may be over-molded 402 into the structural frame 404 along the entire perimeter of the structural frame 404.

In certain embodiments, with reference to FIG. 30A, structural frame 404 may comprise an outside frame perimeter 410 and one or more inner support dividers 412 to form multiple filter frame sections 414. Each filter frame section 414 may then comprise a pleated composite primary filter media 400 over-molded 402 into the filter frame section 414. Although illustrated with two dividers 412 and three filter frame sections 414, the disclosure is not so limited, and any suitable configuration may be used, including more or fewer dividers, e.g., zero dividers so as to have a unitary filter frame section, one divider so as to have two filter frame sections, two dividers so as to have three filter frame sections, three dividers so as to have four filter frame sections, etc. Suitable configurations may be selected based on filter structural integrity and air flow considerations, among other factors.

Any suitable method may be used to achieve the desired over-molding of the pleated filter into the structural frame. For instance, pleat support frames may be used during injection processing of the filter into the structural frame (or alternatively states, of the structural frame onto the filter). By way of example, the filter media may be placed over the pleat support frame and the supported filter media may be interfaced with a structural frame mold at the edges of the filter media. Structural frame materials may then be injection molded onto the supported filter media at suitable injection temperatures and pressures based on the selected materials. For instance, injection temperatures between, e.g., 300 to 500° F. and pressures of 600-12,000 psi may be used. However, the disclosure is not so limited.

For instance, by way of non-limiting example, the primary media 306 may include any HEPA type membrane material, e.g., with a 0.1 micron-0.3 micron pore size made from an inert material such as polytetrafluoroethylene (PTFE), polyethylene terephthalate (PET), activated carbon, impregnated activated carbon, or any combination of the listed materials. These materials may also be, optionally, electrostatically charged. In certain embodiments, the primary filter media 306 may be a single pleated or sheet of material. In some embodiments, the primary filter media 306 media may be co-pleated or laminated with other desired materials for combined benefits. By way of non-limited example, the primary filter media 306 may be a composite material including more than one layer of filter materials co-pleated using a thermal procedure (adhesiveless), or adhesive-based bonding to attach one or more additional layer(s) of filter material, load bearing material, activated carbon for added system protection, impregnated activated carbon, and/or the like. In one embodiment, adhesive-based bonding may be used, employing adhesives having low or no outgassing. Stated differently, the primary filter media 306 may be formed by bonding, co-pleating, laminating or otherwise attaching additional layers to suitable filter materials.

In one particular embodiment, the primary filter media 306 may include a layer of ultra-high-molecular-weight polyethylene (UHMWPE) in a composite filter stack to increase the filter efficiency. The layers of the primary filter media 306 may be affixed/bonded in any suitable manner, e.g., by thermal bonding, crimping, adhesive, etc. In certain implementations, the layers of the primary filter media 306 may be bonded by crimping the edges and pleating together by loading into a collator. In other embodiments, adhesive with a thickness range between approximately 0.5 oz per square yard to 3 oz per square yard, e.g., 1 oz per square yard may be used. Without intending to be limited by theory, the adhesive may add resistance to the primary filter media 306, which may create and add pressure drop to the system. Alternatively, or in addition, any adhesive may be reduced or removed to decrease pressure drop and to reduce outgassing and VOCs emitted therefrom. If desired, activated carbon may also be added to remove VOCs (odors and chemical fumes).

In another embodiment, the primary filter media 306 may include a plurality of thermally attached layers, including a first PE/PET layer, an activated carbon layer, a first PTFE membrane layer, a second PE/PET layer, a second PTFE membrane layer, a third PE/PET layer, a second activated carbon layer, and a fourth PE/PET layer.

By way of non-limiting example, the primary filter media 306 may comprise a pleated composite primary filter media that includes at least three layers in the composite media, at least five layers in the composite media, at least seven layers in the composite media, etc. The layers of the composite media may include scrim layers, membrane layers, activated carbon layers, etc. In certain embodiments, the pleated composite primary filter media may comprise at least three scrim layers and at least two membrane layers. In certain embodiments, the pleated composite primary filter media may have a filter pleating pitch between 4 pleats to 30 pleats per inch, between 6 pleats to 24 pleats per inch, preferably between 10 pleats to 18 pleats per inch, more preferably 12 pleats per inch. By way of example, the pleated composite primary filter media may have a filter pleat count of between 50 pleats to 100 pleats, preferably between 55 pleats to 75 pleats, more preferably between 60 pleats to 65 pleats, more preferably 62 pleats.

By way of example, the size of the primary filter media may range between 1.38 ft$^2$-4.13 ft$^2$ for maximum flow rates (flow rate for highest setting) between, e.g., 100 SLM-300 SLM. The size of the filter may be determined based on design requirements. By way of non-limiting example, for a pollution application, a desired airflow face velocity may be selected to not exceed 1.3 cm/s. The following equation is used to determine the filter face velocity as a function of filter surface area:

$$v = QA_s$$

where v is the filter face velocity, Q is the volumetric flow rate of the air stream entering the filter, and $A_s$, is the surface area of the filter.

As discussed above, in certain embodiments, the systems, device, and filter modules of the disclosure are designed to keep the particle velocity at the surface of the filter (face velocity) less than or equal to 5 cm/s, 4 cm/s, 3 cm/s, 2 cm/s, or 1 cm/s. In certain aspects, this low face velocity may be achieved, at least in part, by increasing the surface area of the primary filter component(s), e.g., by pleating the primary filter component(s), using more than one primary filter component, etc.

Without being limited by theory, the face velocity is directly proportional to the volumetric flow rate (Q) and inversely proportional to the surface area ($A_s$) of the filter as shown in the equation below $$v = \frac{Q}{A_s}.$$

In certain aspects, the surface area ($A_s$) of a filter may be greatly increased by pleating. The surface area of a pleated filter can be calculated using the following expression (for 1 filter):

$$A_s = 2 * L * W * d * \frac{\# \text{ pleats}}{\text{inch}}$$

where L is the length of the pleated filter, W is the width of the pleated filter, d is the pleat depth, and #pleats/inch represents the pleat density. The equation shows that the surface area is directly related to the number of pleats present on the surface so increasing the amount of pleats allows for the increase in the overall surface area and a corresponding decrease in the face velocity.

In certain embodiments, when coupled in a parallel air flow configuration with another filter component of the same dimensions, such a configuration will generally generate a face velocity of less than or equal to 1 cm/s under normal operating flow rates of 80-200 SLM. Exemplary dimensional measurements are illustrated. However, the disclosure is not so limited, and alternative dimensional configurations are envisioned as within the scope of the disclosure.

Figure 31:
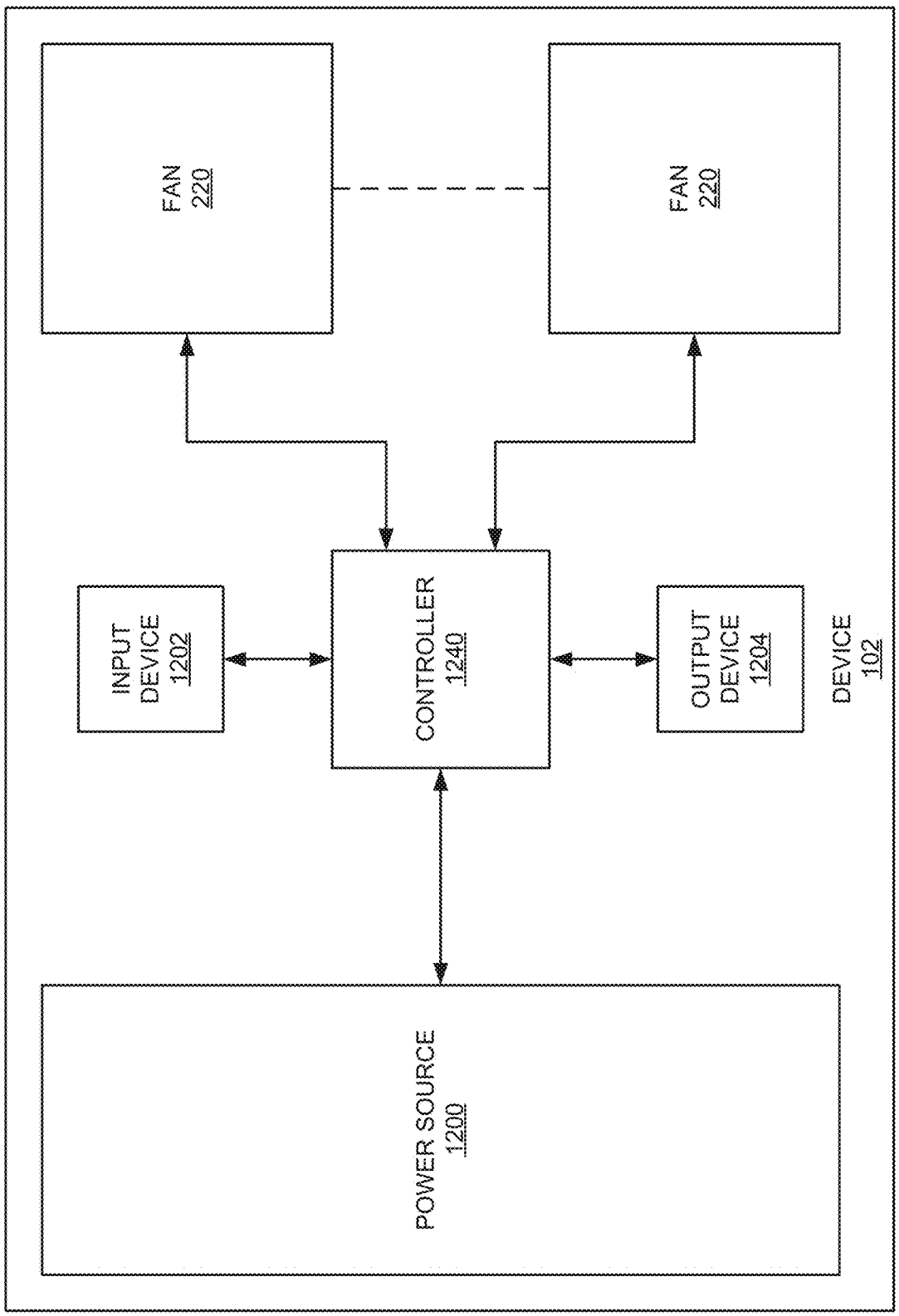
FIG. 31 depicts a block diagram of example components of a filtration device, in accordance with an embodiment of the disclosure.

As can be understood from FIG. 31, the filtration device 102 includes a variety of electrical components for controlling the operation of the air filtration system 100. In one implementation, the filtration device 102 includes the controller 1240, one or more input devices 1202, one or more output devices 1204, a power source 1200, such as the power source 242 described herein, and one or more fans 220, such as the stacked serial axis fans described herein.

The controller 1240 receives power from the power source 1200 and manages the distribution of the power to the various other components in the filtration device 102. In one implementation, the controller 1240 provides power to the fans 220 and a signal indicating a status of the operations to the output device 1204 according to user input. The controller 1240 accepts the user input via the input device 1202 and dictates the operation of the filtration device 102. Specifically, a user may manipulate the input device 1202 to cause the controller 1240 to vary the speed of the fans 220 and consequently the flow of filtered air.

In one implementation, the input device 1202 is configured to allow a user to manipulate the operation of the filtration device 102. The input device 1202 may include electromechanical devices such as switches or buttons or may include electronic devices such as a touch screen. The input device 1202 may be directly connected to the controller 1240 using a wired or wireless connection. In one implementation, the input device 1202 includes the user device 112 and/or the filtration device 102. For example, the input device 1202 may include a single button protruding outward from a side of the filtration device 102 that can be found by touch without actually having to see the button. The button is triggered by squeezing and may include a contoured shape so that a finger naturally comes to rest on the center of the button.

The input device 1202 may further be running an application executed by a process to generate a graphical user interface (GUI) that accepts user inputs via a touchscreen or other input method, as described herein. In one implementation, the input device 1202 may be used to turn the filtration device 102 on and off, select a desired fan speed, change the aesthetics of the filtration device 102 (e.g., using LEDs or one or more displays configured to display designs, colors, and/or graphics).

In one example, the filtration device 102 is configured to operate at low, medium, and high settings for the fans 220. The input device 1202 provides a medium for the user to select the fan speed. In one implementation, the input device 1202 is a button that when depressed, provides the controller 1240 with a signal. The controller 1240 receives the signal and is configured to cycle through the various modes of operation.

The output device 1204 may include any device capable of providing visual, audible, and/or tactile feedback to the user to indicate a state or status of the filtration device 102. The output device 1204 and the input device 1202 may be the user device 112. In one implementation, the output device 1204 receives a signal indicative of a status from the filtration device 102 and provides an output for the user. The signal provided by the controller 1240 may include an analog or digital signal for conveying the state or status.

In one implementation, the output device 1204 includes one or more alerts configured to indicate whether the filtration device 102 has been activated, a current state of the power supply 1200, a change filter indicator, a current fan speed of the filtration device 102, and/or any other relevant status. In this example, the controller 1240 may provide analog voltage signals to cause LEDs corresponding to the status to become illuminated. For example, the LEDs may be configured to include a power charge indication, a power on indication, a fan speed indication and a change filter indication. The power on LED may include a single white or other colored LED that indicates when the filtration device 102 is powered on.

The power charge indication may include a group of five single color LEDs used to indicate the current charge level of the power source 1200. When the power source 1200 is near 100% charge, all five LEDs are illuminated. Four LEDs are illuminated when the power source 1200 drops to 80% charge, three LEDs are illuminated when the power source 1200 drops to 60% charge, two LEDs are illuminated when the power source 1200 drops to 40% charge, and one LED is illuminated when the power source 1200 drops to 20% charge.

The fan speed indication may include three single color LEDs. A single LED is illuminated when the fan speed is set to low, two LEDs are illuminated when the fan speed is set to medium, and three LEDs are illuminated when the fan speed is set to high. The change filter indicator may include a bi-color LED that is off when the filters are in acceptable condition, amber or yellow when the pre-filter 210 needs to be replaced and red when the primary filter 306 needs to be replaced.

In another implementation, the output device 1204 includes a display, such as a liquid crystal display (LCD) screen that displays text and other graphical indicators for the output. In this case, the controller 1240 would provide an appropriate digital signal for displaying a status on the display. In some cases, the LCD may be on the user device 112 or other remote device.

As described herein, when the user device 112 or other computing device is utilized, the computing device may serve as both the input device 1202 and the output device 1204. As described above, the output device 1204 may include computing devices such as smart phones, tablet computer, and personal computers running applications configured to receive inputs from the user and display the current status to the user. In one implementation, the user device 112 generates a GUI that allows the user to both control the operation of the filtration device 102 and display a current status of the filtration device 102. In this example, the output device 1204 may be connected to the controller 1240 via a wired or wireless connection.

The output device 1204 may further include a speaker capable of producing audible tones for indicating the status. In this example, the controller 1240 is configured to provide the output device 1204 with an analog signal that causes a desired sound or series of sounds to be played by the speaker. In another example, the output device 1204 may include a vibration device capable that is provided with a signal for producing different vibration patterns depending on the status.

In one implementation, the controller 1240 is configured to manage the operation of the fans 220 that draw air through the filters and provide a user with clean air. The controller 1240 is configured to draw power from the power source 1200, receive an input from the input device 1202, provide power to the fans 220, and drive an output on the output device 1204. The controller 1240 may be implemented using a variety of computing devices. For example, the controller 1240 may be implemented using a general purpose computer or using smaller embedded systems such as systems utilizing a microcontroller, microcomputer, field-programmable gate array (FPGA), or other integrated circuit or combination of circuits.

Figure 32:
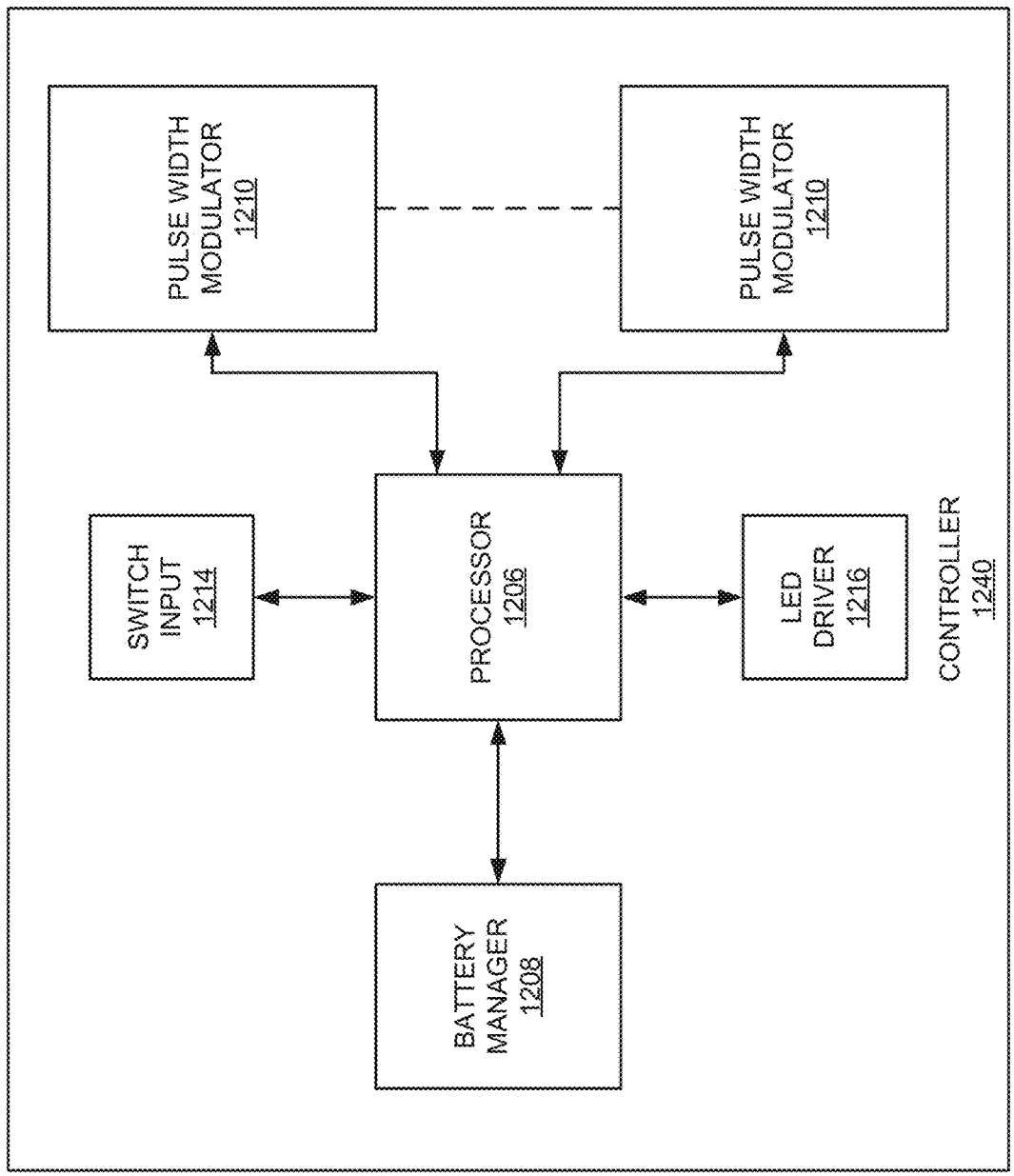
FIG. 32 shows an example controller of a filtration device, in accordance with an embodiment of the disclosure.

Turning to FIG. 32, a more detailed description of the controller 1240 is provided. In one implementation, the controller 1240 includes a battery manager 1208 for controlling the charging and discharging of one or more batteries included in the power source 1200, at least one switch input 1214 for receiving a signal or other communications for the input device 1202, at least one output for indicating or sending a status of the filtration device 102 (e.g., a LED driver 1216), and a power output device for each of the fans 220, such as pulse width modulators (PWMs) 1210 for supplying each of the fans 220 with a power signal.

The PWMs 1210 may be configured to output a power signal at a frequency within the frequency range used by the fans 220. For example, the fans 220 may operate with a peak performance when supplied with a 25 kHz power input. Thus, the controller 1240 may operate the PWMs 1210 at a frequency of 25 kHz. Furthermore, the speed of the fans 220 may be varied by altering the duty cycle of the PWMs 1210. For example, a low setting may be set at a 10% duty cycle, a medium setting may be set at a 50% duty cycle, and a high setting may be set at a 100% duty cycle.

The output of the PWMs 1210 is dictated according to the user input and/or the batter manager 1208. In one example, beginning when the filtration device 102 is turned off, a button connected to an input on the controller 1240 may be pressed to activate the filtration device 102. Various fan speeds may be cycled through by additional button presses. For example, an additional press of the button may cause the controller 1240 to activate the PWMs 1210 at the example 10% duty cycle thereby driving the fan(s) 220 at the low speed. An additional press of the button may cause the controller 1240 to up the duty cycle to 50% and thereby drive the fan(s) 220 at medium speed, and yet another press of the button may cause the duty cycle to be increased to 100% and the fans 220 to be driven at the high speed. Additional button presses may continue the cycling through the various fan speeds. In one example, each press of the button causes the fan speed to cycle from low, to medium, to high, to medium, and back to low. In this example, the filtration device 102 may be deactivated at any time by pressing and holding the button for a preset time, such as several seconds. In another example, each press of the button causes the fan speed to cycle from low, to medium, to high, to turning the filtration device 102 off. The controller 1240 may also automatically reduce the duty cycle of the PWMs 1210 according to the current status of the power source 1200, as monitored by the battery manager 1208, to prolong operation.

In one implementation, the battery manager 1208 determines battery charge levels, predicts battery life, and manages the charging of the battery when filtration device 102 is connected to a power source using the AC/DC converter. The battery manager 1208 may be configured to override a user selected fan speed and decrease the fan speed according to a current battery life or availability of other power sources. For example, if the battery life drops below a threshold and the fan speed is set to high, the controller 1240 may automatically drop the fan speed to medium once the charge threshold is reached. Similarly, if the fan speed is set to medium and the battery charge falls below a second threshold, the controller 1240 may automatically reduce the fan speed to low.

In one implementation, the battery manager 1208 includes a charger and is configured to connect the controller to one or more batteries. The charger supports the simultaneous charging and discharging of the batteries. In one example, the charger includes a single charger stage connected to the batteries via a charge MUX. The charge MUX is configured to allow for the charge current to be shared between each of the batteries while preventing charge transfer between the batteries. When charging a single battery, the battery manager 1208 adjusts the total current supplied by the charger to match the current required to properly charge the battery. When there is more than one battery being charged, the battery manager 1208 compares the desired charge currents for charging each battery. The minimum charge current is then provided via the charge MUX to each of the batteries. In this example, the battery manager 1208 does not allow the charge current to exceed the current required by any battery. Charging operates independent from the remainder of the operation, allowing for the batteries to be charged regardless of whether the filtration device 102 is turned on or off, so long as the filtration device 102 is attached to an external power supply.

The controller 1240 may also be configured to monitor the status of the filter and provide feedback to the user. In one implementation, the controller 1240 logs when a filter is changed and tracks filter usage by logging the amount of time that the filtration device 102 has been used. An alert may then be generated when the filter usage is close to or has exceeded the projected lifespan of the filter. The filter usage data may also be adjusted by logging the amount of time at each speed that the filter has operated. Once the filter usage limit is reached, an indicator to change the filter may be activated. For example, an LED may be lit to indicate that the filter needs to be changed. In another example, a tri-color LED may be used to indicate that a filter is good, needs to be changed soon, or needs to be changed immediately. The indicator may also be triggered on the user device 112 or other remote device.

In particular implementation, the filtration device 102 has four operational modes dictated by the controller 1240. The modes include an off mode, an on mode with LEDs illuminated mode, an on mode without the LEDs illuminated, and a warning mode. In this example, the off mode is a very low power mode similar to a standby mode. The filtration device 102 only consumes a small amount of power when in the off mode and operations are limited to recognizing an input being received from the input device 1202 and turning on. Once the input is received the filtration device 102 goes into the power on with LEDs illuminated mode. In this mode, the filtration device 102 will accept fan speed setting changes and a command for powering off. The LEDs will be illuminated to relay the state of the filtration device 102, for example, indicating the fan speed, battery charge, and whether the filter needs to be replaced. In the power on with no LEDs illuminated mode, the fan 220 is kept at its current speed and the only command that the controller 1240 will recognize is to power off. The warning mode is triggered when the filtration device 102 is engaged in one of the on modes and a problem emerges. For example, the warning mode may be activated when battery is running low. In this case, a low battery LED may be illuminated or begin flashing. Similarly, when the filter needs to be changed an LED may be illuminated.

In one particular implementation, the controller 1240 includes a DC power input and a protection circuit configured to protect against a reverse polarity power input. When connected to an external DC power supply, the controller 1240 controls both the operation of the filtration device 102 and the charging of the batteries. To charge the batteries, the controller 1240 measures the voltage of each battery and controls a charging current using a series of MOSFETs or other switches. Once the DC power supply has been disconnected, the controller 1240 switches to drawing power from the batteries. In this example, the controller 1240 includes two microcontroller units operating in a master/slave configuration. The slave microcontroller is configured to control the output devices 1204, in this case by supplying the LED driver 1216 with a signal for lighting a plurality of LEDs to indicate current operational state. The slave microcontroller unit is also configured to receive input from the input device 1202, in this case the switch 1214. The master microcontroller unit is configured to manage the charging of the battery and includes PWM outputs for supplying the appropriate power to the fans.

In various implementations, the components of the controller 1240 are divided between multiple circuit boards. For example, a main board may include a microcontroller, pressure sensor, a speaker, and various other components, such as a voltage regulator, several choke coils for preventing excessive current, an on/off controller, a battery charger, including the battery manager 1208 and charge circuitry. A second controller board may include user interface circuitry, such as a microcontroller, LEDS, a speaker, and a diagnostic port interface. It will be appreciated that these components are exemplary only and other configurations and components are contemplated.

Figure 33:
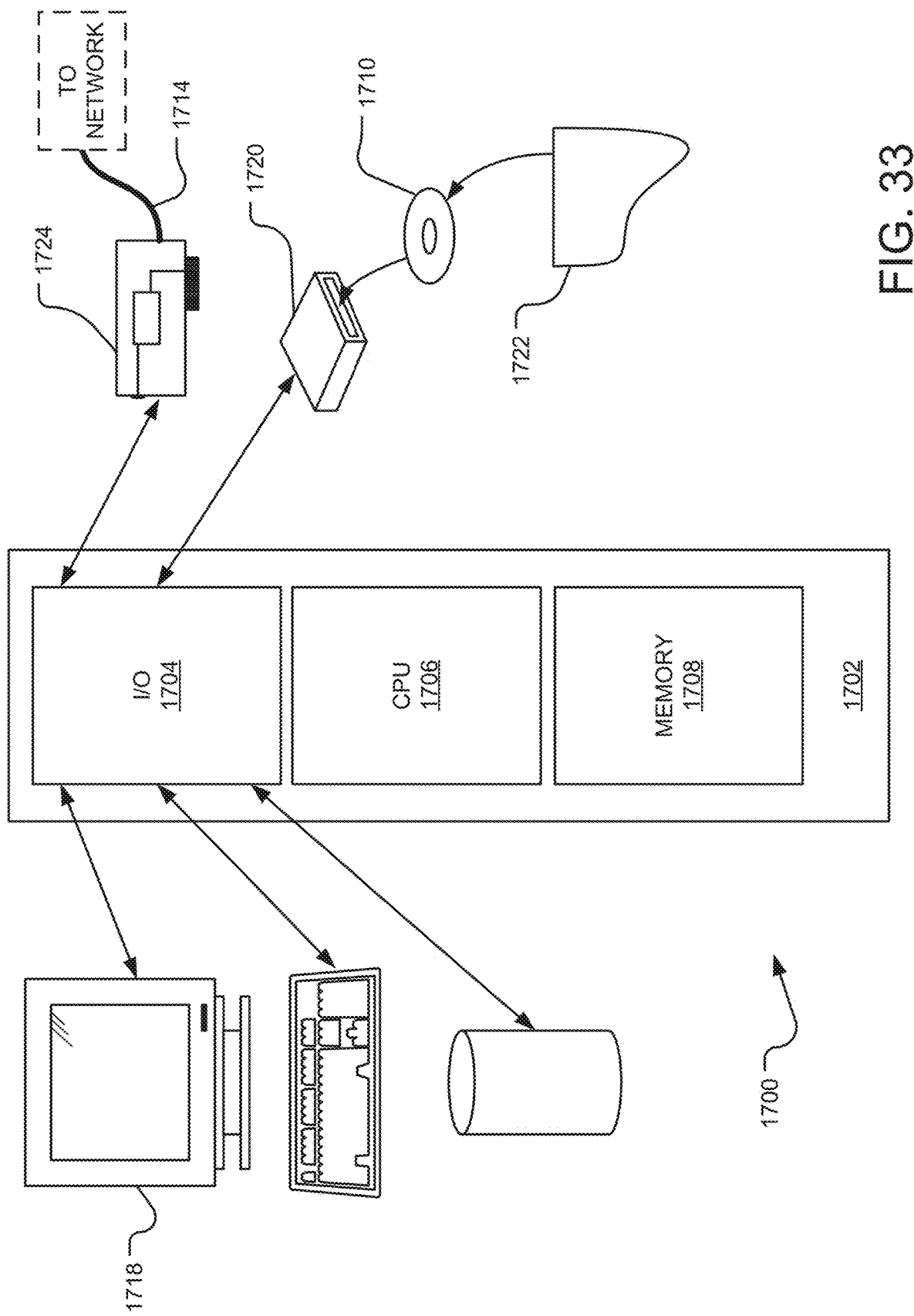
FIG. 33 is an example computing system that may implement various systems and methods discussed herein.

Referring to FIG. 33, a detailed description of an example computing system 1700 having one or more computing units that may implement various systems and methods discussed herein is provided. The computing system 1700 may be applicable to the user device 112, the filtration device 102, or other computing devices. It will be appreciated that specific implementations of these devices may be of differing possible specific computing architectures not all of which are specifically discussed herein but will be understood by those of ordinary skill in the art.

The computer system 1700 may be a general computing system is capable of executing a computer program product to execute a computer process. Data and program files may be input to the computer system 1700, which reads the files and executes the programs therein. Some of the elements of a general purpose computer system 1700 are shown in FIG. 29 wherein a processor 1702 is shown having an input/output (I/O) section 1704, a Central Processing Unit (CPU) 1706, and memory 1708. There may be one or more processors 1702, such that the processor 1702 of the computer system 1700 comprises a single central-processing unit 1706, or a plurality of processing units, commonly referred to as a parallel processing environment. The computer system 1700 may be a conventional computer, a distributed computer, or any other type of computer, such as one or more external computers made available via a cloud computing or other network architecture. The presently described technology is optionally implemented in software devices loaded in memory 1708, stored on a configured DVD/CD-ROM 1710 or storage unit 1712, and/or communicated via a wired or wireless network link 1714, thereby transforming the computer system 1700 in FIG. 33 to a special purpose machine for implementing the described operations.

The I/O section 1704 is connected to one or more user-interface devices (e.g., a keyboard 1716 and a display unit 1718), the storage unit 1712, and/or a disc drive unit 1720. In the case of a tablet or smart phone device, there may not be a physical keyboard but rather a touch screen with a computer generated touch screen keyboard. Generally, the disc drive unit 1720 is a DVD/CD-ROM drive unit capable of reading the DVD/CD-ROM 1710, which typically contains programs and data 1722. Computer program products containing mechanisms to effectuate the systems and methods in accordance with the presently described technology may reside in the memory section 1704, on the disc storage unit 1712, on the DVD/CD-ROM 1710 of the computer system 1700, or on external storage devices with such computer program products, including one or more database management products, web server products, application server products, and/or other additional software components. Alternatively, the disc drive unit 1720 may be replaced or supplemented by an optical drive unit, a flash drive unit, magnetic drive unit, or other storage medium drive unit. Similarly, the disc drive unit 1720 may be replaced or supplemented with random access memory (RAM), magnetic memory, optical memory, and/or various other possible forms of semiconductor based memories commonly found in smart phones and tablets.

The network adapter 1724 is capable of connecting the computer system 1700 to a network via the network link 1714, through which the computer system can receive instructions and data and/or issue file system operation requests. Examples of such systems include personal computers, Intel or PowerPC-based computing systems, AMD-based computing systems and other systems running a Windows-based, a UNIX-based, or other operating system. It should be understood that computing systems may also embody devices such as terminals, workstations, mobile phones, tablets or slates, multimedia consoles, gaming consoles, set top boxes, etc.

When used in a LAN-networking environment, the computer system 1700 is connected (by wired connection or wirelessly) to a local network through the network interface or adapter 1724, which is one type of communications device. When used in a WAN-networking environment, the computer system 1700 typically includes a modem, a network adapter, or any other type of communications device for establishing communications over the wide area network. In a networked environment, program modules depicted relative to the computer system 1700 or portions thereof, may be stored in a remote memory storage device. It is appreciated that the network connections shown are examples of communications devices for and other means of establishing a communications link between the computers may be used.

In an example implementation, filtration system control software and other modules and services may be embodied by instructions stored on such storage systems and executed by the processor 1702. Some or all of the operations described herein may be performed by the processor 1702. Further, local computing systems, remote data sources and/or services, and other associated logic represent firmware, hardware, and/or software configured to control filtration system operation. Such services may be implemented using a general purpose computer and specialized software (such as a server executing service software), a special purpose computing system and specialized software (such as a mobile device or network appliance executing service software), or other computing configurations. In addition, one or more functionalities of the systems and methods disclosed herein may be generated by the processor 1702 and a user may interact with a Graphical User Interface (GUI) using one or more user-interface devices (e.g., the keyboard 1716, the display unit 1718, and the user devices 112) with some of the data in use directly coming from online sources and data stores. The system set forth in FIG. 29 is but one possible example of a computer system that may employ or be configured in accordance with aspects of the present disclosure.

While not limiting the scope of the disclosure, the following examples demonstrate efficiency of exemplary embodiments of the disclosure through, e.g., pressure integrity, flow momentum, superior power efficiency, etc.

EXAMPLES

Example 1: Particulate Filtration Performance Testing

The purpose of this testing is to determine the filtration performance of exemplary filtration modules of the disclosure. The EN1822-5 test standard is used to evaluate the filter modules, and to demonstrate that the filter modules have no input air "by-pass" such that seal integrity is maintained so that the air coming out of the filter module is completely filtered and achieves the filtration specification of the system.

The EN1822-5 test standard evaluates a filters' particle removal efficiency in a size range between 20 nm-300 nm. The reported efficiency from the EN1822-5 testing procedure is given at the lowest measured efficiency value recorded during the challenge. Test conditions and test results are provided in the tables below.

| | |
|---|---|
| Test Conditions | Test Air Flow Rate (LPM): 400 |
| | Challenge Aerosol: Aerosolized KCl |
| | Particle Measurement Equipment: TSI 3080 Classifier/TSI 3772 CNC Counter |
| | Test Air Temperature (° F.): 75.2 |
| | Relative Humidity (%): 46.4 |
| | Barometric Pressure (Inches Hg): 29.54 |
| Test Results | Initial/Final Resistance ("WG): 0.71/0.73 |
| | MPPS Determination (µM): 0.0209 |
| | Efficiency at MPPS (%): 99.99999840 |
| | Projected Rating (Min. Integrel for E10 = 85%): U17 |

Figure 34:
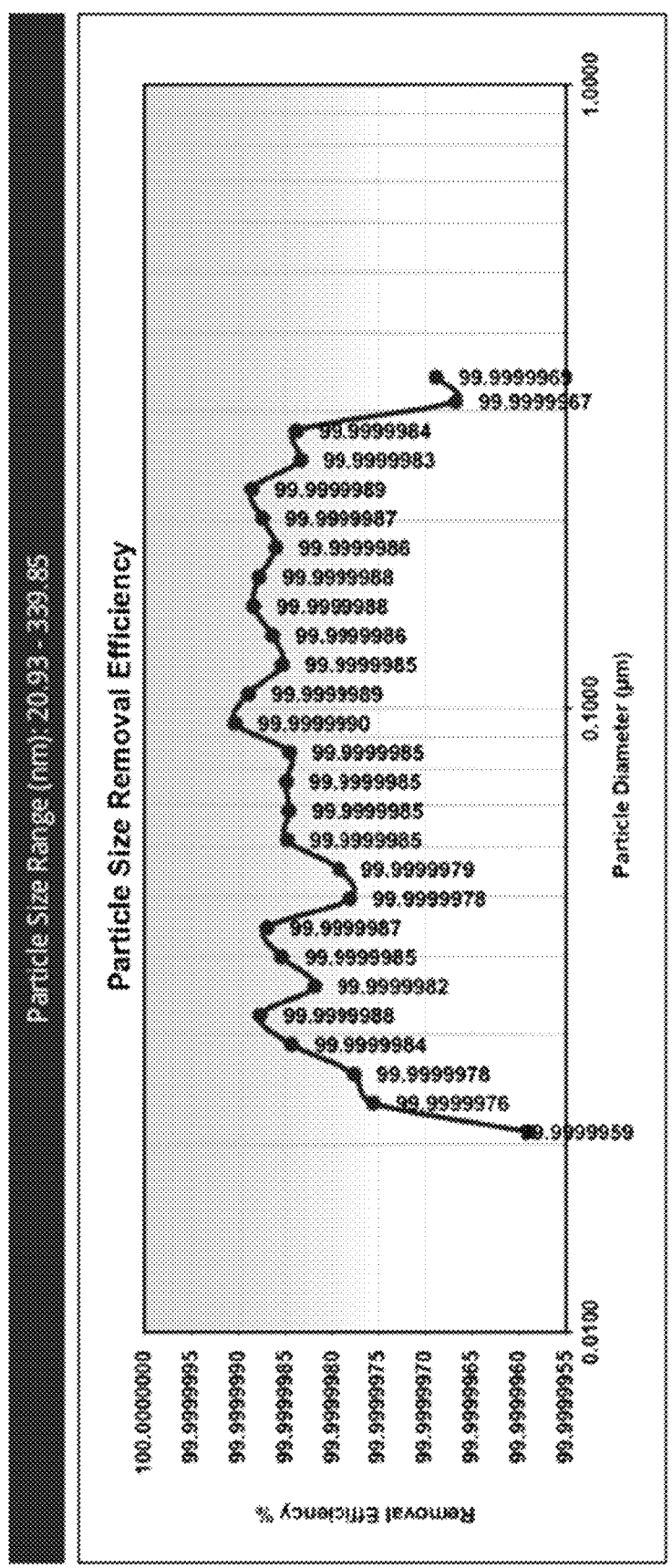
FIG. 34 illustrates particle size removal efficiency of an exemplary air filtration system, in accordance with embodiments of the disclosure.

With reference to FIG. 34, test results showed that filter modules according to the disclosure achieve 99.99999% efficiency at the lowest performing particle size region (MPPS) of the filter in the ultrafine particle size range. This result far exceeds (3000 times better) the standard HEPA filtration performance of 99.97% at 300 nm.

A modified Clean Air Delivery Rate (CADR) test was also performed using an exemplary air filtration system (air filtration system including filter module docked in docking base) of the disclosure, comparing the level of ultrafine particles a test chamber room before and after filtration with the standard procedure of the test facility versus filtration with a system of the disclosure. The standard procedure of the test facility consisted of a large HEPA filter combined with a high powered fan that when powered on had a much higher CADR than the system of the disclosure. The results showed that after 90 minutes of runtime, the system of the disclosure removed ultrafine particles at an efficiency greater than 99% over the entire range of particles challenged in the room. In contrast, the standard cleaning procedure only removed up to 85%, and form many particle sizes less than 65%.

Example 2: VOC Testing

The purpose of this testing is to determine the efficacy of air filtration system (air filtration system including filter module docked in docking base) of the disclosure to remove challenge VOCs. VOC removal testing was performed referencing NRCC-54013 (April 2011): Method for Testing Portable Air Cleaners sections 3.2 and 5.1.2. Testing was conducted for a total of 8 hours.

Natural system decay for the challenge chemicals is performed prior to the test. The air filtration system of the disclosure was placed in the center of a chamber, which was then sealed and flushed with clean air for a minimum of one night. An additional enclosure fan was operated to ensure air mixing. The challenge chemicals (formaldehyde and toluene) were injected and allowed to circulate for 30 minutes during which an air sample was taken. Each challenge chemical was performed using a fresh filter. The air filtration system was then turned on using the highest fan speed beginning the test timing.

VOC samples were collected at 5, 10, 15, 20, 25, 30, 45, 60, 90, 120, 180, 240, 300, 360, 420, and 480 minutes after starting the system. Samples analyzed for toluene were collected on multi-sorbent tubes containing Tenax TA. These VOC samples were analyzed by thermal desorption-gas chromatography/mass-spectro scopy, TD-GC/MS. Samples analyzed for formaldehyde were collected on cartridges treated with 2,4-di-nitrophenylhydrazine (DNPH) and were analyzed using high performance liquid chromatography, HPLC. Individual VOCs were calculated using calibration curves based on pure standards.

Test Parameters:

TABLE 1

Chamber conditions during test period

| | PARAMETER | SYMBOL | VALUE | UNITS |
|---|---|---|---|---|
| | Chamber Volume | V | 30 | $m^3$ |
| | Testing Duration | t | 8 | h |
| Test Conditions | Average Temperature (Range) | T | 23.6 (23.5-23.8) | °C. |
| | Average Humidity (Range) | RH | 49.2 (48.9-49.9) | % RH |

Test Results:

TABLE 2

Concentration of challenge chemical decay through test.

| Time (min) | Formaldehyde ($\mu g/m^3$) | Toluene ($\mu g/m^3$) | D-Limonene ($\mu g/m^3$) |
|---|---|---|---|
| 0 | 180 | 835 | 695 |
| 5 | 171 | 792 | 671 |
| 10 | 163 | 705 | 595 |
| 15 | 161 | 675 | 578 |
| 20 | 153 | 650 | 552 |
| 25 | 151 | 616 | 528 |
| 30 | 148 | 605 | 519 |
| 45 | 140 | 488 | 415 |
| 60 | 129 | 431 | 370 |
| 90 | 118 | 301 | 257 |
| 120 | 108 | 210 | 177 |
| 180 | 90 | 103 | 85 |
| 240 | 83 | 52 | 41 |
| 300 | 73 | 23 | 18 |
| 360 | 67 | 9 | <8 |
| 420 | 59 | <8 | <8 |
| 480 | 51 | <8 | <8 |

The clean air delivery rate (CADR) is calculated according to equation 1:

$$\ln\left(\frac{c_t}{c_0}\right) = -\left(k_n + \frac{CADR}{V}\right)t \quad \text{Eq. 1}$$

where:

$C_t$: chemical concentration at time t ($\mu g/m^3$)

$C_0$: chemical concentration at time to ($\mu g/m^3$)

V: volume of the test chamber ($m^3$)

t: time (h)

CADR: Clean Air Delivery Rate ($m^3/h$)

$k_n$: first order decay constant with PAC turned off

The single pass efficiency (SPE) is calculated according to equation 2:

$$SPE = \frac{CADR}{Q} \quad \text{Eq. 2}$$

where:

Q: purifier flow rate (27 $m^3/h$).

TABLE 3

Purifier efficiency - calculation of clean air delivery rate and single pass efficiency.

| VOC | CAS No. | CADR ($m^3/h$) | SPE (%) |
|---|---|---|---|
| Formaldehyde | 50-00-0 | 5.6 | 21 |
| Toluene | 108-88-3 | 18.8 | 69 |
| D-Limonene | 5989-27-5 | 18.5 | 68 |

Figure 35:
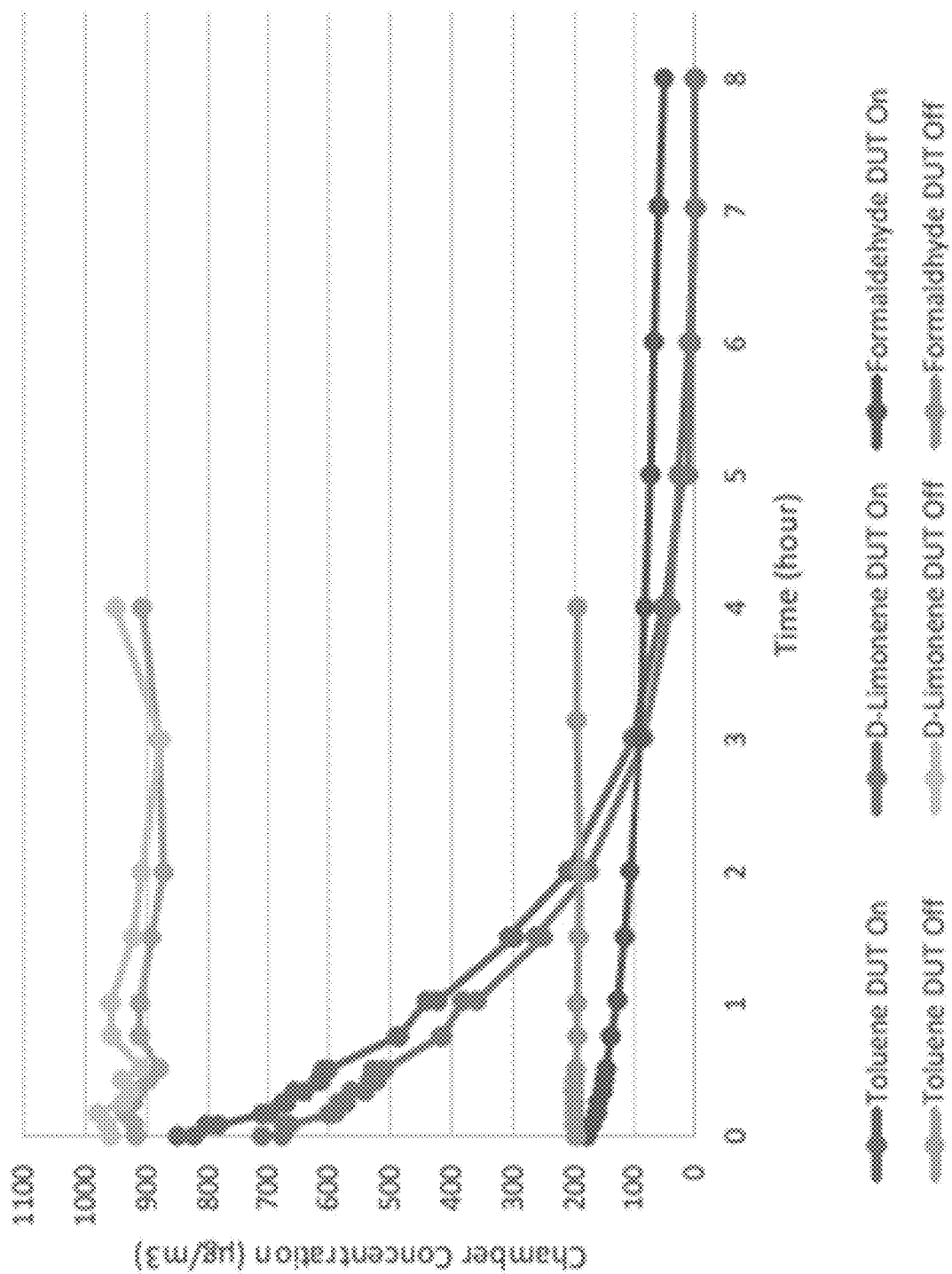
FIG. 35 illustrates concentration change for various challenge chemicals during testing using an exemplary air filtration system, in accordance with embodiments of the disclosure.
Figure 36:
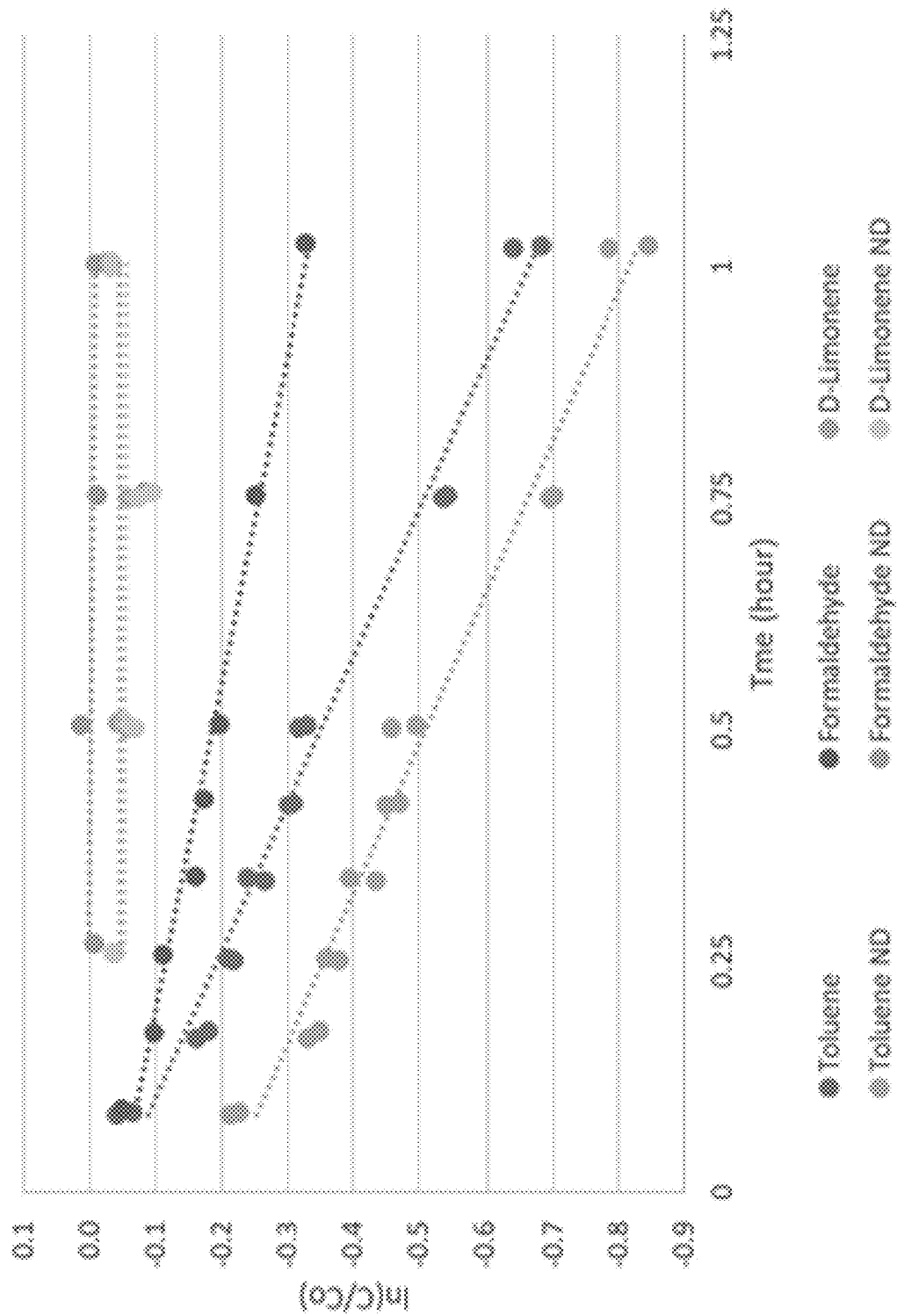
FIG. 36 illustrates for various challenge chemicals during testing using an exemplary air filtration system, in accordance with embodiments of the disclosure.

As shown in FIGS. 35 and 36, after 8 hours of testing, the air filtration system of the disclosure removed 99% of toluene, 99% of D-limonene, and 71% of formaldehyde.

Example 3: Virus and Bacterial Removal Efficiency

The purpose of this testing is to determine the efficacy of air filtration system (air filtration system including filter module docked in docking base) of the disclosure to remove viruses and bacteria.

Viral Filtration Efficiency (VFE) at an Increased Challenge Level

This test procedure was performed to evaluate the VFE of a filtration system of the disclosure at an increased challenge level. A suspension of ΘX174 bacteriophage was delivered to the test system at a challenge level of greater than $10^7$ plaque-forming units (PFU) to determine the filtration efficiency. The challenge was aerosolized using a nebulizer and delivered to the test system at a fixed air pressure and flow rate of 150 liters per minute (LPM). The aerosol droplets were generated in a glass aerosol chamber and drawn through the test system into all glass impingers (AGIs) for collection. The challenge was delivered for a 10 minute interval and sampling through the AGIs was conducted for 11 minutes to clear the aerosol chamber. The mean particle size (MPS) control was performed at a flow rate of 28.3 LPM using a six-stage, viable particle, Andersen sampler for collection. The VFE at an Increased Challenge Level test procedure was adapted from ASTM F2101.

Challenge Procedure: The viral culture suspension was aerosolized using a nebulizer and delivered to the test article at a constant flow rate and fixed air pressure. The aerosol droplets were generated in a glass aerosol chamber and drawn through the test system into AGIs. Approximately one third of the effluent air was collected for quantification during testing; therefore, the plate count results for the controls and test articles were multiplied by three in order to reflect the entire quantity of air passing through the test article. The challenge was delivered for a 10 minute interval and the vacuum and air pressure were allowed to run for an additional minute in order to clear the aerosol chamber. Positive control runs were performed (no filter medium in the air stream) prior to the first test system run, after every 5-7 test system runs, and after the last test system run to determine the average number of viable particles being delivered to each test system. The MPS of the challenge aerosol was determined using a six-stage Andersen sampler.

Plaque Assay Procedure: The titer of the AGI assay fluid was determined using standard plaque assay techniques.

Approximately 2.5 mL of molten top agar was dispensed into sterile test tubes and held at 45±2° C. in a waterbath. An aliquot of the assay fluid from the test article was added to the sterile test tubes along with approximately 0.1 mL of an *Escherichia coli* culture. The contents were mixed and poured over the surface of bottom agar plates. The agar was allowed to solidify on a level surface and the plates were incubated at 37±2° C. for 12-24 hours Results:

| Test Article | Total PFU Recovered | Filtration Efficiency (%) |
|---|---|---|
| 01VFE123 | 30 | 99.99976 |
| 02VFE121 | <1[a] | >99.9999919 |
| 03VFE073 | <1[a] | >99.9999919 |

[a]There were no detected plaques on any of the assay plates for this test article.

The filtration efficiency percentages were calculated using the following equation:

[a]There were no detected plaques on any of the assay plates for this test article.

$$\% \ VFE = \frac{C - T}{C} \times 100$$

C=Challenge Level
T=Total PFU recovered downstream of the test article

Test Method Acceptance Criteria: The average VFE positive control challenge level shall be ≥1×10⁶ PFU when the flow rate is ≥30 LPM. The average MPS of the challenge aerosol at 1 cubic foot per minute (CFM) (28.3 LPM) must be maintained at 3.0±0.3 μm.

Bacterial Filtration Efficiency (BFE) at an Increased Challenge Level GLP Report This test procedure was performed to evaluate the BFE of test articles at an increased challenge level. A suspension of *Staphylococcus aureus*, ATCC #6538, was delivered to the test system at a challenge level of greater than $10^6$ colony forming units (CFU). The challenge was aerosolized using a nebulizer and delivered to the test article at a fixed air pressure and flow rate of 150 liters per minute (LPM). The aerosol droplets were generated in a glass aerosol chamber and drawn through the test article into all glass impingers (AGIs) for collection. The challenge was delivered for a 10 minute interval and sampling through the AGIs was conducted for 11 minutes to clear the aerosol chamber. The mean particle size (MPS) control was performed at a flow rate of 28.3 LPM using a six-stage, viable particle, Andersen sampler for collection. This method was adapted from ASTM F2101.

Culture Preparation: Approximately 100 mL of soybean casein digest broth (SCDB) was inoculated with *S aureus*, ATCC #6538, and incubated with mild shaking for 24±4 hours at 37±2° C. To determine the MPS of the challenge aerosol, the culture was diluted in peptone water (PEPW) to an appropriate concentration in order to yield counts within the limits of the Andersen sampler.

AGI Preparation: In a laminar flow hood, a 30 mL aliquot of PEPW was dispensed into each AGI.

Challenge Procedure: The bacterial culture suspension was aerosolized using a nebulizer and delivered to the test article at a constant flow rate and fixed air pressure. The aerosol droplets were generated in a glass aerosol chamber and drawn through the test article into AGIs. Approximately one third of the effluent air was collected for quantification during testing; therefore, the plate count results for the controls and test articles were multiplied by three in order to reflect the entire quantity of air passing through the test article. The challenge was delivered for a 10 minute interval and the vacuum and air pressure were allowed to run for an additional minute in order to clear the aerosol chamber. Positive control runs were performed (no filter medium in the air stream) prior to the first test system run, after every 5-7 test system runs, and after the last test system run to determine the average number of viable particles being delivered to each test system. The MPS of the challenge aerosol was determined using a six-stage Andersen sampler.

Assay Procedure: The titer of the AGI assay fluid was determined using standard spread plate and/or membrane filtration techniques.

Spread Plating: An aliquot of the test article assay fluid was dispensed onto a Tryptic soy agar (TSA) plate and spread using a sterile rod.

Membrane Filtration: A sterile filter funnel was placed on a manifold. A sterile 0.45 μm membrane was aseptically removed from the packaging and centered over the base of the funnel. An appropriate volume of the test article assay fluid was transferred into the sterile filter funnel. The vacuum was applied in order for the assay fluid to be filtered under light suction. The membrane was then rinsed to ensure that all organisms were impinged onto the membrane. The membrane was removed from the filter funnel and placed onto the surface of a TSA plate.

All plates were incubated at 37±2° C. for 48±4 hours prior to counting.

Results:

| Test Article | Total CFU Recovered | Filtration Efficiency (%) |
|---|---|---|
| 01BFE164 | 18 | 99.99975 |
| 02BFE035 | 3 | 99.999958 |
| 03BFE029 | <1[a] | >99.999986 |

[a]There were no detected colonies on any of the assay plates for this test article.

The filtration efficiency percentages were calculated using the following equation:

$$\% \ BFE = \frac{C - T}{C} \times 100$$

C=Challenge Level
T=Total CFU recovered downstream of the test article

Test Method Acceptance Criteria: The average BFE positive control challenge level shall be ≥$10^6$ CFU when the flow rate is ≥30 LPM. The average MPS of the challenge aerosol at 1 cubic foot per minute (CFM) (28.3 LPM) shall be maintained at 3.0±0.3 pm.

CONCLUSION

When testing for virus efficiency performance our filtration systems were challenged with ΘX174 bacteriophage which is one off the smallest known viruses (25 nm-27 nm) in size. The virus was aerosolized into airborne droplets and filtered through an exemplary filtration system of the disclosure as a challenge. The result was that the systems of the disclosure can filter out over 99.99999% of the aerosolized viral load. The test for the bacteria filtration efficiency (BFE) was conducted in a similar fashion using an aerosolized challenge of *Staphylococcus aureus*. As with the VFE test, the BFE test showed that filtration systems of the disclosure can remove over 99.99999% of the challenged bacterial aerosol.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented. Some or all of the steps may be executed in parallel, or may be omitted or repeated.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

Although the foregoing describes various embodiments by way of illustration and example, the skilled artisan will appreciate that various changes and modifications may be practiced within the spirit and scope of the present disclosure.

What is claimed is:

1. A filter module comprising:

an external housing having a filtered air outlet for directing filtered air from the filter module;

an internal chassis having a face plate including an input air inlet for directing input air into the filter module, a fan plenum attachment seat for securing the filter module to a fan plenum assembly, an input air flow path seal opposite the input air inlet, and opposed side walls, each having one or more filter media retention features;

at least two primary filter media, wherein the at least two primary filter media are secured to the internal chassis by the one or more filter media retention features in a spaced apart orientation in a parallel air flow configuration;

wherein the internal chassis is positioned substantially within the external housing with the face plate sealed to the perimeter of a surface of the external housing so as to form the exterior of the filter module, with the at least two primary filter media located within the filter module so as to separate an input air flow region from a filtered air flow region within the filter module; and wherein an input, turbulent air flow region is created within the filter module in a space between the chassis input air inlet, the chassis input air flow path seal, the chassis opposed side walls, and the spaced apart primary filter media during use.

2. The filter module of claim 1, wherein each of the at least two primary filter media are pleated composite primary filter media that are over-molded into a structural frame, and the structural frame is secured to the internal chassis.

3. The filter module of claim 2, wherein each of the pleated composite primary filter media are over-molding into the structural frame along the entire perimeter of the structural frame.

4. The filter module of claim 3, wherein the structural frame comprises one or more securement tabs configured to interface with spacers located on the internal chassis, the spacers configured to facilitate placement and securement of the primary filter media to the internal chassis.

5. The filter module of claim 4, wherein the one or more securement tabs are configured as a frame extension located about an outside frame perimeter of the structural frame.

6. The filter module of claim 2, wherein each structural frame comprises an outside frame perimeter and at least one support divider to form at least two filter frame sections, and wherein each filter frame section comprises a pleated composite primary filter media over-molded into the filter frame section.

7. The filter module of claim 2, wherein each pleated composite primary filter media includes at least five layers in the composite.

8. The filter module of claim 7, wherein the at least five layers of the composite comprise at least three scrim layers and at least two membrane layers.

9. The filter module of claim 2, wherein each of the pleated composite primary filter media have a filter pleating pitch is between 6 pleats to 24 pleats per inch.

10. The filter module of claim 2, wherein each of the pleated composite primary filter media have a filter pleat count of between 50 pleats to 100 pleats.

11. The filter module of claim 2, wherein each structural frame is formed from a material selected from polypropylene or acrylonitrile butadiene styrene (ABS).

12. The filter module of claim 1, wherein the one or more filter media retention features of the side walls of the internal chassis are selected from clips, grooves, snaps, and combinations thereof.

13. The filter module of claim 1, wherein the at least two primary filter media are further secured to the internal chassis using thermal bonding, ultrasonic welding, or adhesives.

14. The filter module of claim 1, wherein the face plate of the internal chassis is sealed to a surface of the external housing using thermal bonding, ultrasonic welding, or adhesives so as to form an air tight seal between the internal chassis and the external housing.

15. The filter module of claim 1, wherein the opposed side walls of the internal chassis include one or more spacers configured to facilitate placement and securement of the primary filter media to the internal chassis.

16. The filter module of claim 1, wherein the opposed side walls of the internal chassis tapered in a direction from the face plate to the input air flow path seal.

17. The filter module of claim 1, wherein input air flows from the input, turbulent air flow region between and through the spaced apart primary filter media in parallel, into the filtered air flow region, and through the filtered air outlet during use.

18. The filter module of claim 1, wherein the filtered air outlet is configured at a grate, grill, cylinder, or tube.

19. The filter module of claim 1, wherein the face plate comprises the fan plenum attachment seat.

20. The filter module of claim 19, wherein the fan plenum attachment seat comprises a recessed portion formed in the face plate, wherein the recessed portion is sized and shaped so as to structurally mate with a fan plenum assembly.

\* \* \* \* \*